United States Patent
Jin et al.

(10) Patent No.: US 10,452,937 B2
(45) Date of Patent: Oct. 22, 2019

(54) ELECTRONIC DEVICE SUPPORTING FINGERPRINT VERIFICATION FUNCTION AND METHOD FOR OPERATING THE SAME

(71) Applicant: Samsung Electronics Co., Ltd., Gyeonggi-do (KR)

(72) Inventors: Yun Jang Jin, Yongin-si (KR); Seung Geol Baek, Suwon-si (KR); Kyung Hoon Song, Yongin-si (KR); Gyu Sang Cho, Uiwang-si (KR); Kwang Sub Lee, Yongin-si (KR); Se Young Jang, Seongnam-si (KR); Chi Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/624,596

(22) Filed: Jun. 15, 2017

(65) Prior Publication Data

US 2017/0364763 A1 Dec. 21, 2017

(30) Foreign Application Priority Data

Jun. 15, 2016 (KR) ........................ 10-2016-0074681

(51) Int. Cl.
*G06K 9/00* (2006.01)
*G09G 5/02* (2006.01)
(Continued)

(52) U.S. Cl.
CPC ....... *G06K 9/00912* (2013.01); *G06F 3/0412* (2013.01); *G06F 3/0416* (2013.01); *G06F 3/0421* (2013.01); *G06F 21/32* (2013.01); *G06K 9/0002* (2013.01); *G06K 9/00087* (2013.01); *G09G 5/02* (2013.01); *G09G 5/10* (2013.01);
(Continued)

(58) Field of Classification Search
None
See application file for complete search history.

(56) References Cited

U.S. PATENT DOCUMENTS 8,269,746 B2 * 9/2012 Hodges ................. G06F 3/0421
345/175
8,411,070 B2 * 4/2013 Boer ..................... G06F 3/0412
178/18.09
(Continued)

FOREIGN PATENT DOCUMENTS

KR 20100094382 A 8/2010
KR 20140144667 A 12/2014
(Continued)

OTHER PUBLICATIONS

Extended European Search Report for European Application No. 17175824.6, dated Oct. 27, 2017. (9 pages).

*Primary Examiner* — Soo Jin Park

(57) ABSTRACT

An electronic device includes a display including at least one pixel and at least a partial area of which is transparent. The electronic device also has a fingerprint sensor disposed in an area under the display, on which a screen is displayed, to collect light, a direction of which is changed by an object approaching the display and acquire image information related to fingerprint authentication. In addition, the electronic device has a processor adapted to acquire image information of the fingerprint sensor.

9 Claims, 36 Drawing Sheets

(51) Int. Cl.
  *G09G 5/10* (2006.01)
  *G06F 3/041* (2006.01)
  *G06F 3/042* (2006.01)
  *G06F 21/32* (2013.01)

(52) U.S. Cl.
  CPC ............. *G09G 2320/0626* (2013.01); *G09G 2320/0666* (2013.01); *G09G 2320/0686* (2013.01); *G09G 2320/08* (2013.01); *G09G 2354/00* (2013.01)

(56) References Cited

U.S. PATENT DOCUMENTS

| | | | |
|---|---|---|---|
| 9,448,755 B2 | 9/2016 | Francis et al. | |
| 9,632,344 B2 | 4/2017 | Ludwig | |
| 10,083,335 B2* | 9/2018 | Zhang | G02B 6/005 |
| 10,181,070 B2* | 1/2019 | Smith | G02B 5/005 |
| 2009/0027358 A1* | 1/2009 | Hosono | G06F 3/0421 |
| | | | 345/175 |
| 2010/0208953 A1 | 8/2010 | Gardner et al. | |
| 2010/0238136 A1* | 9/2010 | Chang | G06F 3/042 |
| | | | 345/175 |
| 2011/0102392 A1* | 5/2011 | Fujioka | G02F 1/13338 |
| | | | 345/207 |
| 2013/0076485 A1* | 3/2013 | Mullins | G06F 21/32 |
| | | | 340/5.83 |
| 2014/0036168 A1 | 2/2014 | Ludwig | |
| 2014/0292666 A1* | 10/2014 | Shi | G06F 3/0416 |
| | | | 345/173 |
| 2015/0186092 A1 | 7/2015 | Francis et al. | |
| 2015/0363632 A1 | 12/2015 | Ahn et al. | |
| 2016/0266695 A1* | 9/2016 | Bae | G06F 1/1643 |
| 2017/0091506 A1* | 3/2017 | Sinha | G06F 1/1643 |
| 2017/0161007 A1 | 6/2017 | Francis et al. | |
| 2017/0220145 A1 | 8/2017 | Ludwig | |
| 2017/0220838 A1* | 8/2017 | He | G06K 9/0004 |
| 2017/0329382 A1* | 11/2017 | Guo | G06F 9/44 |
| 2017/0337413 A1* | 11/2017 | Bhat | G06K 9/0002 |
| 2018/0005005 A1* | 1/2018 | He | G06F 3/0412 |
| 2018/0046281 A1* | 2/2018 | Pi | A61B 5/02416 |

FOREIGN PATENT DOCUMENTS

| | | |
|---|---|---|
| KR | 20150013087 A | 2/2015 |
| KR | 20150094370 A | 8/2015 |
| WO | 2015100371 A1 | 7/2015 |

* cited by examiner

<2201>
FINGERPRINT AUTHENTICATION

2210

<2203>
FINGERPRINT AUTHENTICATION
▷ ▷ ▷ ▷ ▷

2220
2221

<2205>
AUTHENTICATION SUCCEEDS

← SUCCEED

FAIL ↓

<2207>
AUTHENTICATION FAILS
MAINTAIN TOUCH OF FINGER, CHANGE DISPLAY STATE

2222

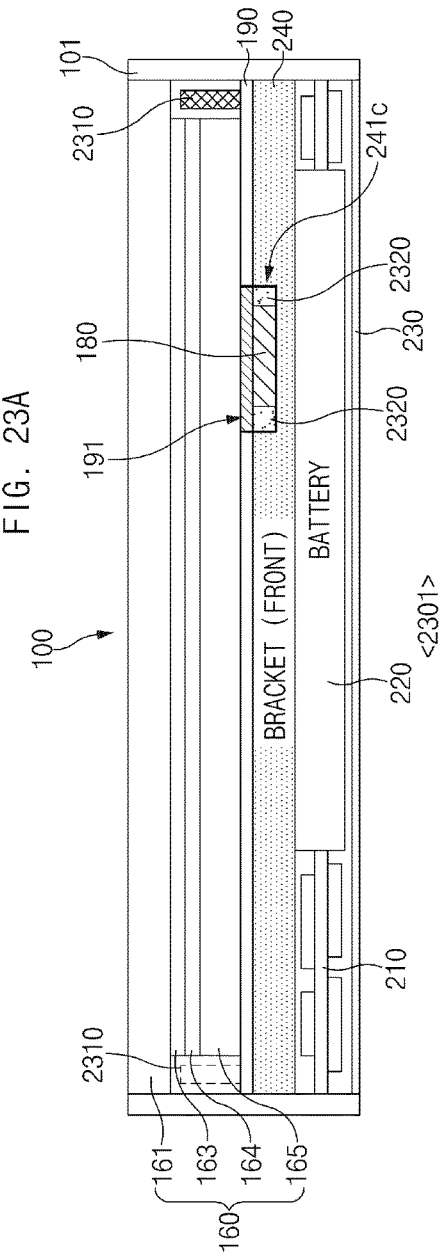
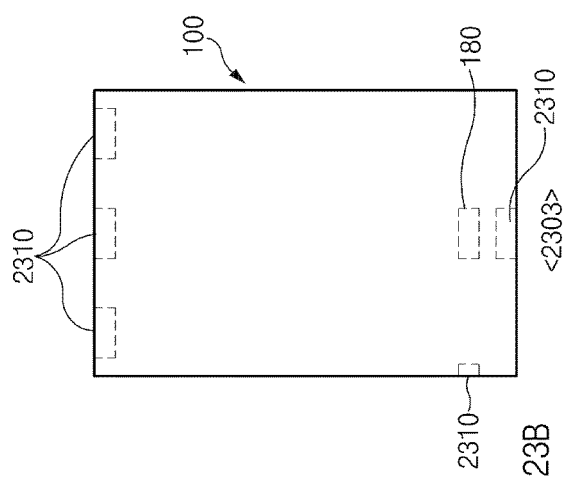
FIG. 23A
FIG. 23B

<3001>

<3003>

<3005>

ELECTRONIC DEVICE SUPPORTING FINGERPRINT VERIFICATION FUNCTION AND METHOD FOR OPERATING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Jun. 15, 2016, in the Korean Intellectual Property Office and assigned Serial number 10-2016-0074681, the entire disclosure of which is hereby incorporated by reference.

Technical Field

The present disclosure relates to a fingerprint verification function.

Background

Conventionally, electronic devices support a fingerprint verification function. In a conventional electronic device having a fingerprint verification function, a fingerprint sensor is disposed at a periphery of a lower end of a display area or on a rear surface of a case of the electronic device so that the electronic device may support a fingerprint authentication function based on the fingerprint sensor.

In the conventional fingerprint verification environment, the user needs to locate a finger in a specific area such as a lower end or a rear surface of a case, for authentication of a fingerprint. In this process, it is difficult for the user to locate a finger at a specific point while gripping an electronic device when the electronic device has a structure in which a fingerprint sensor is disposed at a lower end of a case. Further, when the electronic device having a structure in which a fingerprint sensor is disposed on a rear surface of the case, there may be an error in a fingerprint authenticating process because the user has to sensibly locate a finger on the fingerprint sensor.

SUMMARY

To address the above-discussed deficiencies, it is a primary object to provide at least the advantages described below. Accordingly, an aspect of the present disclosure is to provide an electronic device supporting a fingerprint verification function that employs a fingerprint authentication structure, by which a finger may be easily located, and performs fingerprint authentication based on an intuitive user interface (UI), and a method for operating the same.

In accordance with an aspect of the present disclosure, there is provided an electronic device including a display including at least one pixel and at least a partial area of which is transparent, a fingerprint sensor disposed in an area under the display, on which a screen is displayed, to collect light, a direction of which is changed by an object approaching the display and acquire image information related to fingerprint authentication, and a processor adapted to acquire image information of the fingerprint sensor.

In accordance with another aspect of the present disclosure, there is provided a method for operating an electronic device, the method including receiving a request for authentication of a fingerprint, and outputting at least a partial area including a screen display area of a display corresponding to a location at which a fingerprint sensor is disposed at a specific luminance or in a specific color.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 23A and 23B are views illustrating a form of a fingerprint sensor according to an embodiment of the present disclosure;

Throughout the drawings, it should be noted that like reference numbers are used to depict the same or similar elements, features, and structures.

DETAILED DESCRIPTION

Figure 1:
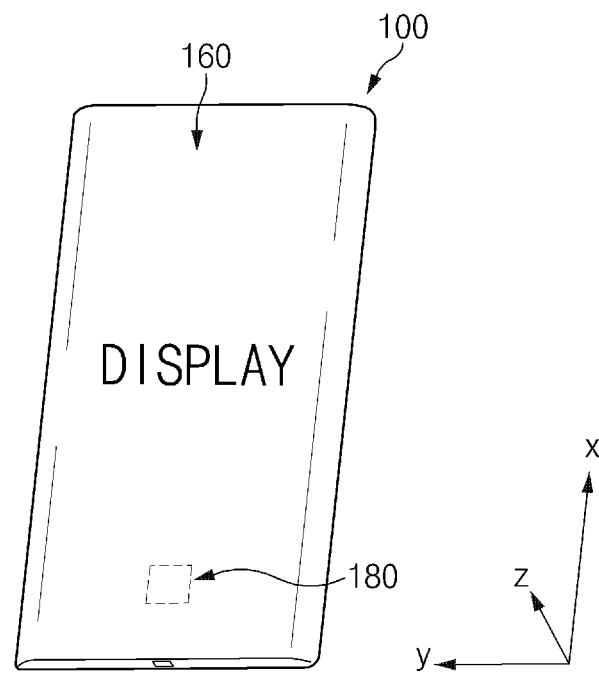
FIG. 1 is a view illustrating an example of an external appearance of an electronic device supporting a fingerprint authentication function according to an embodiment of the present disclosure.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to the description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a view illustrating an example of an external appearance of an electronic device supporting a fingerprint authentication function according to an embodiment of the present disclosure.

Referring to FIG. 1, the electronic device 100 of the present disclosure, for example, may have a polygonal shape (e.g., a tetragonal shape), and corners of the electronic device 100 may be at least partially rounded. Further, the electronic device 100 may have a circular or spherical shape. Further, the electronic device 100 may be of an edge type in which at least one of sides of the electronic device 100 (e.g., a left side or a right side of the electronic device 100 with reference to a longitudinal display state of a display 160) is gradually curved as it goes towards a periphery of the electronic device 100. The electronic device 100 may have a form (e.g., a front surface full screen) in which the display 160 is expanded to at least one of a lower end or an upper end of a screen.

As illustrated, in the electronic device 100 of the present disclosure, a fingerprint sensor 180 may be disposed in at least one area of an inside of the display 160. According to an embodiment, the fingerprint sensor 180 may have a specific size (e.g., a size corresponding to a technical and statistical size, by which a fingerprint of a user may be verified), and may be disposed on one side of a rear surface of the display 160. The fingerprint sensor 180 may receive at least a portion (e.g., light reflected by a finger contacting a surface of the display 160) of light radiated by at least one pixel disposed in the display 160, may build image information, and may deliver the image information to a processor of the electronic device 100. In this regard, at least a portion of the display 160 may be transparent. For example, the display 160 may have a specific transparency. Further, an area of the display 160, which includes at least a portion of an area in which the fingerprint sensor 180 is disposed, may be transparent. According to various embodiments, the fingerprint sensor 180 includes a light emitting unit and a light receiving unit, and may radiate light by using the light emitting unit in correspondence to the control of the processor, may receive light reflected in correspondence to the radiated light, and may collect image information that is necessary for fingerprint verification (or fingerprint approval).

As described above, the electronic device 100 having the fingerprint verification function may collect image information that is necessary for fingerprint verification by using light reflected after the light is radiated from a pixel included in the display 160. In this regard, the fingerprint sensor 180 may be located below locations of the pixels of the display 160, and may collect and process light that returns through a transparent substrate in which pixels are disposed.

Figure 2:
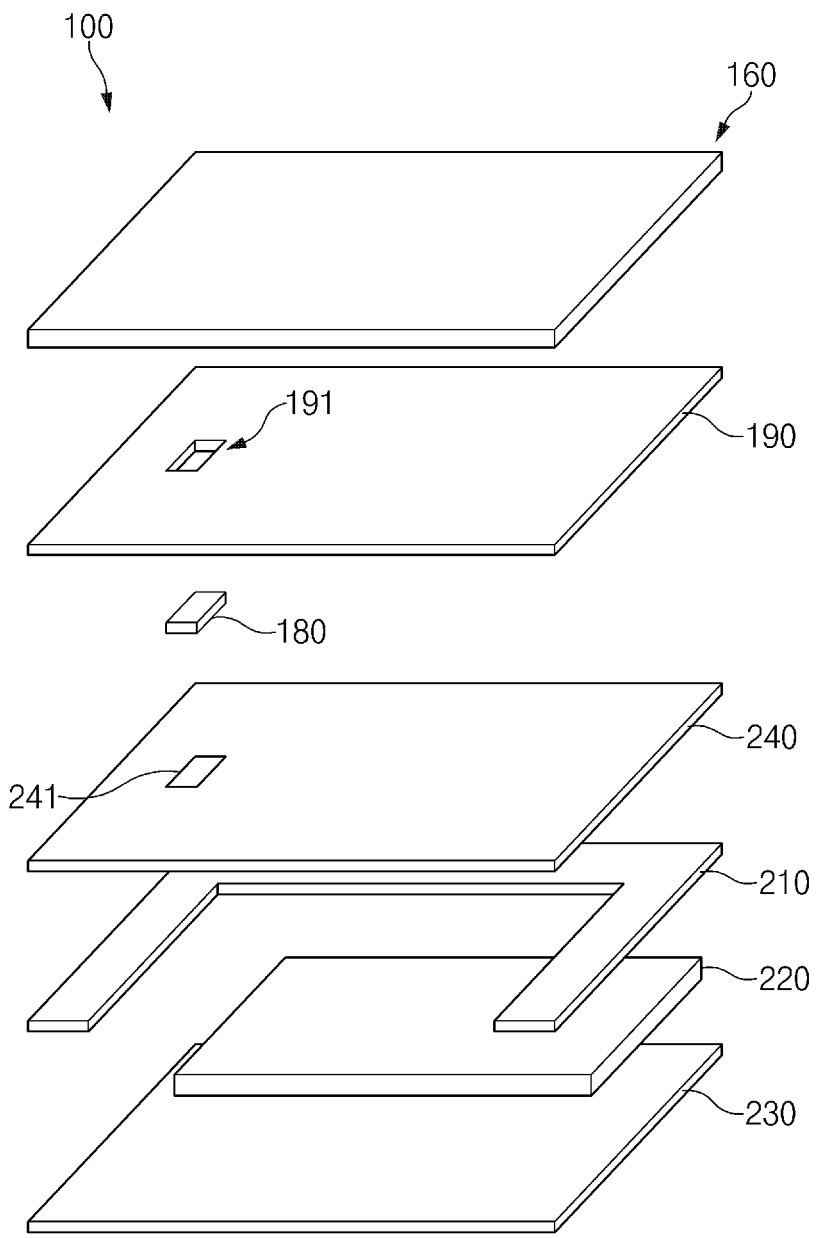
FIG. 2 is a view illustrating an example of an exploded perspective view of an electronic device according to an embodiment of the present disclosure.

FIG. 2 is a view illustrating an example of an exploded perspective view of an electronic device according to an embodiment of the present disclosure.

Referring to FIG. 2, the electronic device 100 according to an embodiment of the present disclosure may include a display 160, a rear panel 190, a fingerprint sensor 180, a printed circuit board 210, a battery 220, and a rear cover 230. The electronic device 100 may further include a case surrounding side surfaces of the display 160. The electronic device 100 may further include a bracket 240 fixing the display 160, the rear panel 190, the printed circuit board 210, and the battery 220 between the rear panel 190 and the printed circuit board 210. The bracket 240 may be provided as a part of the case (e.g., integrally formed with the case) or may include the case.

The display 160 may include a plurality of pixels disposed in a matrix form, wiring lines adapted (or configured) to supply electric power to the pixels, a display driver integrated-chip (DDI) adapted to supply a signal to the wiring lines, and a substrate on which the pixels, the wiring lines, and the DDI are positioned. At least an area of the display 160 may be transparent (or have a specific transparency). For example, the gaps between the wiring lines of the display 160 may have a specific transparency such that light may pass through the gaps. The display 160 may occupy at least a portion of a front surface of the electronic device 100. The pixels disposed in the display 160 may radiate light based on the control of the processor or the DDI. The light radiated from the pixel is reflected by an object (e.g., a finger) disposed on a front surface of the display 160, and may be delivered to the light receiving unit of the fingerprint sensor 180 after passing through the display 160.

The fingerprint sensor 180 may include an external appearance or a housing of a specific size. The fingerprint sensor 180 is disposed under the rear panel 190 located under the display 160, and may face an area of the display 160 through a sensor disposition area 191 (e.g., a hole) formed in the rear panel 190. Based on the above-described structure, the fingerprint sensor 180 may sense a fingerprint in an area of the display 160. According to an embodiment, the fingerprint sensor 180 may be disposed on a rear surface of the display 160, at least an area of which is formed to be transparent through a sensor disposition area 191 to collect light introduced through the display 160. For example, the fingerprint sensor 180 may be radiated from at least one pixel (or at least one pixel disposed in a fingerprint authentication area) included in the display 160 and may receive light reflected by an object located in a fingerprint authentication area through the sensor disposition area 191. The fingerprint authentication area may include an area of the display 160, in which the fingerprint sensor 180 is disposed. Further, the fingerprint authentication area may include an area of the display 160 of a specific size, which faces the fingerprint sensor 180, and may further include a peripheral area (an area that is larger than an area corresponding to the size of the fingerprint sensor 180 by a specific size or more) of a specific size, which is touched by a finger of the user or the like with respect to the display area facing the fingerprint sensor 180.

According to various embodiments, the fingerprint sensor 180 may include a light emitting unit that may radiate light related to fingerprint authentication, and a light receiving unit that may collect the radiated light. If the light is collected, the fingerprint sensor 180 may produce image information corresponding to the collected light, and may deliver the produced image information to a processor disposed in the printed circuit board 210. According to various embodiments, the fingerprint sensor 180 may deliver an event (e.g., information indicating whether image information is acquired) on acquisition of image information to the DDI included in the display 160. In this regard, the electronic device 100 may further include a signal line that may deliver the event between the fingerprint sensor 180 and the DDI.

The rear panel 190 may be disposed on a rear surface of the display 160 to protect the display 160 from an impact or emit heat generated by the display 160. For example, the rear panel 190 may include a protective layer having an embossing pattern, and a heat radiating layer, at least a portion of which is metallic. The rear panel 190 according to an embodiment of the present disclosure may include a hole type sensor disposition area 191, into which the fingerprint sensor 180 is inserted or which is vertically aligned with at least a portion of the fingerprint sensor 180. The sensor disposition area 191 may include a hole passing through the front and rear surfaces of the rear panel 190 while having a specific size corresponding to the size of the fingerprint sensor 180.

The bracket 240 may be disposed between the rear panel 190 and the printed circuit board 210. The bracket 240 may include a first sensor seating area 241a, in which the fingerprint sensor 180 is seated to be fixed. The first sensor seating area 241a, for example, may have a hole shape passing through the front and rear surfaces of the bracket 240 or a recess shape engraved by a specific depth while having a specific size corresponding to the size of the fingerprint sensor 180. When the first sensor seating area 241a has a recess shape, the bracket 240 may further include a wiring hole or a wiring recess in which wiring lines for electrical connection of the seated fingerprint sensor 180 and the processor disposed in the printed circuit board 210 are disposed.

The printed circuit board 210 may be disposed under the bracket 240. One or more hardware components (e.g., a camera module, a microphone, a speaker, and a USB interface) of the electronic device 100 may be disposed in the printed circuit board 210. According to an embodiment, a processor adapted (or configured) to perform processing related to fingerprint authentication may be disposed in the printed circuit board 210. Further, the printed circuit board 210 may include a contact point electrically connected to the battery 220, and may include a wiring line that may deliver electric power provided by the battery 220 to the fingerprint sensor 180 and the display 160. The processor disposed in the printed circuit board 210 may be connected to the display 160. The processor may output a fingerprint authentication guide UI (or a fingerprint authentication guide object or a fingerprint authentication guide explanation image) on the display 160 in correspondence to a request for fingerprint authentication. The processor may control a screen of the display 160 or control at least one of the luminance and color of the fingerprint authentication area such that the fingerprint authentication area has a specific luminance and a specific color during a fingerprint authentication process.

The battery 220 may be disposed in a layer that is under the rear panel 190 and parallel to the printed circuit board 210. The battery 220 may supply electric power to the printed circuit board 210 electrically connected to the battery 220, and may supply electric power to components (e.g., the display 160 and the fingerprint sensor 180) in correspondence to the control of the processor.

The rear cover 230 may be disposed under the printed circuit board 210 and the battery 220 to at least partially surround the printed circuit board 210 and the battery 220. The rear cover 230 may be formed of various materials (e.g., plastic, metal, or glass). The rear cover 230 may be fixed to the above-described case or bracket.

Figure 3:
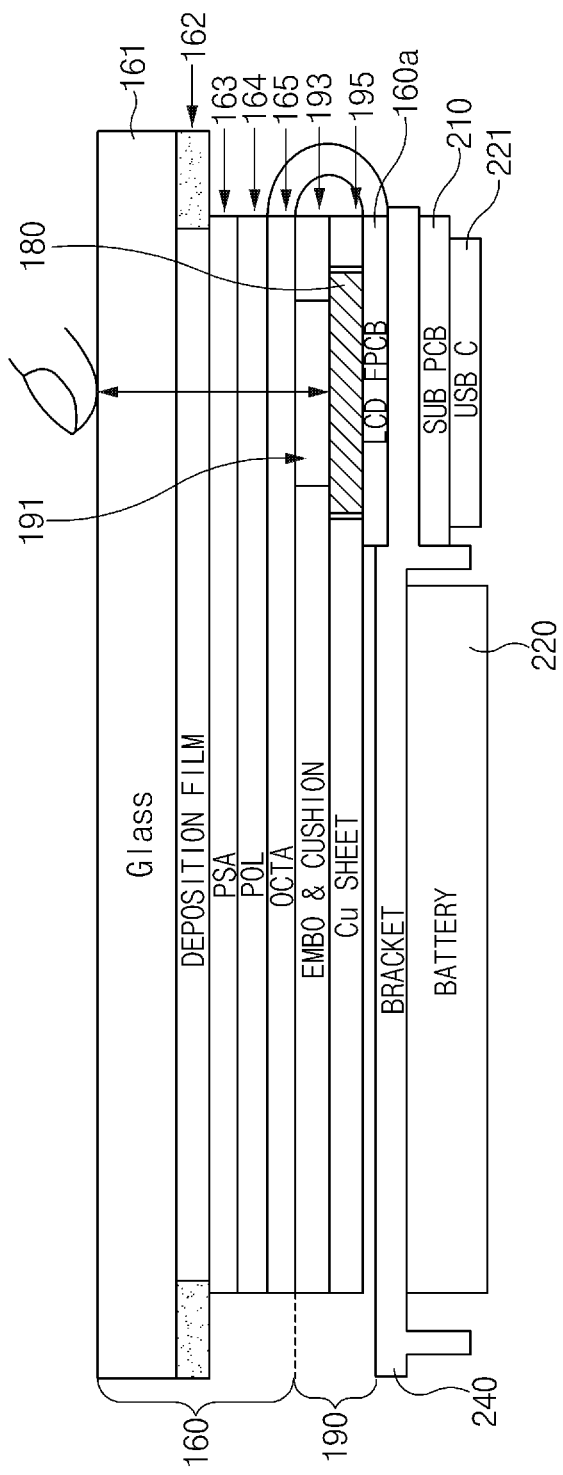
FIG. 3 is a view illustrating an example of disposition of a fingerprint sensor of an electronic device according to an embodiment of the present disclosure.

FIG. 3 is a view illustrating an example of disposition of a fingerprint sensor of an electronic device according to an embodiment of the present disclosure.

Referring to FIG. 3, the electronic device 100 according to the present disclosure may include a display 160, a rear panel 190, a fingerprint sensor 180, a bracket 240, a battery 220, and a printed circuit board 210.

The display 160 may include an external protective layer 161 (e.g., a cover glass), a design layer 162, a bonding layer (e.g., a pressure sensitive adhesive), a polarizer layer 164, and a display panel 165. Here, the design layer 162 may be omitted, through a change in a design method. The external protective layer 161 may be formed of a transparent material, such as glass or a polymer. The external protective layer 161 may correspond to 0.1 t to 1.0 t (for example, 0.5 t ("t" means millimeter)). The design layer 162 may be a layer in which a logo or the like is printed. The remaining areas of the design layer 162, except for the area in which a logo or the like is disposed, may be transparent. The bonding layer 163 may be disposed between the design layer 162 and the polarizer layer 164 to fix the design layer 162 to the polarizer layer 164. The bonding layer 163 may correspond to 0.05 t to 0.3 t (for example, 0.15 t (mm)) The polarizer layer 614 may transmit light of a specific frequency (or a wavelength) of light introduced from the external protective layer 161 or light radiated from the display panel 165 to the ambient environment or outside. The polarizer layer 164 may correspond to 0.05 t to 0.3 t (for example, 0.147 t (mm))

The display panel 165 may include a touch sensor and a display unit. The display panel 165 may correspond to 0.1 t to 0.3 t (for example, 0.14 t (mm)) The touch sensor may be disposed in a matrix form. The touch sensor may be electrically connected to a touch driving module. The touch driving module, for example, may be positioned in the printed circuit board, may be electrically connected to the touch sensor, or may be electrically connected to the touch sensor and the printed circuit board through a flexible printed circuit board. The display unit may include at least one pixel. The display unit, for example, may include OLED based pixels that may emit light by themselves. The display unit may output light related to a specific image in correspondence to control of the processor or the display driver IC (DDI) based on the electric power supplied by the battery 220. The display panel 165 may further include a display driving module 160a in which the DDI related to the control of the display unit is disposed. The display driving module 160a may be connected to the printed circuit board 210 through the flexible printed circuit board.

The fingerprint sensor 180 may be seated in the sensor disposition area 191 in which a hole is formed by removing the protective layer 193 and the heat radiating layer 195 of the rear panel 190. Further, the fingerprint sensor 180 may be arranged under the sensor disposition area 191 of the rear panel 190. The fingerprint sensor 180 may collect light radiated from the pixels of the display panel 165 and introduced to the rear surface of the display 160 through a transparent area of the display 160. The fingerprint sensor 180, for example, may be disposed on the display driving module 160a. According to various embodiments, the electronic device 100 may further include a wiring line that may deliver image information generated by the fingerprint sensor 180 to the processor. The wiring line connected to the fingerprint sensor 180, for example, may be disposed on one side of the display driving module 160a and may be electrically connected to the processor of the printed circuit board 210. According to various embodiments, the electronic device 100 may include a wiring line electrically connected to the DDI included in the display driving module 160a. The fingerprint sensor 180 may deliver an event based on recognition of an approach of a finger to the DDI through the wiring line. In relation to the determination of the approach of the finger, if the fingerprint sensor 180 delivers image information to the processor, the processor may determine an approach of an object based on the acquired image information. According to an embodiment, the processor may determine an approach of an object (or an approach of a finger) if the intensity of illumination of a fingerprint authentication area decreases to a specific intensity of illumination or less.

The rear panel 190 may be disposed on the whole rear surface of the display 160, except for an area in which the fingerprint sensor 180 is disposed. As described above, the rear panel 190 may include a protective layer having an embossing pattern, and a heat radiating layer (e.g., a copper layer) having a heat radiating function. The protective layer 913 may restrain or prevent an impact from being applied to the display panel 165 based on the embossing pattern, or may improve the visibility of the display panel 165. The protective layer 913 may correspond to 0.1 t to 0.3 t (for example, 0.14 t (mm)) The heat radiating layer 195 may be electrically connected to the display driving module 160a to function as a ground of the display driving module 160a. The heat radiating layer 195 may correspond to 0.02 t to 0.1 t (for example, 0.04 t (mm))

The bracket 240 may support the display 160 while electrically insulating the rear panel 190, the printed circuit board 210, or the battery 220. At least a portion of the bracket 240 may be formed of a nonmetallic material, and the remaining areas (e.g., a side surface of the case) of the bracket 240 may be formed of a metallic material. For example, the whole bracket 240 may be formed of a nonmetallic material, or may be formed of a metallic material.

The battery 220 may be seated in and fixed to one side of the bracket 240. The printed circuit board 210 may include a sub-printed circuit board, to which a USB interface 221 is coupled. According to various embodiments, the printed circuit board 210 may further include a main printed circuit board, which is electrically connected to the sub-printed circuit board and in which the processor is disposed.

Although FIG. 3 illustrates that the fingerprint sensor 180 is disposed on the bracket 240 in an area in which the USB interface 221 is disposed, the present disclosure is not limited thereto. At least a portion of the fingerprint sensor 180 may be disposed on the bracket 240 in an area in which the battery 220 is disposed.

Figure 4:
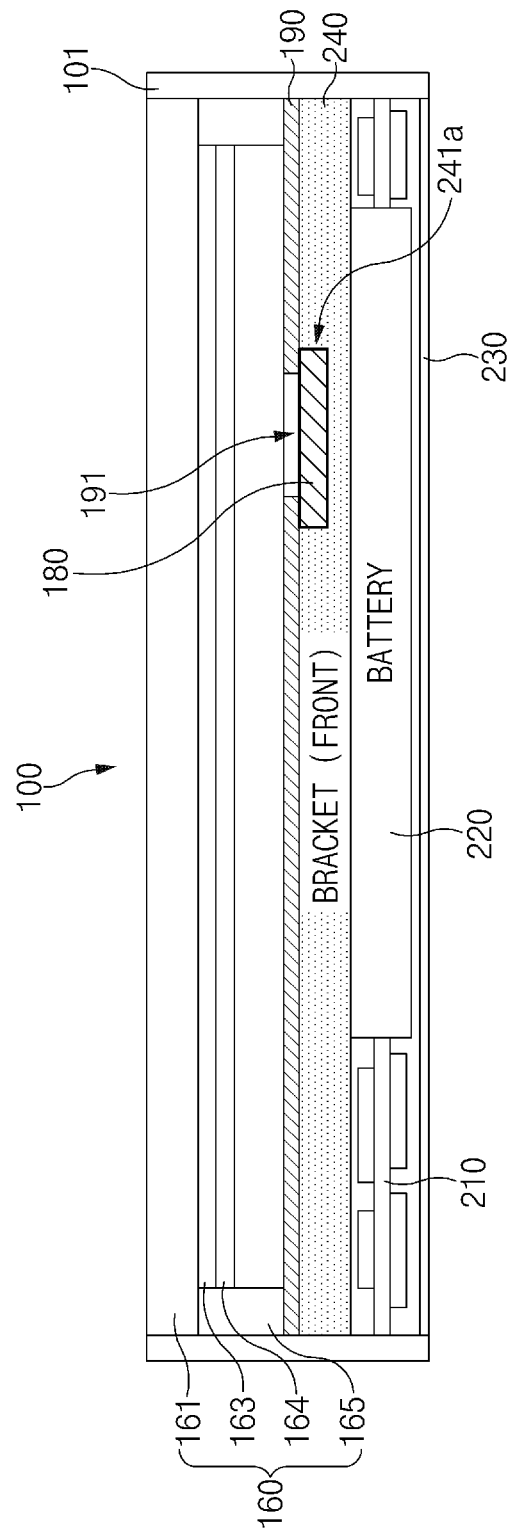
FIG. 4 is a view illustrating a second example of disposition of a fingerprint sensor of an electronic device according to a second embodiment of the present disclosure.

FIG. 4 is a view illustrating a second example of disposition of a fingerprint sensor of an electronic device according to a second embodiment of the present disclosure.

Referring to FIG. 4, the electronic device 100 according to the present disclosure may include a case 101, a display 160, a rear panel 190, a fingerprint sensor 180, a bracket 240, a printed circuit board 210, a battery 220, and a rear cover 230.

As described above, the display 160 may include an outer protective layer 161, a bonding layer 163 (e.g., an OCA), a polarizer layer 164, and a display panel 165. In addition, the display 160 may further include a design layer in which a logo or the like is printed based on a design method. At least a portion (e.g., a fingerprint authentication area in which the fingerprint sensor 180 is disposed) of the above-described display 160 may be transparent. Light radiated from at least one pixel (e.g., pixels disposed in the fingerprint authentication area or pixels disposed in an area including the fingerprint authentication area) included in the display panel 165 of the display 160 may be introduced into the fingerprint sensor 180 after passing through the interior of the transparent display 160.

The rear panel 190 may be disposed under the display 160 and may include a sensor disposition area 191. The fingerprint sensor 180 may be disposed under the sensor disposition area 191. Through the sensor disposition area 191, the fingerprint sensor 180 may collect at least a portion of the light passing through the display 160.

The fingerprint sensor 180 may be disposed under the rear panel 190, and as illustrated, may be disposed in a first sensor seating area 142a provided on one side of the bracket 240. At least a portion (e.g., the light receiving unit that may collect light) of an upper portion of the fingerprint sensor 180 may be exposed through the sensor disposition area 191 of the rear panel 190. Further, when the fingerprint sensor 180 is provided in a form including both the light emitting unit and the light receiving unit, a part in which the light emitting unit and the light receiving unit are disposed may be exposed towards the display 160 through the sensor disposition area 191. The light introduced through the transparent area of the display 160 may be delivered to the fingerprint sensor 180 through the sensor disposition area 191.

The bracket 240 is disposed under the rear panel 190 to support the rear panel 190, the display 160, and the like. At least a portion of the bracket 240 may be formed of a nonmetallic material or at least a portion of the bracket 240 may be formed of a metallic material. The bracket 240 may include a first sensor seating area 241a. The first sensor seating area 241a may be formed by engraving an area of a surface of the bracket 240, which is disposed towards the display 160. The depth of the first sensor seating area 241a may correspond to the height of the fingerprint sensor 180. The area of the first sensor seating area 241a may correspond to the size of the fingerprint sensor 180. According to various embodiments, the first sensor seating area 241a may include at least one of a wiring recess or a wiring hole, in which the wiring lines of the seated fingerprint sensor 180 are disposed. The wiring recess or the wiring hole may function as a passage electrically connecting the wiring lines connected to the fingerprint sensor 180, to the printed circuit board 210 disposed under the bracket 240. Further, a wiring line electrically connecting the display driving module disposed in the display 160 and the fingerprint sensor 180 may be disposed in the wiring recess or the wiring hole disposed in the first sensor seating area 241a.

The printed circuit board 210 may be disposed under the bracket 240, and may be electrically connected to the display 160 and the fingerprint sensor 180. The processor related to driving of the display 160 and driving of the fingerprint sensor 180 may be seated in the printed circuit board 210. The battery 220 may be disposed in a layer that is under the bracket 240 and parallel to the printed circuit board 210. The rear cover 230 may surround the printed circuit board 210, the battery 220, and the like.

Figure 5:
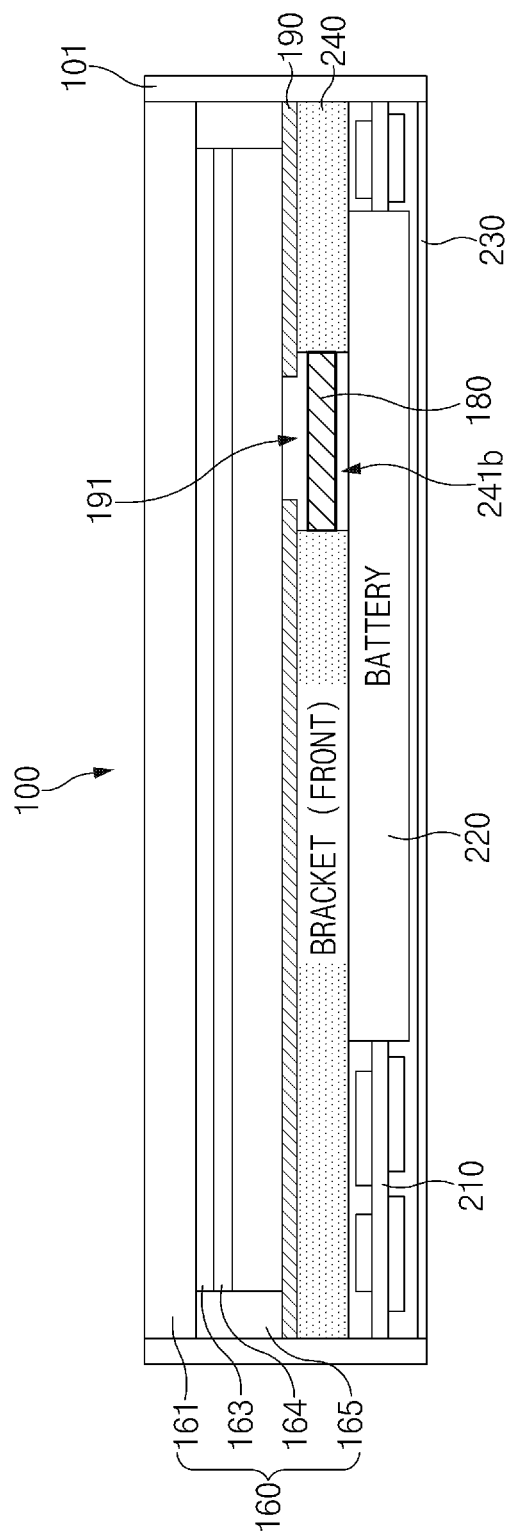
FIG. 5 is a view illustrating a third example of disposition of a fingerprint sensor of an electronic device according to an embodiment of the present disclosure.

FIG. 5 is a view illustrating a third example of disposition of a fingerprint sensor of an electronic device according to an embodiment of the present disclosure;

Referring to FIG. 5, the electronic device 100 according to the present disclosure may include a case 101, a display 160, a rear panel 190, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4. Further, the fingerprint sensor 180 may be arranged under the sensor disposition area 191 of the rear pane 190.

The bracket 240 may include a second sensor seating area 241b, in which the fingerprint sensor 180 is disposed. The second sensor seating area 241b may have a hole shape passing through the front and rear surfaces of the bracket 240. The fingerprint sensor 180 may be seated in and fixed to the second sensor seating area 241b. Accordingly, the area of the second sensor seating area 241b may correspond to an area corresponding to the size of the fingerprint sensor 180. According to various embodiments, a bonding layer may be disposed between a side surface of the second sensor seating area 241b and the fingerprint sensor 180 such that the fingerprint sensor 180 may be fixed to the second sensor seating area 241b.

The front surface of the fingerprint sensor 180 may be fixed at the same height as that of the bracket 240 to be relatively close to the display 160. The light receiving unit of the fingerprint sensor 180 may be disposed at the center of the fingerprint sensor 180. The light receiving unit of the fingerprint sensor 180 may face an area of the display 160 through the sensor disposition area 191 of the rear panel 190.

Figure 6A:
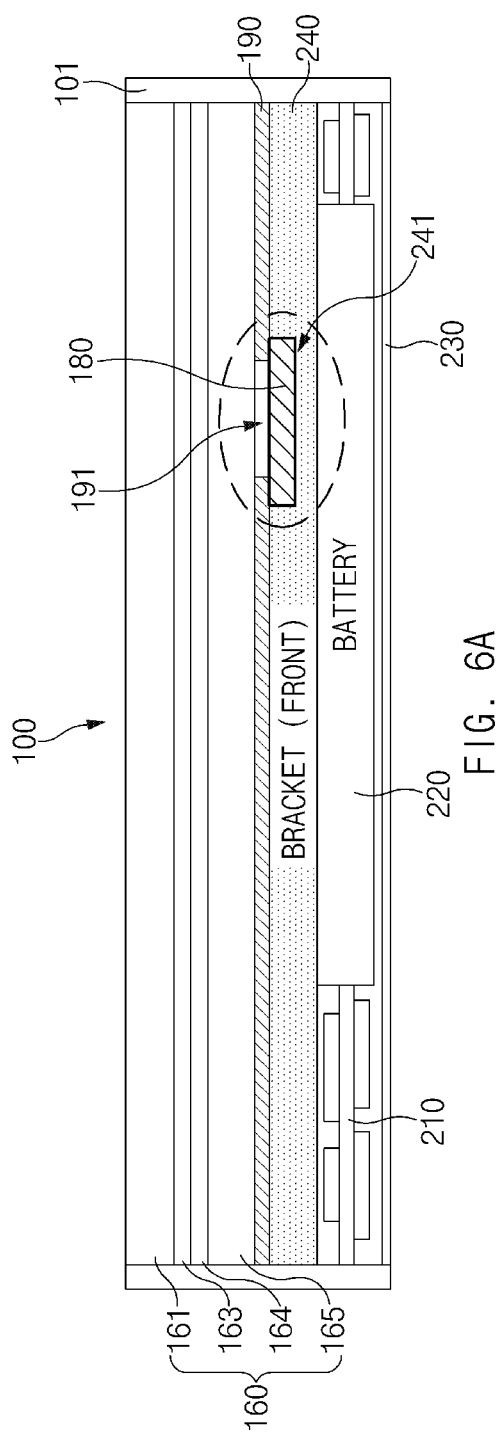
FIGS. 6A-6C are views illustrating an example of a fingerprint sensor fixing structure of an electronic device according to an embodiment of the present disclosure.
Figure 6B:
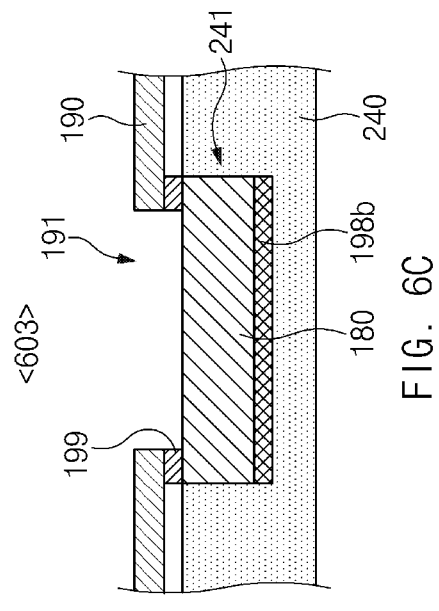
Figure 6C:
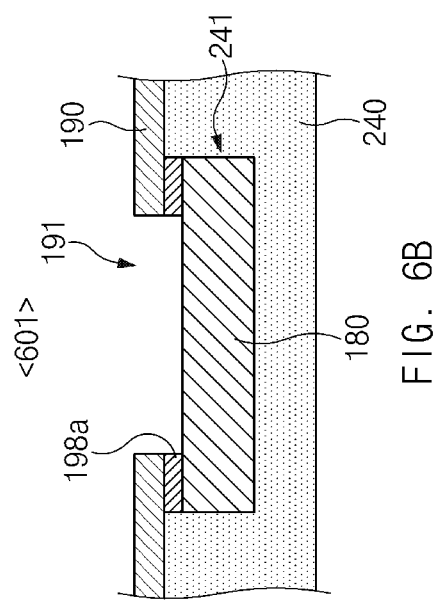

FIGS. 6A-6C are views illustrating an example of a fingerprint sensor fixing structure of an electronic device according to an embodiment of the present disclosure;

The electronic device 100 according to the present disclosure may include a case 101, a display 160, a rear panel 190, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4. The fingerprint sensor 180 may be aligned with the sensor disposition area 191 of the rear panel 190 to face an area (e.g., a transparent area) of the display 160. The fingerprint sensor 180 may be seated in the first sensor seating area 241a.

According to an embodiment, the fingerprint sensor 180 may be fixed to the rear panel 190 as in state 601. The light receiving unit (or the light emitting unit and the light receiving unit) of the fingerprint sensor 180 may be disposed at the center of a fingerprint sensor housing. Accordingly, one side of the sensor bonding layer 198a, except for a central area of the fingerprint sensor housing in which the light receiving unit is disposed, may be bonded to a peripheral area of the fingerprint sensor housing. An opposite side of the sensor bonding layer 198a may be bonded to a periphery of the sensor disposition area 191 of the rear panel 190 disposed on the fingerprint sensor 180.

The fingerprint sensor 180 may be seated in and fixed to the above-described sensor seating area 241. Then, a bonding material is applied to an inside of the sensor seating area 241 to fix the fingerprint sensor 180. Further, the sensor seating area 241 may have the same size as that of the fingerprint sensor 180 such that the fingerprint sensor 180 may be interference-fitted with the sensor seating area 241.

According to an embodiment, the fingerprint sensor 180 may be fixed to the bracket 240 as in state 603. For example, the fingerprint sensor 180 may include a sensor bonding layer 198b disposed at least a portion of the rear surface or the side surface thereof. The fingerprint sensor 180 provided with the sensor bonding layer 198b may be bonded to the sensor seating area 241 of the bracket 240. Additionally, a sealant 199 that may remove an aperture (empty space) between the fingerprint sensor 180 and the rear panel 190 may be disposed. The sealant 199 may have an annular shape (e.g., an elliptical ring or polygonal ring shape), and may be disposed at a peripheral portion of the fingerprint sensor 180. An area in which the sealant 199 is disposed may be an area except for a central area in which the light receiving unit (or the light emitting unit and the light receiving unit) of the fingerprint sensor 180 is disposed. The sealant 199 is disposed based on a selective design, and may be omitted based on a design policy. Further, the sealant 199 may include a bonding substance to fix the fingerprint sensor 180 to the rear panel 190.

Figure 7:
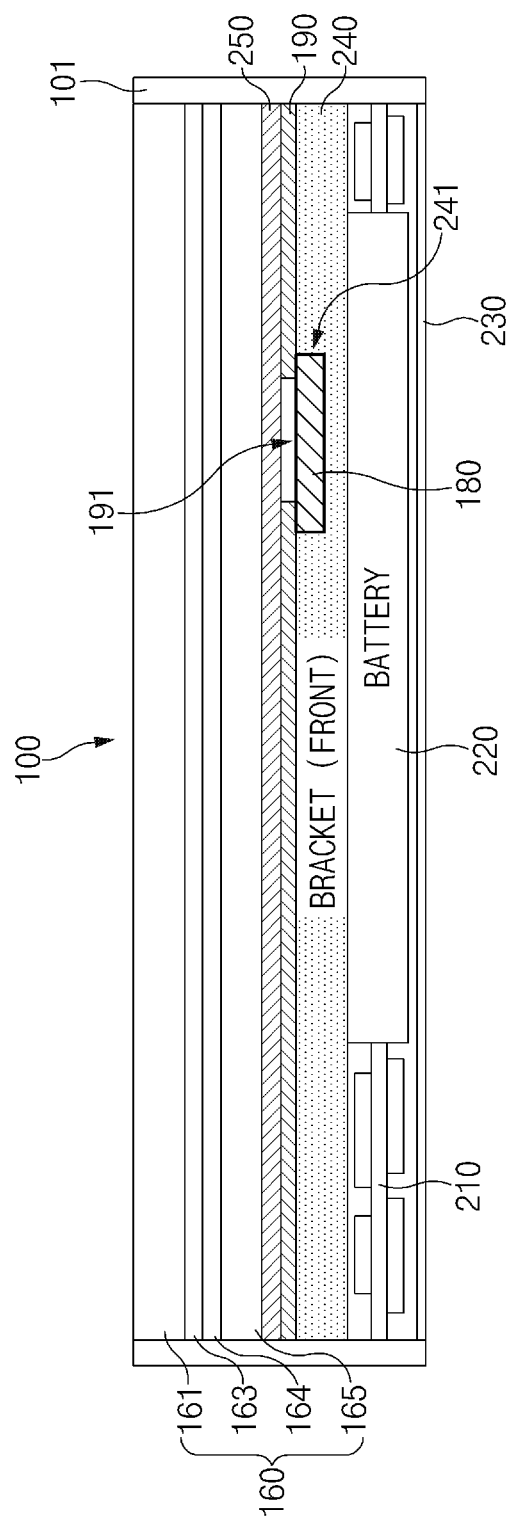
FIG. 7 is a view illustrating an example of disposition of a wavelength selection substrate of an electronic device according to an embodiment of the present disclosure.

FIG. 7 is a view illustrating an example of disposition of a wavelength selection substrate of an electronic device according to an embodiment of the present disclosure.

Referring to FIG. 7, the electronic device 100 according to the present disclosure may include a case 101, a display 160, a wavelength selection substrate 250 a rear panel 190, a fingerprint sensor 180, a bracket 240, a printed circuit board 210, a battery 220, and a rear cover 230. The wavelength selection substrate 250 may be selectively applied based on a change in a design method. For example, the wavelength selection substrate 250 may be removed, and a disposition location thereof may be changed.

As described above, the display 160 may include an outer protective layer 161, a bonding layer 163 (e.g., an OCA), a polarizer layer 164, and a display panel 165. At least a portion (e.g., a fingerprint authentication area in which the fingerprint sensor 180 is disposed) of the above-described display 160 may be transparent. Light radiated from at least one pixel (e.g., pixels disposed in the fingerprint authentication area or pixels disposed in an area including the fingerprint authentication area) included in the display panel 165 of the display 160 may be introduced into the fingerprint sensor 180 after passing through the interior of the transparent display 160.

The wavelength selection substrate 250 may be disposed under the display panel 165 of the display 160. For example, the wavelength selection substrate 250 may be disposed on a whole lower area (or a whole lower area of an active area of the display panel 165, in which pixels are disposed) of the display panel 165. The wavelength selection substrate 250 may include a substrate adapted to transmit a specific frequency band of a frequency spectrum of light radiated from at least one pixel. According to an embodiment, the wavelength selection substrate 250 may transmit at least some frequency bands (or wavelength bands) corresponding to a visible ray band. For example, the wavelength selection substrate 250 may transmit a wavelength band of 500 nm to 800 nm, a wavelength band of a transmissivity of 3% or more, or a frequency band of green series. Further, the wavelength selection substrate 250 may transmit even frequencies corresponding to colors located on the left and right sides of the frequencies of green series in a range. The rear panel 190 disposed under the wavelength selection substrate 250 includes a sensor disposition area 191 (e.g., a hole), and accordingly, light of a specific frequency band, which has passed through the wavelength selection substrate 250, may be delivered to the fingerprint sensor 180 through the sensor disposition area 191. As described above, the wavelength selection substrate 250 may be omitted. Further, in the drawing, a location of the wavelength selection substrate 250 may be changed to another location.

The rear panel 190 may be disposed under the wavelength selection substrate 250 and may include a sensor disposition area 191. The fingerprint sensor 180 may be disposed under the sensor disposition area 191. Through the sensor disposition area 191, the fingerprint sensor 180 may collect at least a portion of the light passing through the display 160.

The fingerprint sensor 180 may be disposed under the rear panel 190, and as illustrated, may be disposed in a sensor seating area 241 provided on one side of the bracket 240. At least a portion (e.g., the light receiving unit or the light emitting unit and the light receiving unit that may collect light) of an upper portion of the fingerprint sensor 180 may be exposed through the sensor disposition area 191 of the rear panel 190.

The bracket 240 is disposed under the rear panel 190 to support the rear panel 190, the display 160, and the like. The printed circuit board 210 may be disposed under the bracket 240, and may be electrically connected to the display 160 and the fingerprint sensor 180. The processor related to driving of the display 160 and driving of the fingerprint sensor 180 may be seated in the printed circuit board 210. The battery 220 may be disposed in a layer that is under the bracket 240 and parallel to the printed circuit board 210. The rear cover 230 may surround the printed circuit board 210, the battery 220, and the like.

As described above, in the electronic device 100 according to an embodiment of the present disclosure, the wavelength selection substrate 250 may be disposed in the whole lower area of the display 160 to maximize the amount of light of a specific frequency band, which is introduced into the fingerprint sensor 180.

Figure 8:
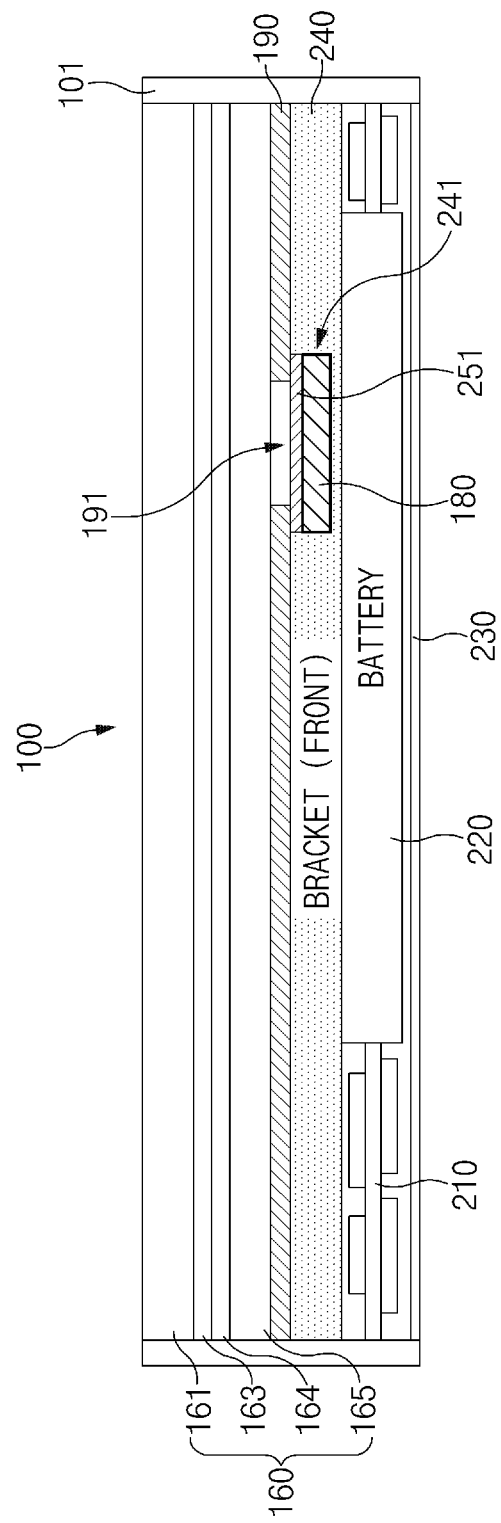
FIG. 8 is a view illustrating a second example of disposition of a wavelength selection substrate of an electronic device according to an embodiment of the present disclosure.

FIG. 8 is a view illustrating a second example of disposition of a wavelength selection substrate of an electronic device according to an embodiment of the present disclosure;

Referring to FIG. 8, the electronic device 100 according to the present disclosure may include a case 101, a display 160, a rear panel 190, a wavelength selection unit 251, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4.

The wavelength selection unit 251, for example, may be disposed on the fingerprint sensor 180. The wavelength selection unit 251 may have the same function as that of the above-described wavelength selection substrate 250 (e.g., a function of transmitting light of a specific wavelength band, for example, a function of transmitting a wavelength band of 500 nm to 800 nm, a wavelength band of a transmissivity of 3% or more, or a frequency band of a green series color). The wavelength selection unit 251 may have a size corresponding to the whole size of the fingerprint sensor 180, and may be disposed on the fingerprint sensor 180. Further, the wavelength selection unit 251 may be attached to the front surface of the fingerprint sensor 180.

The fingerprint sensor 180, in which the wavelength selection unit 251 is disposed on the front surface thereof, may be disposed on one side of the bracket 240. For example, the fingerprint sensor 180 may be disposed in a sensor seating area 241 provided in the bracket 240.

The bracket 240 may include a sensor seating area 241 disposed under the rear panel 190 and in which the fingerprint sensor 180 is seated on one side thereof. The depth of the sensor seating area 241 may have a height corresponding to the heights of the fingerprint sensor 180 and the wavelength selection unit 251. In order to fix the fingerprint sensor 180 to the sensor seating area 241, a bonding layer may be disposed in at least an area between an inner wall of the sensor seating area 241 and the fingerprint sensor 180.

Figure 9A:
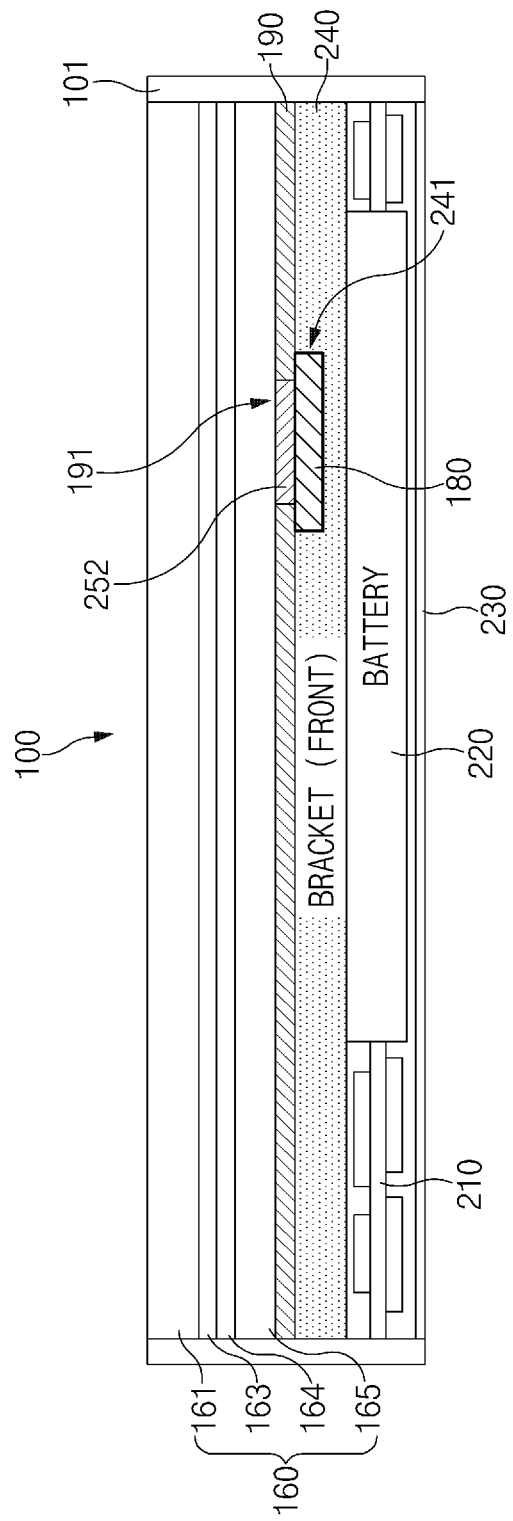
FIG. 9A is a view illustrating a third example of disposition of a wavelength selection substrate of an electronic device according to an embodiment of the present disclosure.

FIG. 9A is a view illustrating a third example of disposition of a wavelength selection substrate of an electronic device according to an embodiment of the present disclosure;

Referring to FIG. 9A, the electronic device 100 according to the present disclosure may include a case 101, a display 160, a rear panel 190, a wavelength selection unit 252, a fingerprint sensor 180, a bracket 240, a printed circuit board 210, a battery 220, and a rear cover 230. The display 160, the printed circuit board 210, the battery 220, and the rear cover 230 may have the same configurations as those of FIG. 4.

The rear panel 190 may be disposed under the display 160 to protect the display 160 or emit heat generated by the display 160. The rear panel 190 may include a sensor disposition area 191 (e.g., a hole) such that the fingerprint sensor 180 faces the display 160.

The wavelength selection unit 252 may be disposed on one side of the sensor disposition area 191. For example, the wavelength selection unit 252 may be disposed parallel to the rear panel 190 while being inserted into the sensor disposition area 191. The wavelength selection unit 252 may have a size corresponding to the size of the sensor disposition area 191. The wavelength selection unit 252 may be fixed to the sensor disposition area 191. The fingerprint sensor 180 may be disposed under the sensor disposition area 191 in which the wavelength selection unit 252 is disposed. The fingerprint sensor 180 may be seated in the sensor seating area 241 of the bracket 240. Accordingly, if light is radiated from a pixel of the display 160, only light corresponding to a specific band, which is radiated from the pixel may be transmitted while passing through the wavelength selection unit 252 disposed in the sensor disposition area 191. Some light may be delivered to the fingerprint sensor 180.

Figure 9B:
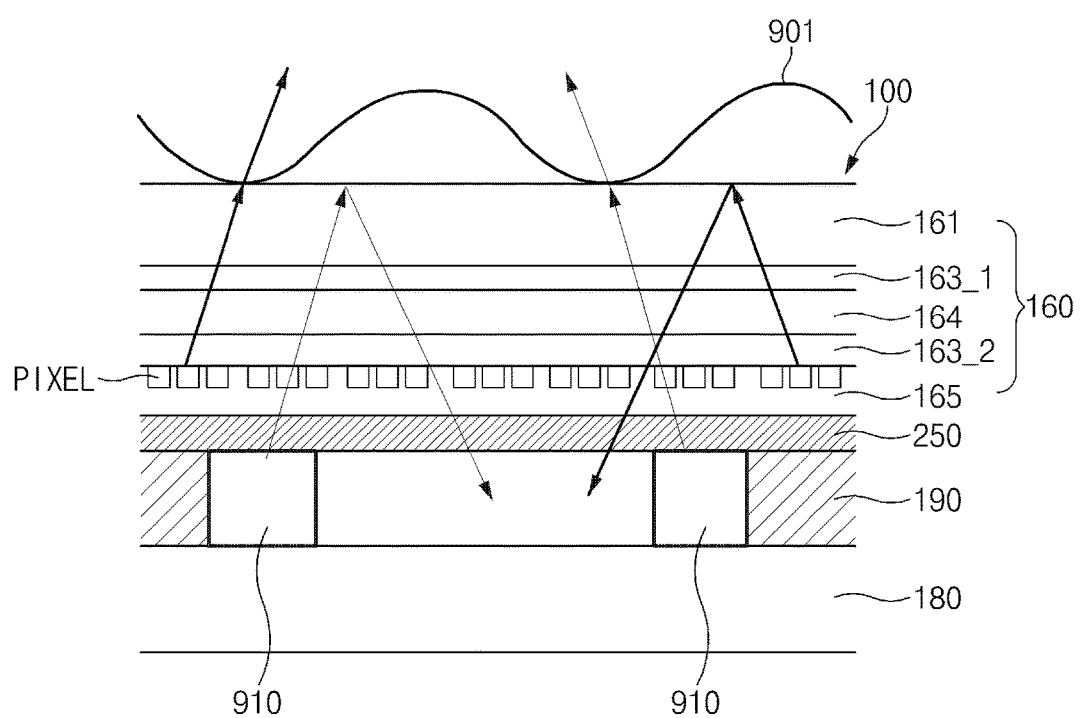
FIG. 9B is a view illustrating a light path related to fingerprint authentication according to an embodiment of the present disclosure.

FIG. 9B is a view illustrating a light path related to fingerprint authentication according to an embodiment of the present disclosure;

Referring to FIG. 9B, while an object 901 including a fingerprint is positioned at a specific point (e.g., the external protective layer 161) on the display of the electronic device 100, the light generated by at least one pixel of the display panel 165 may be radiated upwards with respect to the drawing. The travel direction of light of the light radiated upwards, which collides with the object 901, may be changed. For example, light of the light radiated from the pixel, which is reflected by the object 901, may travel to an area in which the fingerprint sensor 180 is located. Then, the light reflected by the object 901 may pass through a first bonding layer 163_1, the polarizer layer 164, a second bonding layer 163_1, and the display panel 165, and may be delivered to the fingerprint sensor 180 through the wavelength selection substrate 250 and the sensor disposition area 191 of the rear panel 190. In this process, light (e.g., a noise source) of a wavelength band, which is not used for sensing a fingerprint, of the light radiated from the pixel is filtered by the wavelength selection substrate 250, and only light of a wavelength used for sensing a fingerprint may be acquired by the fingerprint sensor 180.

Figure 10:
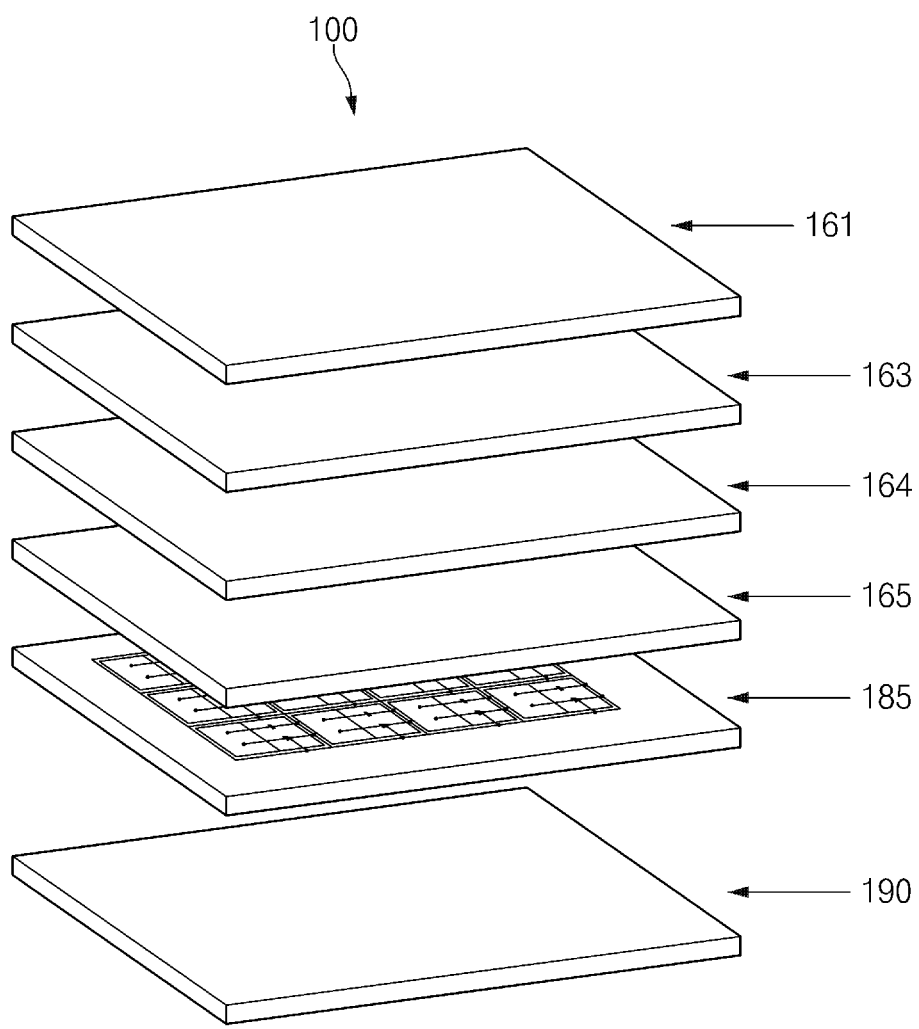
FIG. 10 is a view illustrating a configuration of an electronic device including a fingerprint sensor sheet according to an embodiment of the present disclosure.

FIG. 10 is a view illustrating a configuration of an electronic device including a fingerprint sensor substrate according to an embodiment of the present disclosure.

Referring to FIG. 10, the electronic device 100 of the present disclosure may include an external protective layer 161, a bonding layer 163, a polarizer layer 164, a display panel 165, a fingerprint sensor sheet 185 (e.g., a CMOS image sensor layer), and a rear panel 190. Additionally, the electronic device 100 may further include a bracket disposed under the rear panel 190, a printed circuit, a battery, and a rear cover. The external protective layer 161, the bonding layer 163, the polarizer layer 164, the display panel, and the rear panel 190 may have substantially the same or similar configurations as those of FIG. 2.

The fingerprint sensor sheet 185 may be a sheet in which a plurality of fingerprint sensor modules are disposed in a thin film transistor (TFT) based matrix form. The fingerprint sensor sheet 185 may be laminated under the display panel 165. The fingerprint sensor sheet 185 may collect light related to detection of a fingerprint in at least an area of the whole sheet. The fingerprint sensor sheet 185 may collect light reflected after being radiated from the pixels of the display 160, and may produce image information corresponding to a fingerprint image based on the collected light to deliver the produced image information to the processor. In a process of acquiring the fingerprint image, the fingerprint sensor sheet 185 may collect information on a location at which a fingerprint image is acquired, and may deliver the collected location information together to the processor. Further, the plurality of fingerprint sensor sheets disposed in the fingerprint sensor sheet 185 may be independently operated for areas. For example, the fingerprint sensor sheet 185 may acquire image information of an area corresponding to an area in which a finger or the like is touched in correspondence of control of the processor of the electronic device, and may deliver the acquired image information to the processor. In this regard, the fingerprint sensor sheet 185 may deliver the image collected during the fingerprint authentication operation to the processor, and may help determine an approach of the fingerprint. When the processor designates a fingerprint authentication area, the fingerprint sensor sheet 185 may deliver only image information acquired from the corresponding area to the processor. According to various embodiments, if the processor identifies an area in which the touch sensor included in the display 160 senses a touch of a finger, the fingerprint sensor sheet 185 may acquire image information in the corresponding touch area in correspondence to control of the processor.

Figure 11A:
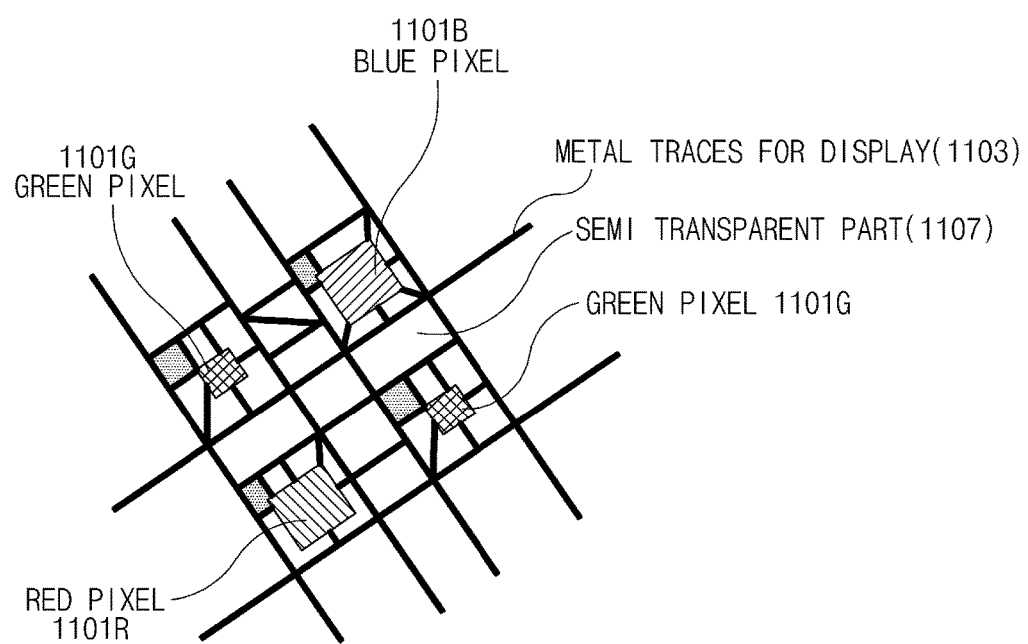
FIG. 11A is a view illustrating an example of a pixel structure of an electronic device according to an embodiment of the present disclosure.
Figure 11B:
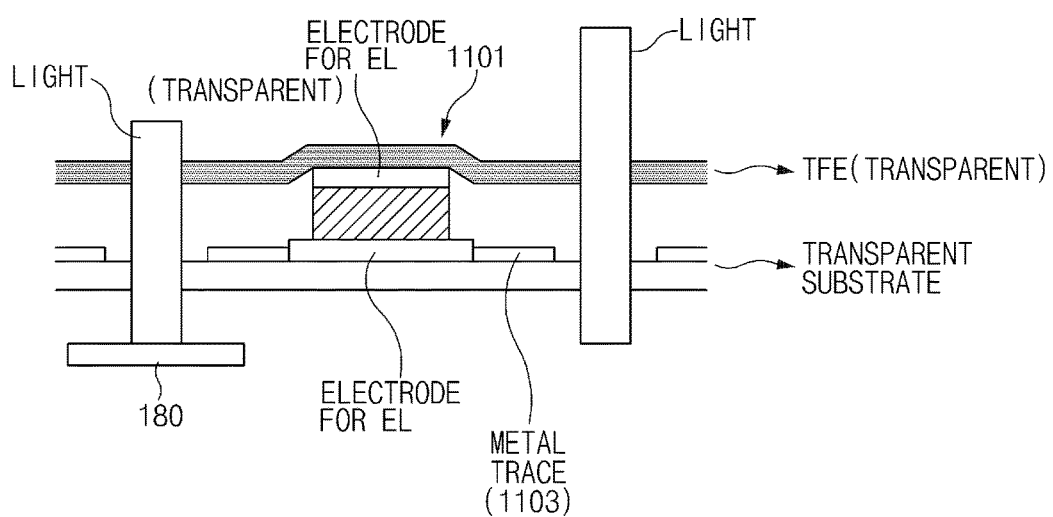
FIG. 11B is a view illustrating an operation of a fingerprint sensor in a pixel structure of an electronic device according to an embodiment of the present disclosure.

FIG. 11A is a view illustrating an example of a pixel structure of an electronic device according to an embodiment of the present disclosure. FIG. 11B is a view illustrating an operation of a fingerprint sensor in a pixel structure of an electronic device according to an embodiment of the present disclosure.

Referring to FIGS. 11A and 11B, the pixel structure of the display 160, for example, may include a plurality of sub-pixels 1101R, 1101G, and 1101B, signal lines 1103 and 1105 connecting the sub-pixels 1101R, 1101G, and 1101B, and transparent areas 1107 having a specific transparency. For example, the plurality of sub-pixels 1101R, 1101G and 1101B may include a red sub-pixel 1101R, a blue sub-pixel 1101B, and a green sub-pixel 1101E The red sub-pixel 1101R, the blue sub-pixel 1101B, and the two green sub-pixels 1101G may be operated as one pixel.

The signal lines 1103 and 1105, for example, may include a display line 1103 for controlling irradiation of light by the sub-pixels, and a touch line 1105 related to sensing of a touch. As illustrated, an area in which the sub-pixels 1101R, 1101G and 1101B and the signal lines 1103 and 1105 are not disposed may be transparent areas 1107. Through the transparent areas 1107, the light radiated from the sub-pixels 1101R, 11016 and 1101B may be reflected to be delivered to the fingerprint sensor 180 disposed on the rear surface of the display 160. The light of the pixels disposed in the fingerprint authentication area in which the fingerprint sensor 180 is located or the pixels of a peripheral area of the fingerprint authentication area may be introduced to the fingerprint sensor 180 through the transparent areas 1107 between the signal lines 1103 and 1105.

Figure 12A:
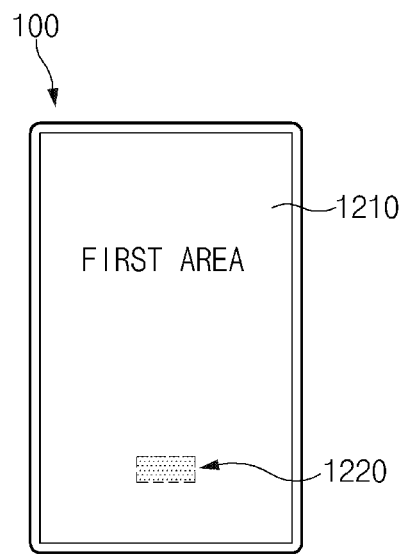
FIGS. 12A and 12B are views illustrating an example of changing a touch sensitivity of an electronic device according to an embodiment of the present disclosure.
Figure 12B:
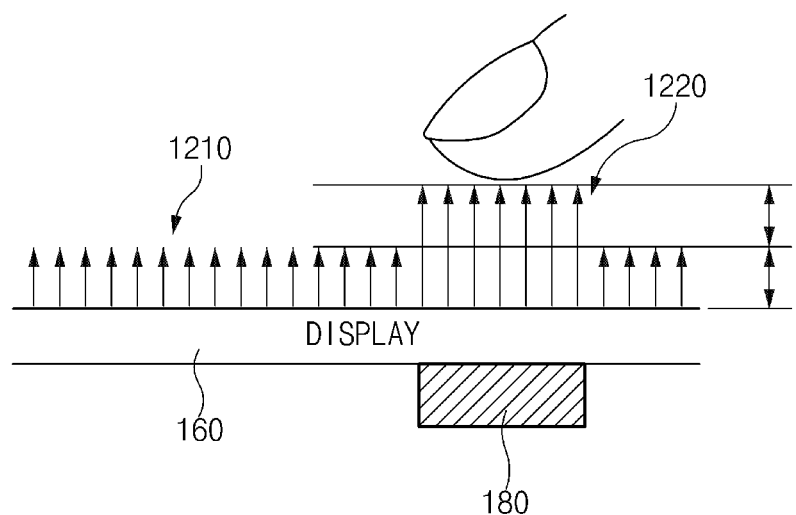

FIGS. 12A and 12B are views illustrating an example of changing a touch sensitivity of an electronic device according to an embodiment of the present disclosure.

The electronic device 100 may include a fingerprint authentication area 1220 in which a display area 1210 and the fingerprint sensor 180 are disposed for fingerprint verification. The pixels of the display 160 may be disposed in the fingerprint authentication area 1220 as in the peripheral area. The fingerprint sensor 180 may be disposed under the display 160 in the fingerprint authentication area 1220 of the display 160. The size of the fingerprint authentication area 1220 may correspond to the size by which the fingerprint sensor 180 may perform fingerprint verification. For example, when the fingerprint sensor 180 acquires a fingerprint image of a relatively wide area, the size of the fingerprint authentication area 1220 may be defined to be larger. The information of a location at which the fingerprint authentication area 1220 is disposed on the display 160 may be stored in a memory of the electronic device 100 to be managed.

The display 160 disposed in the display area 1210 and the fingerprint authentication area 1220 may include a touch sensor. Accordingly, the display area 1210 and the fingerprint authentication area 1220 may collect a touch event based on an approach of an object.

If a specific touch event occurs in a specific area of the display area 1210 or the fingerprint verification area 1220 while an application related to fingerprint verification is executed, the processor 120 of the electronic device 100 may change the color of the area (or the fingerprint verification area 1220) in which the touch event occurs to a specific color. The specific color may be a color of a wavelength band that is relatively advantageous for fingerprint authentication. If the fingerprint authentication is completed, the processor 120 may restore the color of the area in which the touch event occurs to a color before the occurrence of the touch.

According to an embodiment, the touch sensor disposed in the fingerprint authentication area 1220 may adjust a touch sensitivity in correspondence to control of the processor. For example, the touch sensitivity of the fingerprint authentication area 1220 may be adjusted more sensitively while the fingerprint authentication is requested. In this case, the processor 120 of the electronic device 100 may adjust the touch sensitivity of the whole area of the display more sensitively than in the previous state, or may adjust the touch sensitivity of an area including the fingerprint authentication area 1220 more sensitively. A hovering signal (or a hovering signal detected as an object approaches the display) generated in the fingerprint authentication area 1220 may be delivered to the processor.

For example, if fingerprint authentication is requested, the electronic device 100 may adjust the touch sensitivity of the whole display more sensitively. If a hovering signal based on an approach of an object at a specific location of the display is generated, the electronic device 100 may change a color based on the hovering signal. According to an embodiment, the electronic device 100 may change a color of an area in which a hovering signal occurs to a color of a specific wavelength band. If the hovering signal is removed, the electronic device 100 may return the color of the corresponding area to a color before the generation of the hovering signal. When a touch signal is generated in an area in which the hovering signal is generated, the electronic device 100 may maintain the currently displayed color. If the touch signal is released or the fingerprint authentication is completed, the electronic device 100 may restore the touch sensitivity to an original state (a state before the request for the fingerprint authentication). Further, if the touch signal is released or the fingerprint authentication is completed, the electronic device 100 may restore the changed color to a color before the request for the fingerprint authentication.

According to various embodiments, the processor of the electronic device 100 may adjust the touch sensitivity of the fingerprint authentication area 1220 more sensitively than in the peripheral area or than in the previous state. If a specific hovering signal is detected in the fingerprint authentication area 1220, the processor may allow the fingerprint authentication area 1220 to have a specific luminance and a specific color. If the fingerprint authentication is completed, the processor may allow the fingerprint authentication area 1220 to be a state before the fingerprint authentication operation or a state before the generation of the hovering signal. According to various embodiments, the processor may change at least one of the luminance and the color of the fingerprint authentication area 1220 in correspondence to occurrence of a specific event (e.g., occurrence of a touch event or a finger approach recognition event).

Figure 13:
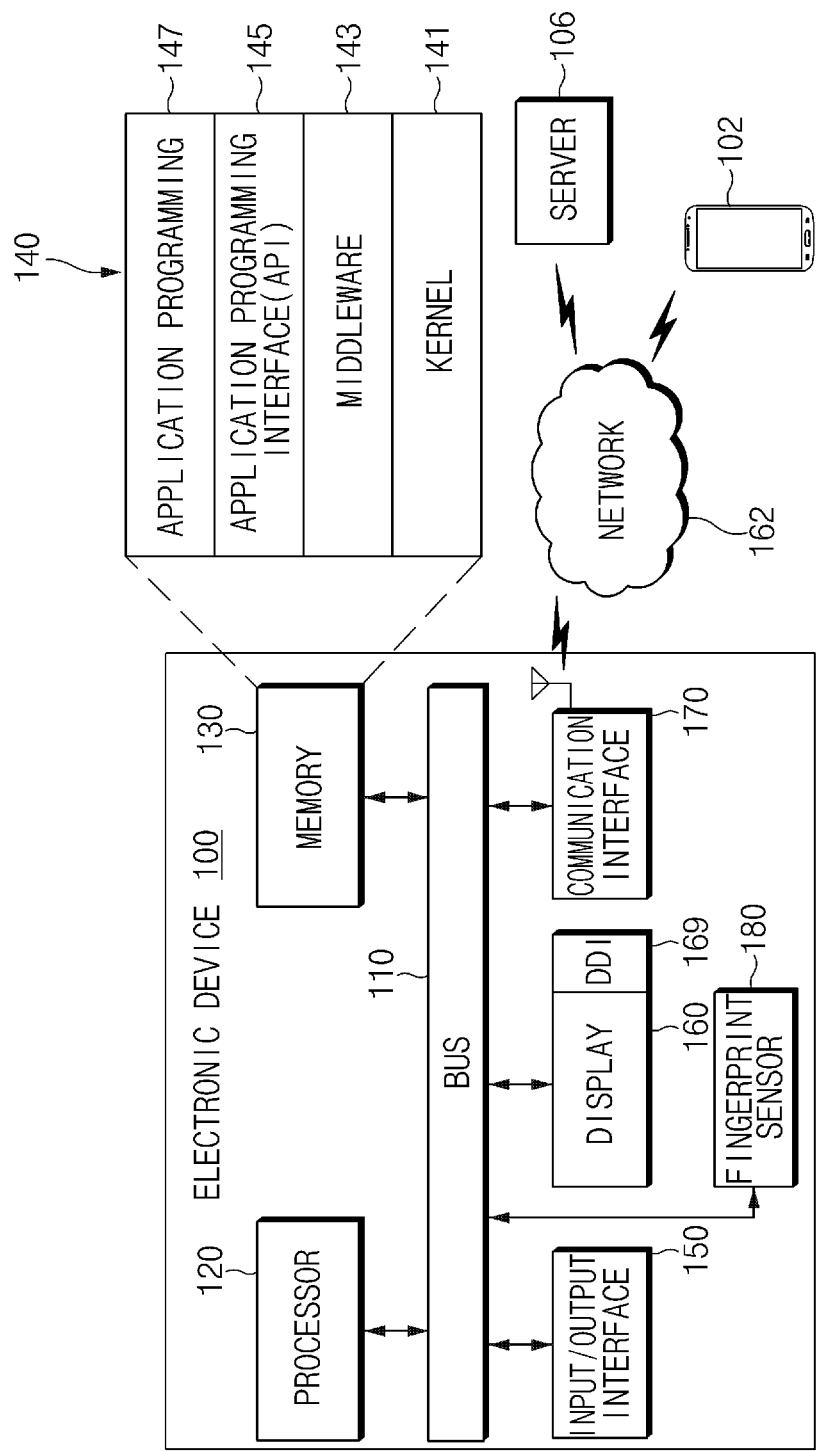
FIG. 13 is a view illustrating an example of an electronic device operating environment according to an embodiment of the present disclosure.

FIG. 13 is a view illustrating an example of an electronic device operating environment according to an embodiment of the present disclosure.

Referring to FIG. 13, an electronic device 100 in a network environment according to various embodiments will be described. The electronic device 100 may include a bus 110, a processor 120, a memory 130, an input/output interface 150, a display 160, a communication interface 170, and a fingerprint sensor 180. In some embodiments, the electronic device 100 may exclude at least one of the elements or may additionally include another element. According to an embodiment, the display 160 may include a display driver integrated-chip (DDI) 169.

The bus 110 may be, for example, a circuit which connects the components 120 to 170 with each other and transmits a communication signal (e.g., a control message and/or data) between the components.

The processor 120 may include one or more of a central processing unit (CPU), an application processor (AP), or a communication processor (CP). For example, the processor 120 may perform calculation or data processing about control and/or communication of at least another of the components of the electronic device 100. The processor 120 according to an embodiment of the present disclosure may perform processing related to an operation of a fingerprint authentication area and fingerprint authentication. If fingerprint authentication is requested (e.g., an application related to fingerprint authentication is executed), the processor 120 may output a specific fingerprint authentication guide UI on the display 160. The fingerprint authentication guide UI may include visual information (e.g., a text or an image) that indicates an area of the display 160, which a finger of the user is to contact. After the fingerprint authentication guide UI is output, the processor 120 may identify whether a specific event (e.g., a hovering event, a touch event, or a finger approach recognition event) occurs. If a specific event occurs, the processor 120 may change the display state of the fingerprint authentication area to a state having a specific luminance and a specific color. If the fingerprint authentication is successful, the processor 120 may process functions based on the success of the fingerprint authentication. According to various embodiments, the processor 120 may request changes of the fingerprint authentication guide UI and the display state of the fingerprint authentication area from the DDI 169.

According to various embodiments, if an application related to the fingerprint authentication is executed, the processor 120 may output a predefined area (e.g., an area of the display 160, for example, an area in which a card image is displayed). If contacting a specific object (e.g., a finger) in the predefined area, the touch sensor may deliver the corresponding coordinate information to the processor 120. The processor 120 may output a specific UI (e.g., a fingerprint authentication guide UI or an area having a specific luminance and a specific color) in an area of the display 160 corresponding to the corresponding coordinate information.

The memory 130 may include a volatile and/or non-volatile memory. The memory 130 may store, for example, a command or data associated with at least another of the components of the electronic device 100. According to an embodiment, the memory 130 may store software and/or a program 140. The program 140 may include, for example, a kernel 141, a middleware 143, an application programming interface (API) 145, and/or an least one application program 147 (or "at least one application"), and the like. At least part of the kernel 141, the middleware 143, or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 100, the kernel 141 may provide an interface which may control or manage system resources.

The middleware 143 may play a role as, for example, a go-between such that the API 145 or the application program 147 communicates with the kernel 141 to communicate data.

Also, the middleware 143 may process one or more work requests, received from the application program 147, in order of priority. For example, the middleware 143 may assign priority which may use system resources (the bus 110, the processor 120, or the memory 130, and the like) of the electronic device 100 to at least one of the at least one application program 147. For example, the middleware 143 may perform scheduling or load balancing for the one or more work requests by processing the one or more work requests in order of the priority assigned to the at least one of the at least one application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The memory 130 may store a fingerprint table. The fingerprint table may include a preset value to display the fingerprint authentication area with a specific luminance and a specific color. According to an embodiment, the fingerprint table may include a first preset value indicating a first luminance and a first color, a second preset value indicating a second luminance and a second color, . . . , and the like. The preset values may be applied based on a success or a failure of the fingerprint authentication. Further, even when a quality of the image provided by the fingerprint sensor 180 is a specific value or less as well as the fingerprint authentication fails, the fingerprint table may be used in relation to a change of the display state of the fingerprint authentication area.

The processor 120 may control the display state of the fingerprint authentication area based on a preset value set to a default, and may adjust the preset value based on the fingerprint table according to a failure of the fingerprint authentication or an acquisition of an image quality of a specific condition or more. The fingerprint table may include a processor fingerprint table operated by the processor and a DDI fingerprint table operated by the DDI 169. The processor fingerprint table may be used when being adapted to control a display state of the fingerprint authentication area by the processor 120. The DDI fingerprint table may be stored in a memory area (e.g., a DRAM or a RAM for the DDI 169) included in the DDI 169, and may be used such that the fingerprint authentication area has a specific display state in correspondence to the control of the DDI 169. According to various embodiments, the electronic device 100 may provide a user interface by which the user may select a preset value, which is to be applied as a default in the fingerprint authentication area, of the preset values included in the fingerprint table.

The input/output interface 150, for example, may deliver commands or data input from the user or another external device to another element(s) of the electronic device 100, or may output commands or data received from another element(s) of the electronic device 100 to the user or another external device. The input/output interface 150 may include an audio processing module. The audio processing module may output at least one piece of audio information related to an operation of the fingerprint authentication function. For example, the audio processing module may output audio information that guides the user to bring a finger into contact with the fingerprint authentication area during a fingerprint authentication operation. Further, the audio processing module may output audio information to guide the user to maintain the touch of the finger during the fingerprint authentication operation, audio information to guide the user to release the finger touch, or audio information to guide a success or a failure of the fingerprint authentication. According to various embodiments, the audio processing module may help execute the fingerprint authentication function in correspondence to a user voice input.

The display 160 may include, for example, a liquid crystal display (LCD), a light emitting diode (LED) display, an organic LED (OLED) display, a microelectromechanical systems (MEMS) display, or an electronic paper display. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

As described above, the display 160 may include a display area in which a specific screen interface is output, and a fingerprint authentication area in which the fingerprint sensor 180 is disposed. As illustrated in FIG. 10, when the fingerprint sensor 180 is provided in a form of a sheet, the whole display area may be the fingerprint authentication area. The display 160 may output guide information (or visual information) to guide the fingerprint authentication area. The display 160 may convert the display state of the display 160 such that the fingerprint authentication area has a specific luminance and a specific color in correspondence to the control of the processor 120. The display 160 may convert the fingerprint authentication area having the specific luminance and the specific color to the previous state (e.g., the state before the fingerprint authentication area having the specific luminance and the specific color) in correspondence to the control of the processor 120.

The display 160 may include a DDI 169. The DDI 169 may collect data stored in a frame memory related to driving of the display 160, and may output the collected data on the display 160. The DDI 169 according to an embodiment of the present disclosure may store a guide UI adapted to guide a fingerprint authentication area and a DDI fingerprint table in a memory (e.g., a DRAM or a DDI memory) included in the display 160. The DDI 169 may output the guide UI stored in the DDI memory in the fingerprint authentication area in correspondence to occurrence of an event. The DDI 169 may change the display state of the fingerprint authentication area such that the fingerprint authentication area has a first luminance and a first color with reference to the DDI fingerprint table stored in the DDI memory in correspondence to the occurrence of the event (e.g., at least one of a hovering event occurring in an area in which the guide UI is output, a touch event, and a finger approach recognition event). The DDI 169 may change the display state of the fingerprint authentication area such that the fingerprint authentication area has a second luminance and a second color in correspondence to an additional occurring event (e.g., when the quality of a fingerprint authentication failure event or acquired image information is a specific value or less). The hovering event or the touch event may be acquired by the touch sensor included in the display 160. The finger approach recognition event may be acquired by the fingerprint sensor 180.

The communication interface 170, for example, may set a communication between the electronic device 100 and an external device (e.g., an external electronic device 102, or a server 106). For example, the communication interface 170 may be connected to a network 162 through a wireless communication or a wired communication to communicate with the external device (e.g., the external electronic device 102 or the server 106).

The communication interface 170 may establish communication between, for example, the electronic device 100 and an external device (e.g., a first external electronic device 102, a second external electronic device 104, or a server 106). For example, the communication interface 170 may connect to a network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 164. The local-area communication 164 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 100 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeable with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

Each of the first and second external electronic devices 102 and 104 may be the same as or different device from the electronic device 100. According to an embodiment, the server 106 may include a group of one or more servers. According to various embodiments, all or some of the operations executed in the electronic device 100 may be executed in another electronic device or a plurality of electronic devices (e.g., the first external electronic device 102, the second external electronic device 104, or the server 106). According to an embodiment, if the electronic device 100 should perform any function or service automatically or according to a request, it may request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) may execute the requested function or the added function and may transmit the executed result to the electronic device 100. The electronic device 100 may process the received result without change or additionally and may provide the requested function or service. For this purpose, for example, cloud computing technologies, distributed computing technologies, or client-server computing technologies may be used.

Figure 14:
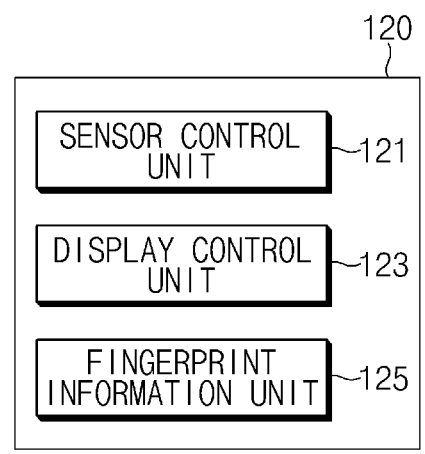
FIG. 14 is a view illustrating an example of a processor according to an embodiment of the present disclosure.

FIG. 14 is a view illustrating an example of a processor according to an embodiment of the present disclosure.

Referring to FIG. 14, the processor 120 of the present disclosure may include a sensor control unit 121, a display control unit 123, and a fingerprint information processing unit 125.

The sensor control unit 121 may perform control of a sensor related to performance of a fingerprint authentication function. According to an embodiment, if a request for fingerprint authentication is made, the sensor control unit 121 may adjust the sensitivity of the touch sensor. For example, the sensor control unit 121 may identify whether a hovering event based on an approach of an object occurs by adjusting the touch sensitivity of the fingerprint authentication area. Further, the sensor control unit 121 may identify whether a touch event occurs in the fingerprint authentication area. Further, if a request for fingerprint authentication occurs, the sensor control unit 121 activates the fingerprint sensor 180, and may determine whether an object such as a finger approaches the fingerprint sensor 180 based on image information acquired by the fingerprint sensor 180. If at least one of a hovering event, a touch event, or a finger approach event occurs, the sensor control unit 121 may deliver the corresponding event to the display control unit 123. If the state of the fingerprint authentication area is changed by the display control unit 123, the sensor control unit 121 may restore the touch sensor area, of which the sensitivity has been adjusted, to an original state. Further, if the fingerprint authentication is completed, the sensor control unit 121 may restore the touch sensor area, of which the sensitivity has been adjusted, to an original state.

If a request for fingerprint authentication is made, the display control unit 122 may output a guide UI corresponding to the fingerprint authentication area. In this regard, the display control unit 123 may output the fingerprint authentication guide UI stored in the memory 130, in the fingerprint authentication area, or may request output of the guide UI from the DDI 169. If an event (e.g., a hovering event, a touch event, or a finger approach recognition event) is delivered from the sensor control unit 121, the display control unit 123 may display the fingerprint authentication area in a specific display state. For example, the display control unit 123 may display the fingerprint authentication area such that the fingerprint authentication area has a first luminance and a first color (e.g., a green series color). In this regard, the display control unit 123 may refer to a fingerprint table stored in the memory 130. Further, the display control unit 123 may request a preset value from the DDI 169 such that the fingerprint authentication area has a first luminance and a first color. The DDI 169 may output data set such that the fingerprint authentication area is displayed in a specific display state while referring to the DDI fingerprint table in correspondence to the request of the display control unit 123.

If the fingerprint authentication fails or the quality of the acquired image information is a specific value or less, the display control unit 123 may change a display state of the fingerprint authentication area. For example, the display control unit 123 may display the fingerprint authentication area such that the fingerprint authentication area has a second luminance and a second color. Further, the display control unit 123 may change only the luminance of the fingerprint authentication area. In this regard, the display control unit 123 may refer to a fingerprint table stored in the memory 130. Further, the display control unit 123 may request the DDI 169 to change the display state of the fingerprint authentication area. When the fingerprint authentication fails or image information of a low quality is acquired, the display control unit 123 may output a message to guide a failure of the fingerprint authentication or a failure in acquisition of a normal image. The display control unit 123 may output a specific guide message (e.g., a message to maintain a finger contact state related to re-performance of acquisition of the fingerprint information or a message to guide adjustment of a contact location of a finger) in relation to acquisition of additional fingerprint information.

If the fingerprint authentication succeeds, the display control unit 123 may restore the display state of the fingerprint authentication area to a state before the fingerprint authentication. For example, the display control unit 123 may remove the fingerprint authentication guide UI or the display state having a specific luminance and a specific color, and may output a screen based on execution of an application related to the fingerprint authentication on the display 160.

The fingerprint information processing unit 125 may execute a fingerprint authentication application in correspondence to a user input or an advent of a scheduled event. The fingerprint information processing unit 125 may request activation of the fingerprint sensor 180 or adjustment of the sensitivity of the touch sensor from the sensor control unit 121 in correspondence to execution of a fingerprint authentication application. If the image information is acquired from the fingerprint sensor 180, the fingerprint information processing unit 125 may process fingerprint authentication by comparing the acquired fingerprint information and the stored fingerprint information. In this operation, the fingerprint information processing unit 125 may request comparison of fingerprint information from a separately trustable operating system environment (e.g., trusted execution environment (TEE)). If the fingerprint authentication fails or the quality of the image information acquired from the fingerprint authentication area is a specific value or less, the fingerprint information processing unit 125 may request a change of a display state of the fingerprint authentication area from the display control unit 123. The fingerprint information processing unit 125 may re-perform fingerprint authentication based on the image information acquired by the fingerprint sensor 180 after the display state of the fingerprint authentication area is changed. The fingerprint information processing unit 125 may perform comparison of fingerprint information a specific number of times, and if the number of times elapses, may determine that the fingerprint authentication fails. At least one of the luminance and the color of the fingerprint authentication area may be changed for the specific number of times. If the fingerprint authentication succeeds, the fingerprint information processing unit 125 may execute a function based on the success of the fingerprint authentication.

According to various embodiments, an electronic device is provided. The electronic device may include a display including at least one pixel and at least a partial area of which is transparent, a fingerprint sensor disposed in an area under the display, on which a screen is displayed, to collect light, which is radiated from the at least one pixel and a direction of which is changed by an object approaching the display and acquire image information related to fingerprint authentication and a processor adapted to control an image information acquiring operation of the fingerprint sensor.

According to an embodiment, the electronic device may further include a rear panel disposed under the display to perform protection and heat radiation, the rear panel includes a sensor disposition area, front and rear surfaces of which are pierced such that the fingerprint sensor faces an area of the display.

According to an embodiment, the electronic device may further include a bracket disposed under the rear panel to support the display, the bracket includes a sensor seating area in which the fingerprint sensor is seated.

According to an embodiment, the sensor seating area includes a recess engraved by a width and a height of an external appearance of the fingerprint sensor.

According to an embodiment, the sensor seating area includes a hole that passes through front and rear surfaces of the bracket by a width of one side of an external appearance of the fingerprint sensor.

According to an embodiment, the electronic device may further include a sensor bonding layer disposed between the sensor seating area and the fingerprint sensor to fix the fingerprint sensor to the sensor seating area.

According to an embodiment, the electronic device may further include a bonding layer disposed between the rear panel and the fingerprint sensor to fix the fingerprint sensor to the sensor disposition area of the rear panel while the fingerprint sensor is arranged in the sensor disposition area of the rear panel.

According to an embodiment, the electronic device may further include a wavelength selection unit arranged in the fingerprint sensor disposition area while being disposed on the fingerprint sensor and adapted to pass only light of a specific wavelength band.

According to an embodiment, the electronic device may further include a wavelength selection substrate disposed between the display and the fingerprint sensor to pass only light of a specific wavelength band.

According to an embodiment, the fingerprint sensor includes a fingerprint sensor sheet adapted to verify a fingerprint in a whole active area of the display, on which a screen is displayed.

According to an embodiment, the processor outputs the at least a partial area of the display with a color of a wavelength band of 500 nm to 800 nm when the fingerprint authentication is requested.

According to an embodiment, the processor outputs a fingerprint authentication area of the display corresponding to an area in which the fingerprint sensor is disposed with a color of a wavelength band of 500 nm to 800 nm and of a specific luminance.

According to an embodiment, wherein upon failing in the fingerprint authentication or failing in acquisition of information of an image having a resolution of a specific value or more fails, the processor outputs a display state of a display area in which the object in contact is disposed, different from the previous state.

According to an embodiment, the processor is adapted to change a luminance of the display area in which the object in contact is disposed to a luminance of a specific value.

According to an embodiment, the processor outputs a guide user interface (UI) adapted to guide disposition of a finger of a user in relation to a fingerprint authentication area of the display corresponding to an area in which the fingerprint sensor is disposed when the fingerprint authentication is requested.

According to an embodiment, the processor processes the fingerprint authentication area such that a touch sensitivity of the fingerprint authentication area is different from those of surroundings.

According to an embodiment, the processor outputs the fingerprint authentication area with a color of a wavelength band of 500 nm to 800 nm and of a specific luminance if a specific hovering signal is received from the fingerprint authentication area, and outputs the fingerprint authentication area with a color of a wavelength band of 500 nm to 800 nm and of a specific luminance if a touch signal is received from the fingerprint authentication area.

According to an embodiment, the processor recognizes an approach of a finger based on image information acquired by the fingerprint sensor when the fingerprint authentication is requested, and outputs an area in which the finger is recognized with a color of a wavelength band of 500 nm to 800 nm when the finger is recognized.

Figure 15A:
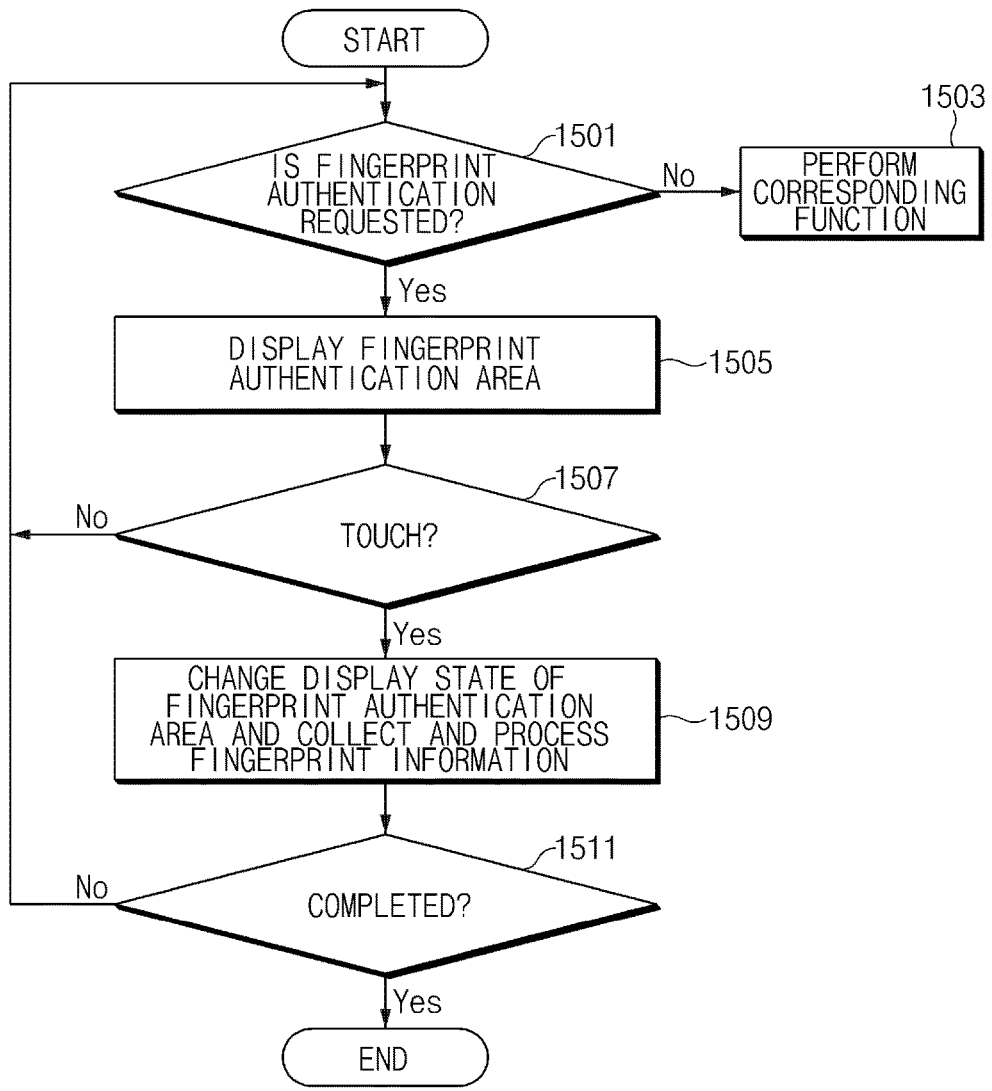
FIG. 15A is a view illustrating an example of a fingerprint operating method based on a change in a display state value of a fingerprint authentication area according to an embodiment of the present disclosure.

FIG. 15A is a view illustrating an example of a fingerprint operating method based on a change in a display state value of a fingerprint authentication area according to an embodiment of the present disclosure.

Referring to FIG. 15A, in relation to the fingerprint operating method, in operation 1501, if an event occurs, a processor 120 (e.g., the sensor control unit 121) of the electronic device 100 may identify whether the event is an event related to a request for fingerprint authentication. When the event is not an event related to a request for fingerprint authentication, in operation 1503, the processor 120 may execute a function related to the occurring event. For example, the processor 120 may output a home screen or a webpage in correspondence to the type of the event. Further, the processor 120 may execute a communication function based on the event.

According to various embodiments, if an event related to a request for fingerprint authentication, the processor 120 (e.g., the sensor control unit 121) may activate the fingerprint sensor 180. The processor 120 (e.g., the sensor control unit 121) may adjust the sensitivity of the touch sensor. In operation 1505, the processor 120 (e.g., the display control unit 123) may output information to guide a fingerprint authentication area. For example, the processor 120 may output a box or a closed curve to indicate an area in which a finger of the user is to be located, in a specific area of the display 160. At least one of a text or an image for guiding a contact of a finger may be displayed in the interior of the box or the closed curve.

In operation 1507, the processor 120 (e.g., the sensor control unit 121) may identify whether a touch occurs in a specific area (e.g., the fingerprint authentication area). When a touch does not occur, the processor 120 branches to operation 1501 to identify whether the request for fingerprint authentication is valid (e.g., within a specific time period after the request for fingerprint authentication), and may process the following step. According to occasions, an operation of inspecting the availability of the request for fingerprint authentication may be omitted.

If a touch occurs in the fingerprint authentication area, in operation 1509, the processor 120 (e.g., the display control unit 123) may change the display state of the fingerprint authentication area such that the fingerprint authentication area has a specific luminance, a specific color, and a specific phase (or form). For example, the processor 120 may process the fingerprint authentication area such that the fingerprint authentication area has a specific luminance and at least one color. The fingerprint sensor 180 may collect image information based on light, which is reflected by a touched object and received by the fingerprint sensor 180, of the light of the pixel corresponding to the fingerprint authentication area, and may deliver the collected image information to the processor 120 (e.g., the fingerprint information processing unit 125). The fingerprint information processing unit 125 may perform fingerprint authentication based on the received image information. For example, the fingerprint information processing unit 125 may compare the fingerprint information stored in advance and the acquired fingerprint information, and may identify whether the two pieces of fingerprint information coincides with each other by a specific ratio or more. In this operation, the fingerprint information processing unit 125 may extract a feature point of the acquired fingerprint information and may compare the feature point with a feature point of the fingerprint information stored in advance. The fingerprint information, for example, may be compared in an operating system environment.

In operation 1511, the processor 120 may identify whether an event related to completion of the fingerprint authentication function occurs. If an event related to completion of the fingerprint authentication function occurs, the processor 120 may perform processing such that the state of the fingerprint authentication area returns to the state before execution of the function or is branched to a specific state (e.g., a standby screen display state). In this operation, the processor 120 (e.g., the sensor control unit 121) may deactivate the activated fingerprint sensor 180. Further, the processor 120 (e.g., the display control unit 123) may restore the fingerprint authentication area having a specific display state to a previous state. In operation 1511, if an event related to completion of the fingerprint authentication function does not occur, for example, if the fingerprint authentication fails, the processor 120 may be branched to an operation before operation 1501 to re-perform the following operations. Then, the state of the electronic device 100 is a state in which a request for fingerprint authentication is valid, and may be state 1509 in which the fingerprint authentication area has a specific luminance and a specific color. In this case, the fingerprint sensor 180 may newly produce image information based on the light collected for a specific period of time after the failure of the fingerprint authentication, and the processor 120 (e.g., the fingerprint information processing unit 125) may re-perform fingerprint authentication based on the produced image information.

According to various embodiments, in operation 1509, the processor 120 (e.g., the display control unit 123) may change the display state of the fingerprint authentication area again. According to an embodiment, the processor 120 may display at least one of the luminance, the color, and the phase of the fingerprint authentication area different from the previous state. For example, the processor 120 may process the fingerprint authentication area such that the luminance of the fingerprint authentication area is higher than before. The processor 120 may re-perform fingerprint authentication, based on the image information produced by the fingerprint sensor while a pixel radiates light of a relatively high luminance FIG. 15B is a view illustrating an example of a screen interface related to a change in a display state value of a fingerprint authentication area according to an embodiment of the present disclosure.

Figure 15B:
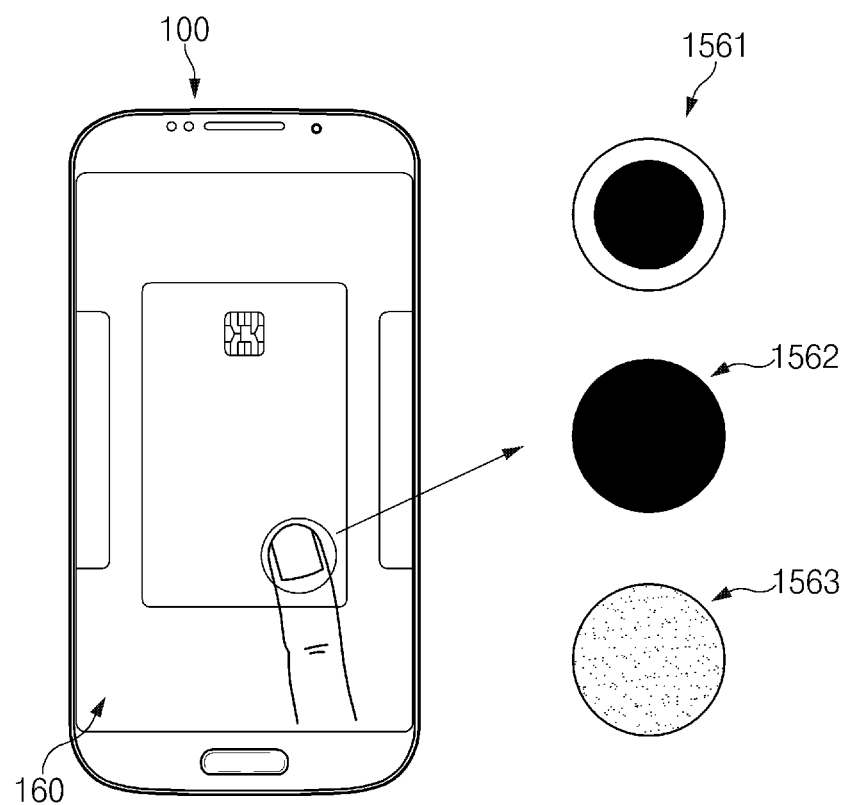
FIG. 15B is a view illustrating an example of a screen interface related to a change in a display state value of a fingerprint authentication area according to an embodiment of the present disclosure.

Referring to FIG. 15B, the electronic device 100 may output an execution screen of an application related to fingerprint authentication on the display 160. The electronic device 100 may change a specific area (e.g., a fingerprint authentication area or an area which an object related to fingerprint authentication approaches) such that the specific area has a specific color. For example, if a touch event (or a hovering event) occurs on an area in which a card image is output in relation to fingerprint authentication, the electronic device 100 may output any one of a first object 1561, a second object 1562, or a third object 1563.

The first object 1561, for example, may include a central circle and an external circle. The central circle may function as a light emitting unit. The external circle may function as a passage of light reflected by a ridge of a fingerprint and received by the fingerprint sensor. Further, the central circle may function as a passage of light reflected by a ridge of a fingerprint and the external circle may function as a light emitting unit adapted to radiate light towards the fingerprint. Accordingly, the central circle and the external circle may have colors of different wavelength bands.

The second object 1562 may include an object having a specific color corresponding to a touch area of the user or a hovering area. The second object 1562 may be changed based on the size of a touch area of the user or a hovering area. The second object 1562 may have a color of a wavelength that is advantageous for fingerprint authentication. Although the drawing illustrates that the shape of the second object 1562 is circular, the second object 1562 may have an elliptical or polygonal shape in correspondence to the shape of the touch area.

The third object 1563 may be an object displayed in the touch area or the hovering area of the user and including a specific pattern. The pattern of the third object 1563, for example, may change a path of the light reflected by a ridge of a fingerprint or the like to a specific form. The size and shape of the pattern of the third object 1563 may be changed based on setting of the user.

Figure 16:
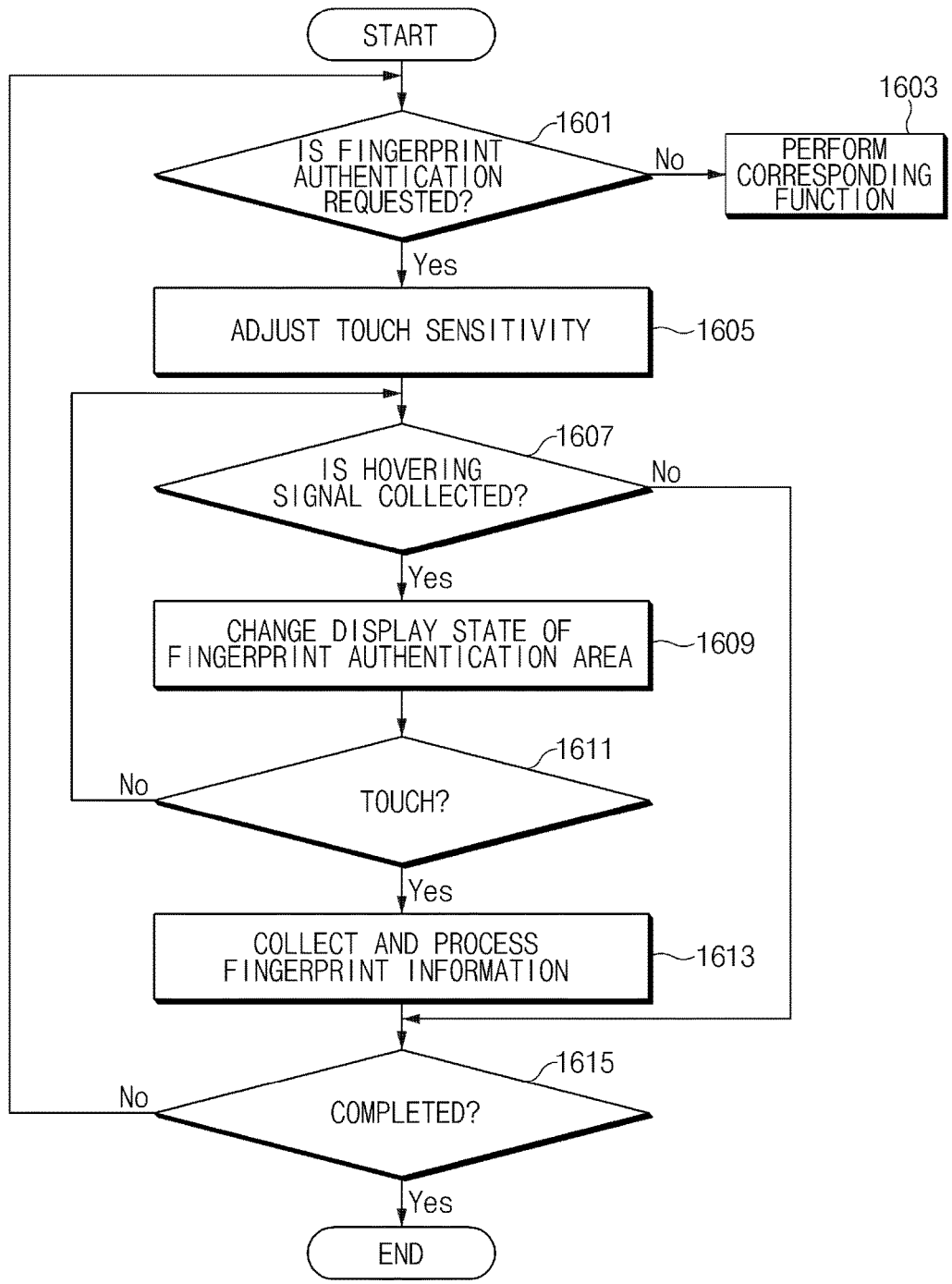
FIG. 16 is a view illustrating an example of a hovering signal based fingerprint operating method according to an embodiment of the present disclosure.

FIG. 16 is a view illustrating an example of a hovering signal based fingerprint operating method according to an embodiment of the present disclosure;

Referring to FIG. 16, in relation to the fingerprint operating method, in operation 1601, if an event occurs, a processor 120 (e.g., the sensor control unit 121) of the electronic device 100 may identify whether the event is an event related to a request of fingerprint authentication. When the event is not an event related to a request of fingerprint authentication, in operation 1603, the processor 120 may execute a function related to the event occurring similarly to operation 1503.

According to various embodiments, if an event related to a request of fingerprint authentication occurs, in operation 1605, the processor 120 (e.g., the sensor control unit 121) may adjust the sensitivity of the fingerprint sensor 180. For example, the processor 120 may increase the sensitivity of the whole touch sensor or increase the touch sensor of the fingerprint authentication area such that the touch sensor of the fingerprint authentication area is higher than that of the peripheral portion of the fingerprint authentication area. The fingerprint authentication area is an area in which the fingerprint sensor 180 is disposed, and may be written in the memory 130. The processor 120 may refer to location information of the fingerprint authentication area written in the memory 130 to process the touch sensitivity of the corresponding area differently from the peripheral area. Prior to adjustment of the touch sensitivity, the processor 120 (e.g., the display control unit 123) may output guide information to guide a fingerprint authentication area on the display 160.

In operation 1605, the processor 120 (e.g., the sensor control unit 121) may identify whether a hovering signal is collected. For example, the processor 120 may identify whether a specific hovering signal (e.g., a hovering signal based on an approach of a finger) in at least a partial area of the touch sensor or a specific hovering signal is collected in the fingerprint authentication area.

When the specific hovering signal is not detected, the processor 120 (e.g., the sensor control unit 121) may skip the following operations and may be branched to operation 1615. According to an embodiment, in operation 1615, when an event to indicate completion of the fingerprint verification function does not occur, the processor 120 may identify whether the request for fingerprint verification in operation 1601 is valid. When the request for fingerprint authentication is valid (e.g., within a preset limit time in relation to fingerprint authentication), the processor 120 (e.g., the sensor control unit 121) may maintain the touch sensitivity in the previous state. Further, the processor 120 (e.g., the sensor control unit 121) may change the sensitivity of the touch sensor such that the sensitivity of the touch sensor is more sensitive than the previous state. According to occasions, an operation of inspecting the availability of the request for fingerprint authentication may be omitted.

If a specific hovering signal is collected, in operation 1609, the processor 120 (e.g., the display control unit 123) may change the display the state of the fingerprint authentication area again. According to an embodiment, the processor 120 may display at least one of the luminance, the color, and the form of the fingerprint authentication area different from the previous state. For example, the processor 120 may process the fingerprint authentication area such that the luminance of the fingerprint authentication area is higher than before. The processor 120 may re-perform fingerprint authentication based on image information produced based on the light collected according to the relatively high luminance In operation 1611, the processor 120 (e.g., the sensor control unit 121) may identify whether a touch occurs in a specific area (e.g., the fingerprint authentication area). When a touch does not occur, the processor 120 may be branched to operation 1607 to identify whether a specific hovering signal is collected, and may perform processing based on the identification.

If a touch occurs in the fingerprint authentication area, in operation 1613. The processor 120 (e.g., the display control unit 123) may collect and process fingerprint information. The fingerprint sensor 180 may collect image information based on light, which is reflected by a touched object and received by the fingerprint sensor 180, of the light of the pixel corresponding to the fingerprint authentication area, and may deliver the collected image information to the processor 120 (e.g., the fingerprint information processing unit 125). The processor 120 (e.g., the fingerprint information processing unit 125) perform fingerprint authentication based on the received image information, similarly to the processing of fingerprint information in operation 1509.

In operation 1615, the processor 120 may identify whether an event related to completion of the fingerprint authentication function occurs. If an event related to completion of the fingerprint authentication function occurs, the processor 120 may perform processing such that the state of the fingerprint authentication area returns to the state before execution of the function or is branched to a specific state (e.g., a standby screen display state). In this operation, the processor 120 (e.g., the sensor control unit 121) may deactivate the activated fingerprint sensor 180. Further, the processor 120 (e.g., the display control unit 123) may restore the fingerprint authentication area having a specific display state to a previous state. In operation 1615, if an event related to completion of the fingerprint authentication function does not occur, for example, if the fingerprint authentication fails, the processor 120 may be branched to an operation before operation 1601 to re-perform the following operations. Further, if a touch is maintained in operation 1611, the processor 120 may be branched to operation 1613 to re-perform collection and processing of fingerprint information. Further, the processor 120 may be branched to operation 1609 to change the display state of the fingerprint authentication area differently from the previous state, and may re-perform the following operations.

Figure 17:
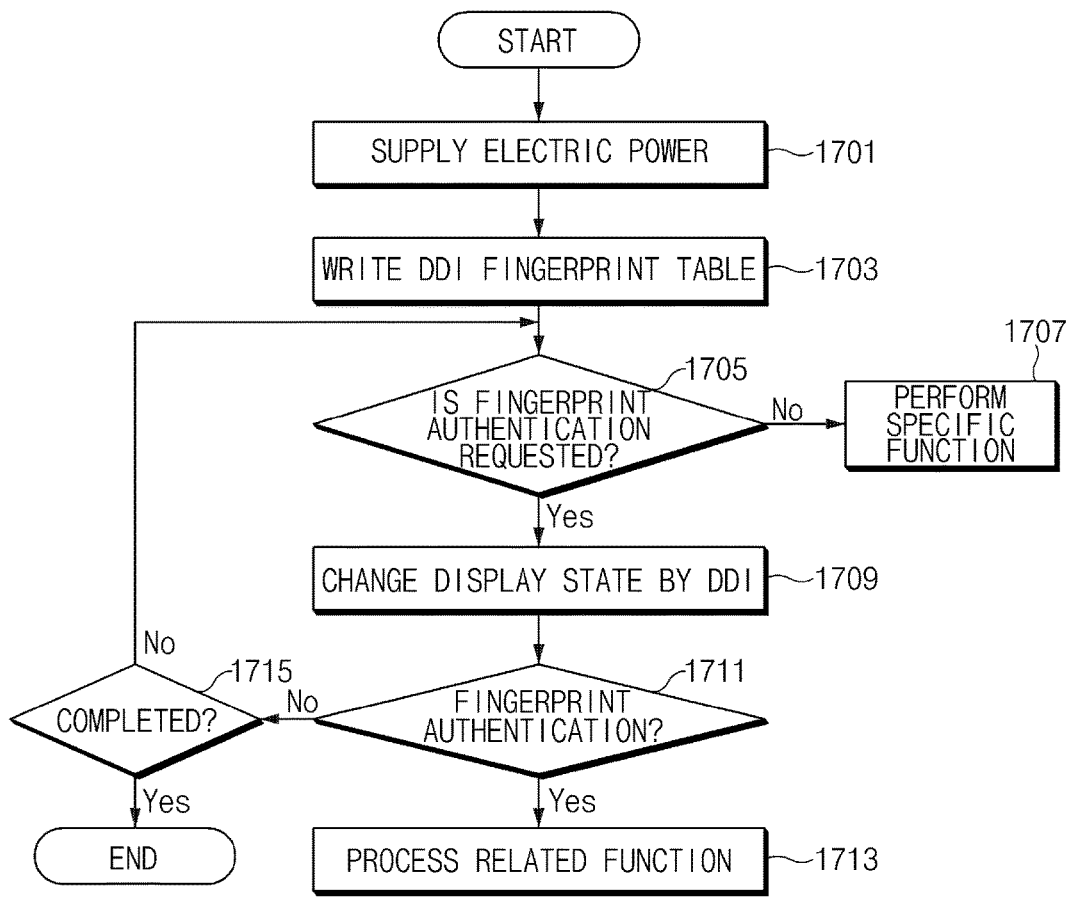
FIG. 17 is a view illustrating an example of a fingerprint operating method using a DDI according to an embodiment of the present disclosure.

FIG. 17 is a view illustrating an example of a fingerprint operating method using a DDI according to an embodiment of the present disclosure.

Referring to FIG. 17, in relation to a fingerprint operating method, in operation 1701, the processor 120 of the electronic device 100 may receive electric power. For example, a user input (e.g., a physical button input) is made while electric power is turned off, the electronic device 100 may be booted by using electric power stored in a battery. After booting is completed or as in operation 1703 during the booting, the processor 120 (e.g., the display control unit 123) may perform writing of a DDI fingerprint table. For example, the processor 120 may write a DDI fingerprint table stored in the memory 130 (e.g., an EMMC or a UFS) in a DDI RAM.

In operation 1705, the processor 120 (e.g., the sensor control unit 121, the display control unit 123, or the fingerprint information processing unit 125) may identify whether the fingerprint authentication function is executed. When there is no request for execution of a fingerprint authentication function in operation 1707, the processor 120 may perform a specific function based on occurrence of an event. In this regard, the processor 120 may execute at least one application related to a fingerprint authentication function in correspondence to a user input or according to an advent of specific scheduling.

If execution of the fingerprint authentication function is requested, the processor 120 (e.g., the sensor control unit 121) may activate the fingerprint sensor 180 and the touch sensor. In operation 1709, the processor 120 (e.g., the display control unit 123) may control a change of the display state by the DDI. For example, if a touch event at a specific location (e.g., the fingerprint authentication area) is collected, the processor 120 may deliver a change request signal (or the corresponding touch event) to request a change of the display state to the DDI 169 in correspondence to the collected touch event. The DDI 169 may output fingerprint guide information stored in a RAM on the display 160, in correspondence to reception of the received change request signal (or the touch event). Further, the DDI 169 may output fingerprint guide information having a specific luminance and a specific color stored in the RAM on the display 160.

In operation 1711, the processor 120 (e.g., the fingerprint information processing unit 125) may collect fingerprint information in correspondence to a user touch, and may identify whether the collected fingerprint information is authenticated. If the fingerprint authentication is normally performed, in operation 1713, the processor 120 (e.g., the fingerprint information processing unit 125) may process a function related to the fingerprint authentication.

When the fingerprint authentication fails, in operation 1715, the processor 120 may identify whether an event related to completion of the fingerprint authentication function occurs. When an event related to completion of a fingerprint authentication function occurs, the processor 120 may complete the fingerprint authentication function. When an event related to the completion of the fingerprint authentication function does not occur, the processor 120 may return to the operations before operation 1709 to perform the following operations again. In this operation, the DDI 169 receives a change request signal from the processor 120 (e.g., the display control unit 123) in correspondence to a failure in fingerprint authentication, and may process the fingerprint authentication area such that the fingerprint authentication area is in the previous display state based on the received change request signal. Further, if a specific fingerprint processing time elapses, the DDI 169 may automatically change the display state of the fingerprint authentication area.

As described above, according to the fingerprint operating method of an embodiment of the present disclosure, the display state of the fingerprint authentication area may be changed more promptly by processing the set values, by which the display state of the fingerprint authentication area may be controlled, directly by the DDI.

According to various embodiments, the fingerprint operating method of the present disclosure may include an operation of receiving a request for fingerprint authentication, an operation of outputting a guide UI adapted to guide a contact of a finger to a fingerprint authentication area of a display corresponding to a location in which a fingerprint sensor is disposed, an operation of collecting a specific event in the fingerprint authentication area, by the fingerprint sensor, an operation of delivering the specific event to a display driver integrated-chip (DDI) (e.g., the DDI) adapted to output the guide UI, by the fingerprint sensor, and an operation of changing a display state of the fingerprint authentication area such that the fingerprint authentication area has a specific luminance and a specific color in response to the specific event, by the DDI.

Figure 18:
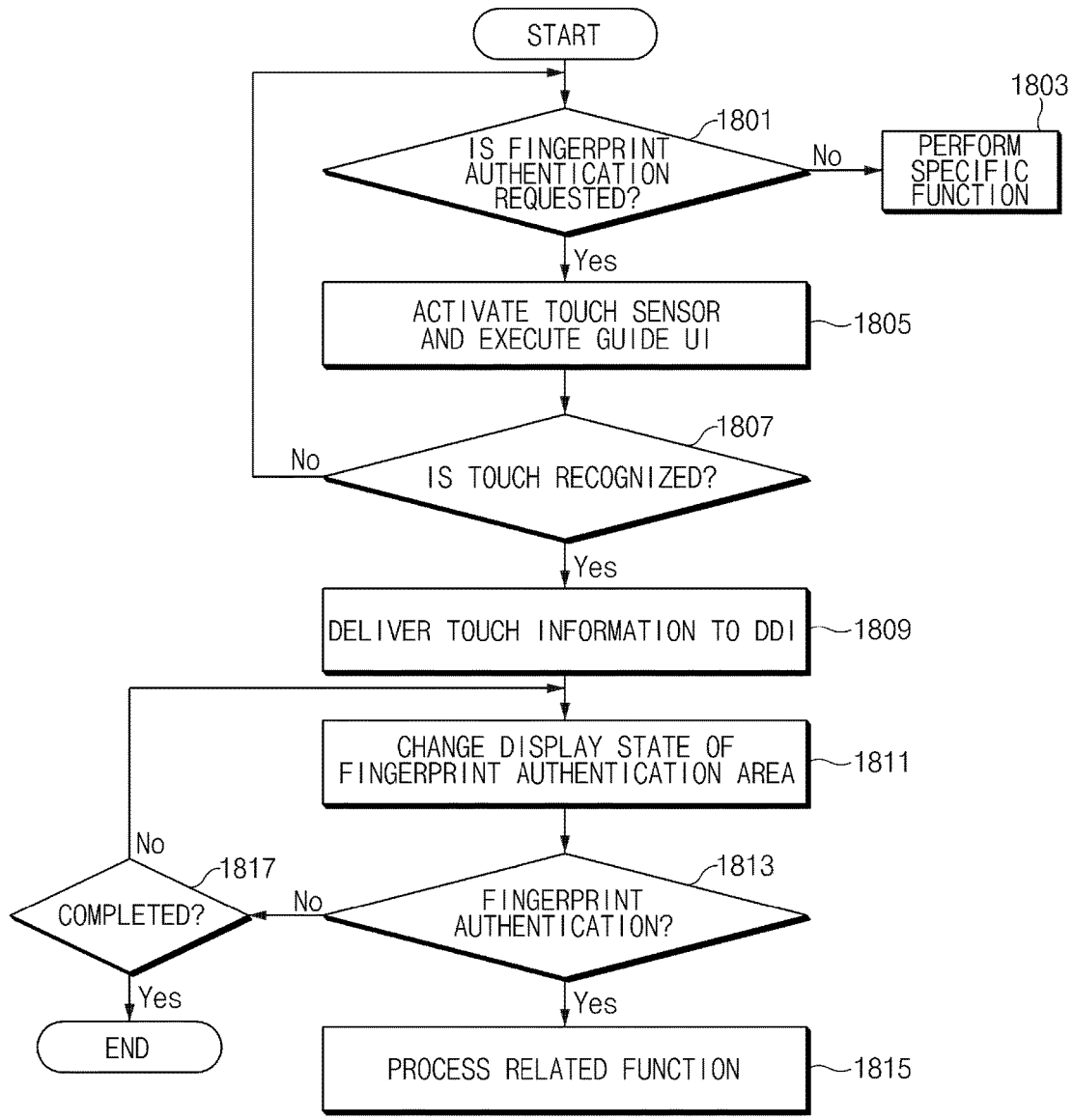
FIG. 18 is a view illustrating an example of a fingerprint operating method of changing a display state value by using a DDI according to an embodiment of the present disclosure.

FIG. 18 is a view illustrating an example of a fingerprint operating method of changing a display state value by using a DDI according to an embodiment of the present disclosure.

Referring to FIG. 18, in relation to the fingerprint operating method, as in operation 1601, in operation 1801, the processor 120 may identify whether an event related to a request for fingerprint authentication occurs. If an event to request fingerprint authentication does not occur, as in operation 1603, in operation 1803, the processor 120 may execute a specific function.

In operation 1801, if a fingerprint authentication request event occurs, the processor 120 (e.g., the sensor control unit 121) may activate the touch sensor. The processor 120 (e.g., the display control unit 123) may output a guide UI related to display of the fingerprint authentication area.

In operation 1807, the processor 120 (e.g., the display control unit 121) may identify whether a touch is recognized. For example, the processor 120 may identify whether a touch input is made in a fingerprint authentication area. If a touch input is not made, the processor 120 may be branched to an operation before operation 1801 to identify whether a request for fingerprint authentication is valid. If the request for fingerprint authentication is valid, the processor 120 may perform operation 1807 while maintaining an activated state of the touch sensor.

If a valid touch input is made in the fingerprint authentication area, in operation 1809, the processor 120 (e.g., the sensor control unit 121) may perform a control such that the touch information collected by the touch sensor may be delivered to the DDI. In this regard, the touch sensor and the DDI may have signal lines, through which the touch information may be transmitted and received. In this operation, the processor 120 (e.g., the sensor control unit 121) may activate the fingerprint sensor 180).

In operation 1811, the DDI 169 may change the display state of the fingerprint authentication area in correspondence to the touch information delivered by the touch sensor. For example, the DDI 169 may radiate light with reference to values set in the DDI fingerprint table such that the fingerprint authentication area has a first luminance, a first color, and a first form.

In operation 1813, the processor 120 (e.g., the fingerprint information processing unit 125) may perform fingerprint authentication and may identify whether the collected fingerprint information is valid. If the collected fingerprint information is valid, in operation 1815, the processor 120 (e.g., the fingerprint information processing unit 125) may process a function related to the fingerprint authentication. When the fingerprint authentication fails, in operation 1817, the processor 120 may identify whether the function is completed. If an event related to completion of the function does not occur, in operation 1811, the processor 120 (e.g., the display control unit 123) may request a change of the display state of the fingerprint authentication area from the DDI 169.

As described above, according to the fingerprint operating method of an embodiment of the present disclosure, touch information may be directly delivered to the DDI to control the display state of the fingerprint authentication area without the control of the processor 120. Accordingly, according to the fingerprint operating method of the present disclosure, the display state of the fingerprint authentication area may be changed more promptly.

Figure 19:
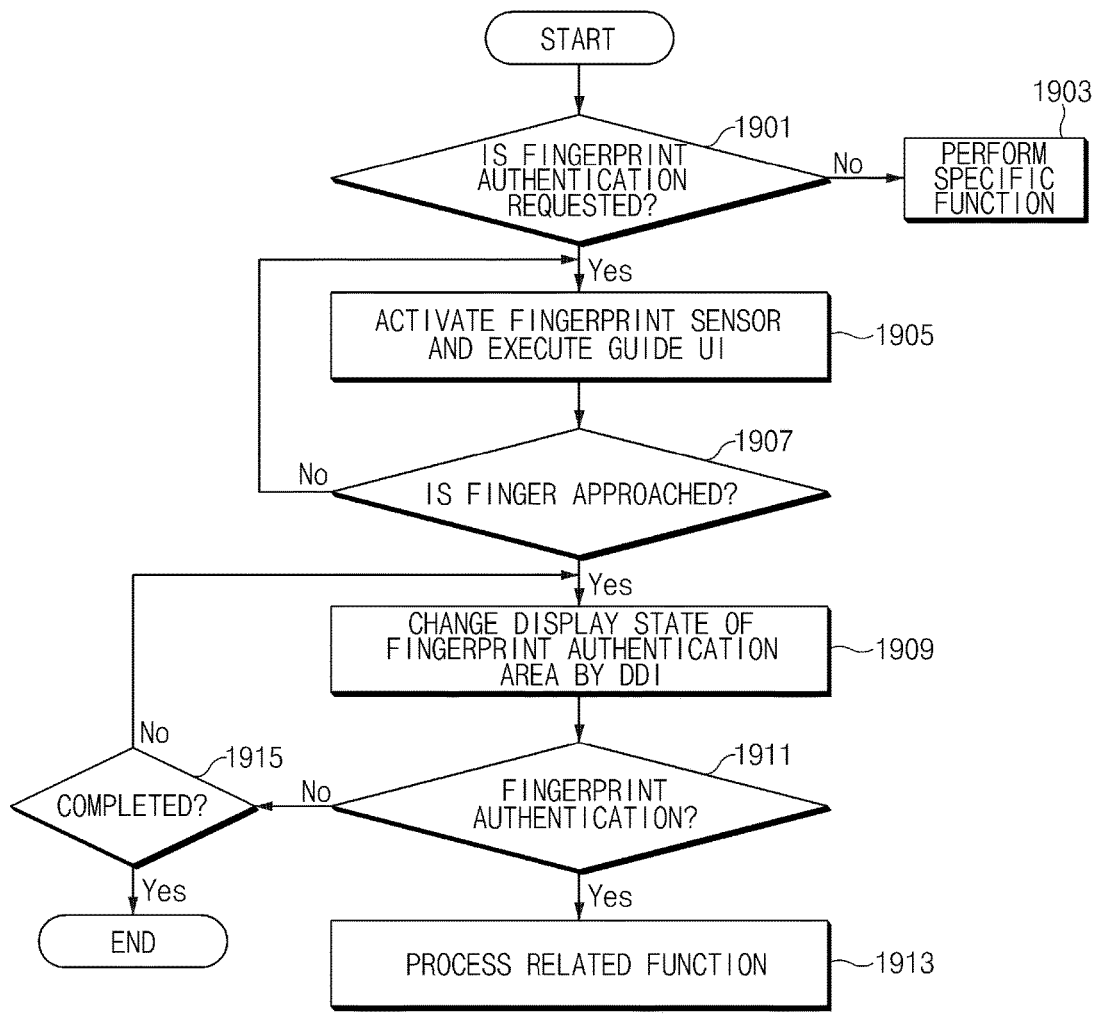
FIG. 19 is a view illustrating an example of a fingerprint operating method of changing a display state value by using a fingerprint sensor according to an embodiment of the present disclosure.

FIG. 19 is a view illustrating an example of a fingerprint operating method of changing a display state value by using a fingerprint sensor according to an embodiment of the present disclosure.

Prior to a description of the example, operation 1901 and operation 1903 may be the same as or similar to operation 1801 and operation 1803, which have been described above. In operation 1905, if a fingerprint authentication request event occurs, the processor 120 (e.g., the sensor control unit 121) may activate the fingerprint sensor 180 and process a guide UI output.

In operation 1907, the processor 120 may identify whether the fingerprint sensor 180 receives a signal on an approach of a finger. In this regard, the activated fingerprint sensor 180 may collect light at a specific cycle or in real time, and produce image information based on the collected light to deliver the produced image information to the processor 120. Further, the fingerprint sensor 180 may analyze the produced image information and determine whether the produced image information corresponds to an approach of a finger. In relation to performance of the above-described operation, the processor 120 may perform a control such that the pixels disposed in the specific display area (e.g., the fingerprint authentication area) radiate light of a specific luminance and a specific color. The light radiated by the pixels and reflected by an object may be condensed by the light receiving unit of the fingerprint sensor 180. Further, the fingerprint sensor 180 may emit light by using the light emitting unit and may collect light by using the light receiving unit.

If image information corresponding to an approach of a finger is not collected, the processor 120 may be branched to an operation before operation 1905 and may re-perform the following operations. In this regard, the processor 120 may identify an approach of a finger while maintaining the activated fingerprint sensor. The processor 120 may identify an approach of a finger for a specific time period, and if the specific time period elapses, may determine whether an availability of the fingerprint authentication is completed.

If an image information corresponding to an approach of a finger is acquired, in operation 1909, the processor 120 (e.g., the display control unit 123) may process a change of the display state of the fingerprint authentication area by the DDI 169. According to various embodiments, the fingerprint sensor 180 may deliver a result based on the analysis of image information (e.g., information determined to be an approach of a finger) to the DDI 169, and the DDI 169 may process the fingerprint authentication area such that the fingerprint authentication area is in a specific display state based on information of the received fingerprint sensor 180.

In operation 1911, the processor 120 may identify whether the fingerprint authentication is completed. If the fingerprint authentication is completed, in operation 1913, the processor 120 may process a function related to the fingerprint authentication. If the fingerprint authentication fails, in operation 1915, the processor 120 may identify whether the fingerprint authentication function is completed, and if not completed, may be branched to an operation before operation 1905 to re-perform the following operations.

According to various embodiments, a method for operating an electronic device may include an operation of receiving a request for fingerprint authentication, an operation of outputting a guide UI adapted to guide a contact of a finger to a display area corresponding to a location in which a fingerprint sensor is disposed, and an operation of, if a specific event related to a fingerprint authentication area in which the guide UI is output occurs, outputting a display state of the fingerprint authentication area with a specific luminance and a specific color, by the guide UI.

According to various embodiments, the operation of outputting the guide UI may include an operation of outputting the fingerprint authentication area of the display corresponding to an area in which the fingerprint sensor is disposed with a color of a specific luminance and a wavelength band of 500 nm to 800 nm.

According to various embodiments, the method may further include an operation of comparing image information acquired by the fingerprint sensor and stored fingerprint information, and an operation of, when the fingerprint authentication fails or acquisition of image information having a quality of a specific value or more fails, outputting the display state of the display area, in which the object in contact is disposed, differently from the previous state.

According to various embodiments, the method may further include an operation of a guide user interface (UI) to guide disposition of a user finger in the fingerprint authentication area of the display corresponding to an area in which the fingerprint sensor is disposed, based on the request for the fingerprint authentication.

According to various embodiments, the method may further include an operation of processing the touch sensitivity of the fingerprint authentication area differently from a peripheral portion.

According to various embodiments, the method may further include an operation of, if a hovering signal is received in the fingerprint authentication area, outputting the fingerprint authentication area of the display corresponding to an area in which the fingerprint sensor is disposed with a color of a specific luminance and a wavelength band of 500 nm to 800 nm.

According to various embodiments, the method may further include an operation of, if a touch signal is received in the fingerprint authentication area, outputting the fingerprint authentication area of the display with a color of a specific luminance and a wavelength band of 500 nm to 800 nm.

According to various embodiments, the method further include an operation of recognizing an approach of a finger based on image information acquired by the fingerprint sensor when the fingerprint authentication is requested, and an operation of outputting an area recognized by the finger with a color of a wavelength band of 500 nm to 800 nm.

According to various embodiments, the method may further include an operation of increasing the luminance of an area of the display, which an object contacts, by a specific value.

According to various embodiments, a method for operating an electronic device according to an embodiment may include an operation of receiving a request for fingerprint authentication, an operation of outputting a guide UI adapted to guide a contact of a finger to a display area corresponding to a location in which a fingerprint sensor is disposed, and an operation of, if a specific event related to a fingerprint authentication area in which the guide UI is output occurs, outputting a display state of the fingerprint authentication area with a specific luminance and a specific color, by the guide UI.

Figure 20:
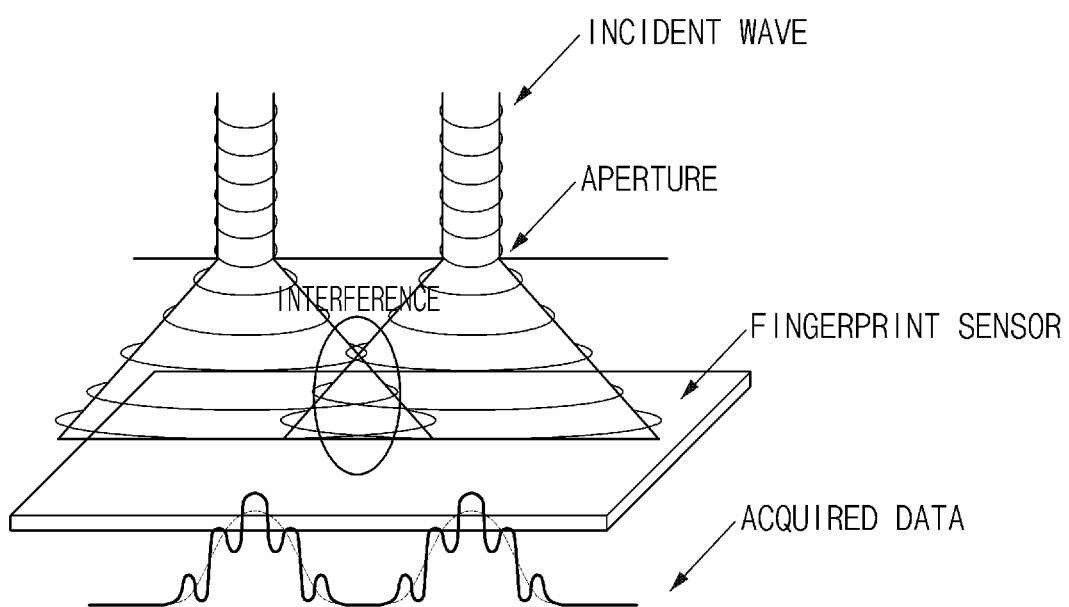
FIG. 20 is a view illustrating a form of a condensing light waveform according to an embodiment of the present disclosure.
Figure 21A:
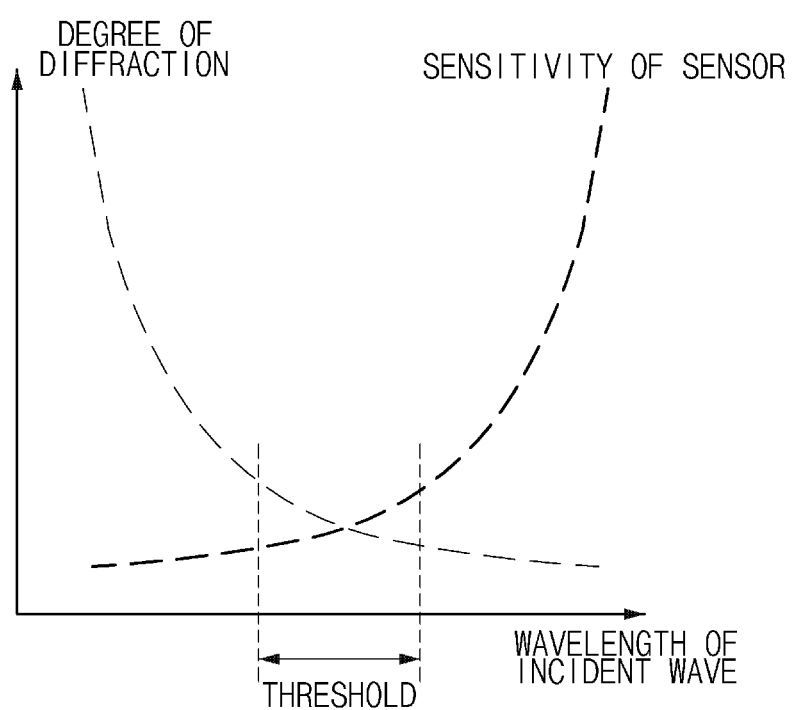
FIG. 21A is a view illustrating a display state value changing range according to an embodiment of the present disclosure.
Figure 21B:
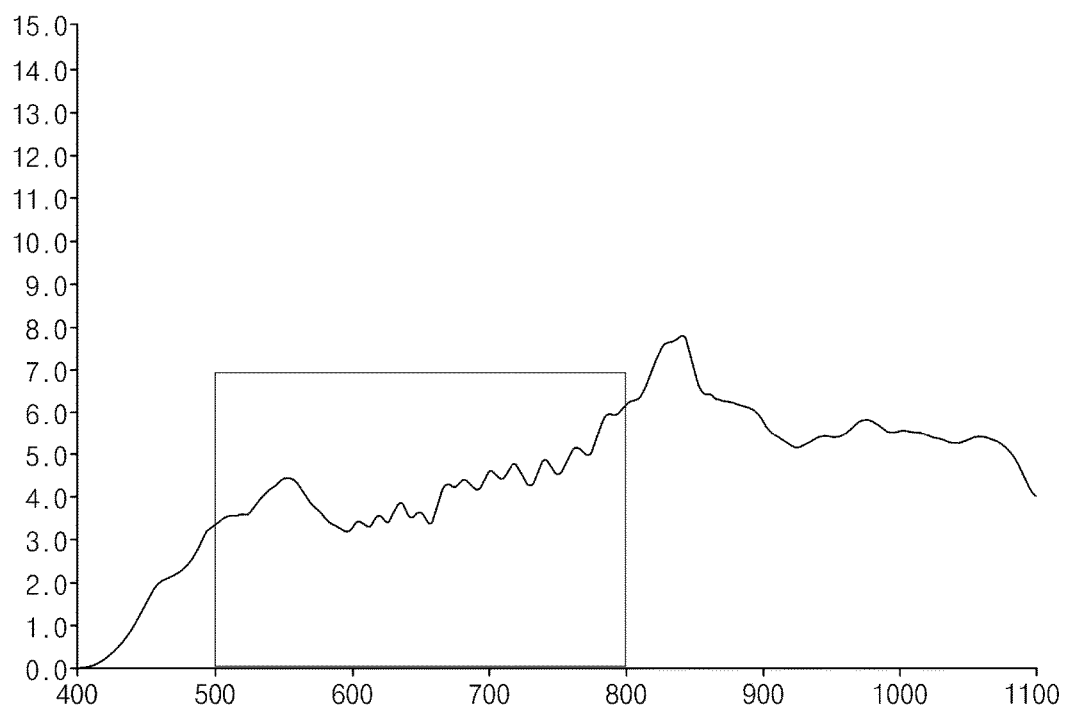
FIG. 21B is a view indicating a specific range of wavelength bands according to an embodiment of the present disclosure.
Figures 22A, 22B, 22C, 22D:
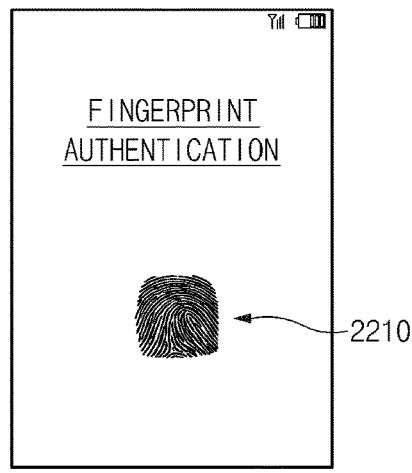
FIGS. 22A-22D are views illustrating an example of a screen interface related to an operation of an electronic device according to an embodiment of the present disclosure.

FIG. 20 is a view illustrating a form of a condensing light waveform according to an embodiment of the present disclosure. FIG. 21A is a view illustrating a display state value changing range according to an embodiment of the present disclosure. FIG. 21B is a view indicating a specific range of wavelength bands according to an embodiment of the present disclosure.

Referring to FIGS. 20 to 21A, the quality of the fingerprint image collected by the fingerprint sensor may be influenced by the diffraction and optical energy of the light input to the fingerprint sensor. The light reflected by the fingerprint of the user in contact with the display 160 may diffract incident light when the incident light is provided to the fingerprint sensor while passing through apertures. Accordingly, the incident light that passed the apertures may mutually generate constructive interferences/destructive interferences.

Then, when a diffraction degree is θ, a relationship of Equation 1 for θ may be established.

$$\sin\Theta = \frac{\text{Wavelength of incident light}}{\text{Area of aperture}} \quad \text{[Equation 1]}$$

Accordingly, when the apertures (e.g., transparent areas of the display 160) of the electronic device 100 are constant, diffractions become severe and constructive interferences/destructive interferences become severe if the wavelength of the incident wave is longer, and thus the acquired image quality may deteriorate.

Due to the property of a photodiode, the sensitivity of the fingerprint sensor is determined by energy of incident light, that is, optical power as illustrated in FIG. 21A, and accordingly, may be related to the wavelength of the incident wave as in Equations 2 to 4.

$$\text{Number of electrons generated by incident wave} = \quad \text{[Equation 2]}$$
$$\text{Efficiency} \times \frac{\text{Optical power} \times \text{Wavelength of incident wave}}{\text{Flank constant} \times \text{Speed of light}}$$

$$\text{Current} = e \times \text{Efficiency} \times \quad \text{[Equation 3]}$$
$$\frac{\text{Optical power} \times \text{Wavelength of incident wave}}{\text{Flank constant} \times \text{Speed of light}}$$

$$\text{Sensitivity of photodiode} = \frac{\text{Current}}{\text{Optical power}} \text{ or} \quad \text{[Equation 4]}$$

Sensitivity of photodiode =
Probability of generating electrons by incident
$$\text{photon} \times \frac{\text{Wavelength of incident wave}}{1.24}$$

As illustrated, because an amount of generated currents increases as the wavelength of incident wave becomes longer and the sensitivity of the photodiode increases, it may be advantageous to radiate incident wave of a specific frequency band to acquire a suitable quality of the fingerprint information. Accordingly, the electronic device according to an embodiment of the present disclosure may improve the quality of fingerprint information by performing a control such that the pixels disposed in the fingerprint authentication area radiate a color (e.g., a color of a wavelength of 500 nm to 800 nm) of a specific wavelength as illustrated in FIG. 21B. Further, the electronic device 100 may output a color of a wavelength of a transmittance of 3% or more in the fingerprint authentication area.

FIGS. 22A-22D are views illustrating an example of a screen interface related to an operation of an electronic device according to an embodiment of the present disclosure.

The display 160 according to an embodiment of the present disclosure may output a screen related to a request for fingerprint authentication as in state 2201. For example, if an application that is necessary for a fingerprint authentication function is executed, the display 160 may output a screen to request fingerprint authentication as illustrated. The screen related to a request for fingerprint authentication, for example, may include a guide UI 2210. The guide UI 2210, for example, may be displayed in a specific fingerprint authentication area of the display 160. The specific fingerprint authentication area may correspond to a location at which a specific finger may be located in consideration of a gripped state of the electronic device 100. The guide UI 2210, for example, may include a circular periphery, and may include a specific image (e.g., a virtual default fingerprint image) inside the circular periphery. The shape and image contents of the guide UI 2210 may be changed according to settings.

While the guide UI 2210 is output on the display 160, the processor 120 of the electronic device 100 may adjust the sensitivity of the touch sensor. For example, the processor 120 may adjust the touch sensitivity of an area including a fingerprint authentication area output by the guide UI 2210 more sensitively than the previous state. When an object approaches the touch area adjusted more sensitively than the previous state, the touch sensor may acquire a hovering event or the like earlier than the peripheral area. According to various embodiments, if the guide UI 2210 is output, the processor 120 may determine an approach of a finger by using the fingerprint sensor 180 disposed under the fingerprint authentication area.

When a finger approaches the fingerprint sensor 180, as in state 2203, the processor 120 may display the fingerprint authentication area in a first display state 2221. The first display state 2221, for example, may include a state in which the fingerprint authentication area has a first luminance and a color of green series. Further, the processor 120 may display the fingerprint authentication area in a second display state 2220 according to settings. The second display state 2220, for example, may divide the fingerprint authentication area to two areas, and may include a state in which different areas have different colors or different luminance According to an embodiment, the second display state 2220 may include a state in which the luminance of the central portion is larger than that of the peripheral portion.

In state 2203, if a finger contact occurs (e.g., a touch is recognized), the processor 120 may perform fingerprint authentication based on image information acquired by the fingerprint sensor 180. If the fingerprint authentication succeeds, as in state 2205, the processor 120 may output a message related to the success of authentication on the display 160. Further, the processor 120 may execute an application function based on the success of authentication, and may output a screen corresponding to the application function on the display 160.

When the fingerprint authentication fails (or acquisition of image information of a specific resolution or a quality or higher fails) in state 2203, as in state 2207, the processor 120 may output a message corresponding to the failure of fingerprint authentication (or a message indicating that acquisition of image information of a specific resolution fails). Further, the processor 120 may output information to guide re-performance of fingerprint authentication. According to an embodiment, the processor 120 may display the display state of the fingerprint authentication area in a third display state 2222 that is different from the previous state. For example, the third display state 2222 may include a display state in which at least one of a luminance or a color of the first display state 2221 is different. Further, the third display state 2222 may include a state in which a color (e.g., green series) having a luminance that is higher than the luminance of the first display state 2221 is output. The processor 120 may perform a control such that image information is acquired by using the fingerprint sensor 180 if the fingerprint authentication area is in the third display state 2222, and may re-perform fingerprint authentication for the acquired fingerprint information. The processor 120 may repeatedly perform a fingerprint authentication operation a specific number of times.

FIGS. 23A and 23B are views illustrating a form of a fingerprint sensor according to an embodiment of the present disclosure.

As indicated by 2301 of FIG. 23A, the electronic device 100 according to the present disclosure may include a case 101, a display 160, a rear panel 190, a fingerprint sensor 180, a display light emitting unit 2320, a bracket 240, a printed circuit board 210, a battery 220, and a rear cover 230.

As described above, the display 160 may include an outer protective layer 161, a bonding layer 163 (e.g., an OCA), a polarizer layer 164, and a display panel 165. At least a portion (e.g., a fingerprint authentication area in which the fingerprint sensor 180 is disposed) of the above-described display 160 may be transparent.

The rear panel 190 may be disposed under the display 160 and may include a sensor disposition area 191. The fingerprint sensor 180 may be disposed under the sensor disposition area 191. Through the sensor disposition area 191, the fingerprint sensor 180 may collect at least a portion of the light passing through the display 160. The light generated by the display light emitting unit 2320 may be radiated towards a front surface of the display 160 through the sensor disposition area 191.

The fingerprint sensor 180 may be disposed under the rear panel 190, and as illustrated, may be disposed in a first sensor seating area 241a provided on one side of the bracket 240. At least a portion (e.g., the light receiving unit that may collect light) of an upper portion of the fingerprint sensor 180 may be exposed through the sensor disposition area 191 of the rear panel 190. Further, the fingerprint sensor 180 may include a light emitting unit and a light receiving unit for sensing a fingerprint. In this case, parts of the fingerprint sensor 180, in which the light emitting unit and the light receiving unit are disposed, may be exposed towards the display 160 through the sensor disposition area 191. If the light radiated from the light emitting unit of the fingerprint sensor 180 is reflected by a finger of the user or the like, which contacts a surface of the display 160, the light is introduced through a transparent area of the display 160, and the introduced light may be delivered to the fingerprint sensor 180 through the sensor disposition area 191.

The display light emitting unit 2320 may include at least one light emitting diode (LED). The display light emitting unit 2320, for example, may emit light of one color. Further, the display light emitting unit 2320 may emit light of a plurality of colors. The display light emitting unit 2320 may be disposed adjacent to the fingerprint sensor 180. Further, a plurality of display light emitting units 2320 may be disposed to surround a side of the fingerprint sensor 180. The display light emitting unit 2320 may be electrically connected to the processor 120 of the electronic device 100. The display light emitting unit 2320 may emit light of a specific color and a specific luminance in response to control of the processor 120. The color or the luminance of the display light emitting unit 2320 may be adjusted in correspondence to various situations related to sensing of a fingerprint.

According to an embodiment, in relation to guide of a location of the fingerprint sensor 180, the display light emitting unit 2320 may emit light of a specific luminance or color in correspondence to control of the processor 120. In this operation, when the display 160 is turned on, the display light emitting unit 2320 may emit light of a first luminance and a first color. When the display 160 is turned off, the display light emitting unit 2320 may emit light of a second luminance (e.g., a luminance that is lower than the first luminance) and the first color or a second color that is different from the first color.

According to an embodiment, if a hovering event or a touch event occurs in an area of the fingerprint sensor 180 of the display 160, the display light emitting unit 2320 may emit light of a third luminance and a third color. The third color may include a color (e.g., a purple series color) that is not interfered by the light used in sensing of a fingerprint by the fingerprint sensor 180. The third luminance, for example, may be a luminance that is lower than the second luminance, or may include a luminance (e.g., 50 nit) of not more than a specific value. Further, the third luminance may have a value of 0 (a state in which the display light emitting unit 2320 is turned off).

According to various embodiments, the display light emitting unit 2320 may emit light of a specific luminance or color according to whether authentication of a fingerprint is made. For example, when the authentication of the fingerprint is successful, the display light emitting unit 2320 may emit light of a fourth luminance or a fourth color (e.g., a yellow color or a green color that customarily has a positive meaning). Further, when the authentication of the fingerprint failed, the display light emitting unit 2320 may emit light of a fifth luminance or a fifth color (e.g., a red color or a black color that customarily has a negative meaning) The fourth color or the fifth color may be differently set according to a change of design by a designer or an area in which the meanings of colors are differently interpreted.

According to various embodiments, the display light emitting unit 2320 may emit light in relation to an operation of an application related to the fingerprint sensor 180. For example, if execution of an application related to sensing of a fingerprint is requested, the display light emitting unit 2320 may emit light of a specific luminance or color in correspondence to control of the processor 120. Further, if a specific gesture (or a user input, for example, a sweep event of sweeping the display 160 from a periphery of a lower end to the center of the electronic device 100) related to sensing of a fingerprint is made, the display light emitting unit 2320 may emit light of a specific luminance or color. Further, the display light emitting unit 2320 may emit light of a specific luminance or color at a specific period or in real time to guide a location of the fingerprint sensor 180.

The bracket 240 is disposed under the rear panel 190 to support the rear panel 190, the display 160, and the like. At least a portion of the bracket 240 may be formed of a nonmetallic material or at least a portion of the bracket 240 may be formed of a metallic material. The bracket 240 may include a third sensor seating area 241c. The third sensor seating area 241c may have a form that is substantially the same as or similar to the first sensor seating area 241a described with reference to FIG. 4. Further, the third sensor seating area 241c may include an area that is wider than the first sensor seating area 241a described with reference to FIG. 4 in relation to the disposition of the display light emitting unit 2320. Additionally, similarly to the first sensor seating area 241a, the third sensor seating area 241c may include at least one of a wiring line groove or a wiring line hole in which wiring lines of the fingerprint sensor 180 may be disposed.

The printed circuit board 210 may be disposed under the bracket 240, and may be electrically connected to the display 160 and the fingerprint sensor 180. At least one processor related to driving of the display 160 and driving of the fingerprint sensor 180 may be seated in the printed circuit board 210. The processor may adjust the luminance or the color of the display light emitting unit 2320. The battery 220 may be disposed in a layer that is under the bracket 240 and parallel to the printed circuit board 210. The rear cover 230 may surround the printed circuit board 210, the battery 220, and the like.

As indicated by 2303 of FIG. 23B, in the electronic device 100 of the present disclosure, the fingerprint sensor 180 may be disposed under an area in which the display 160 is disposed. The fingerprint sensor, for example, may include only a light receiving unit. In relation of sensing of the fingerprint sensor 180, the electronic device 100 may further include a sensor light emitting unit 2310. As illustrated, the sensor light emitting unit 2310 may be disposed at a periphery of the display 160. According to an embodiment, the sensor light emitting unit 2310 may be disposed at a periphery of a lower side (e.g., on the same horizontal axis of a point at which the fingerprint sensor 180 is disposed) of the point at which the fingerprint sensor 180 is disposed. The light radiated by the sensor light emitting unit 2310 may be diffracted or reflected through the display 160, and may be reflected on a surface of an object (e.g., a finger of the user) in contact with an upper side of the display 160 and then travels towards the fingerprint sensor 180.

Figure 24:
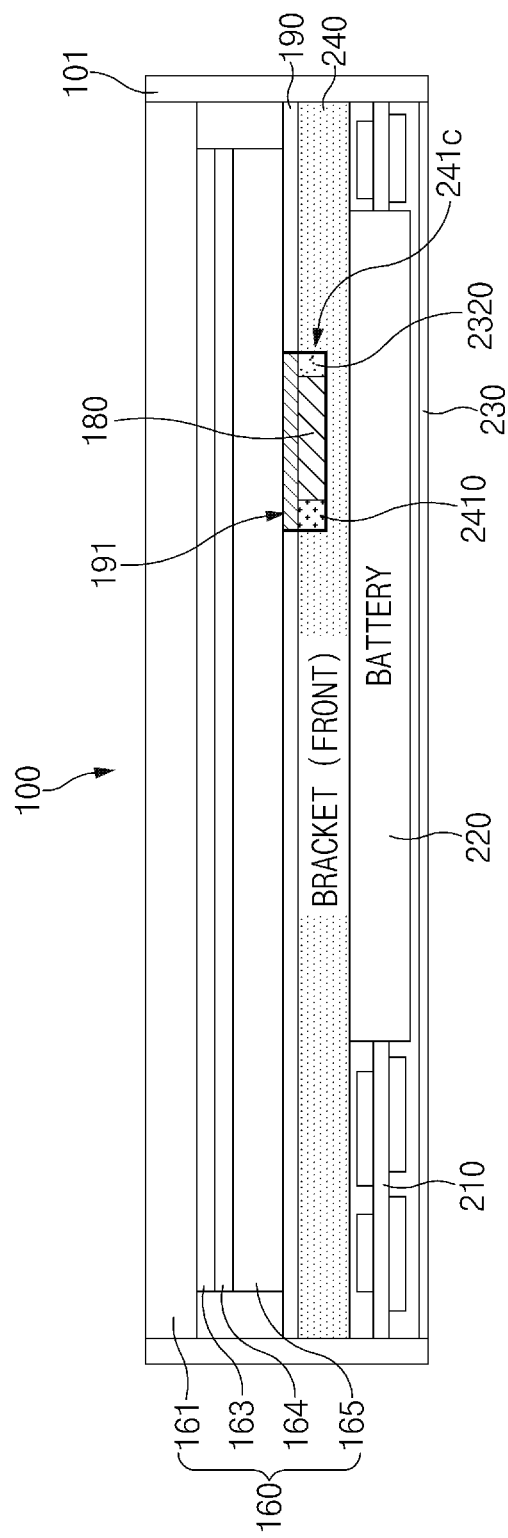
FIG. 24 is a view illustrating another form of a fingerprint sensor according to an embodiment of the present disclosure.

FIG. 24 is a view illustrating another form of a fingerprint sensor according to an embodiment of the present disclosure.

Referring to FIG. 24, the electronic device 100 according to the present disclosure may include a case 101, a display 160, a rear panel 190, a fingerprint sensor 180, a display light emitting unit 2320, a sensing light emitting unit 2410, a bracket 240, a printed circuit board 210, a battery 220, and a rear cover 230. The case 101, the display 160, the rear panel 190, the bracket 240, the printed circuit board 210, the battery 220, and the rear cover 230 may have the same or similar configurations to those of FIGS. 23A and 23B.

The fingerprint sensor 180 may be disposed under the display 160. For example, the fingerprint sensor 180 may be arranged under the third sensor disposition area 241c of a form of a hole formed in the rear panel 190. The fingerprint sensor 180 may include only a light receiving unit adapted to condense light introduced from the ambient environment or outside.

The display light emitting unit 2320 may be disposed at a peripheral portion of the fingerprint sensor 180. The display light emitting unit 2320 may be disposed under the display 160 (that is transparent or has a specific transparency) through the third sensor disposition area 241c. Accordingly, when the display light emitting unit 2320 emits light of a specific color, the emitted light may be radiated to the outside through the third sensor disposition area 241c and the transparent display 160 such that the light may be recognized by the user. The display light emitting unit 2320 may be disposed at a peripheral portion of the fingerprint sensor 180, and a plurality of light emitting units may be disposed at a specific interval. The display light emitting unit 2320 may emit light of a specific luminance or a specific color in response to control of the processor 120. For example, as illustrated in FIG. 23A, the display light emitting unit 2320 may emit light of a specific color or a specific luminance in relation to an operation of the fingerprint sensor 180 of the electronic device 100.

At least one sensing light emitting unit 2410 may be disposed between the display light emitting units 2320 spaced apart from each other by a specific interval. The sensing light emitting unit 2410 may radiate light of sensing a fingerprint in correspondence to control of the processor 120. According to an embodiment, the sensing light emitting unit 2410 may radiate light of a wavelength of an infrared ray. Further, the sensing light emitting unit 2410 may radiate light of a wavelength (e.g., a wavelength of a red color) of a visual ray that is close to the wavelength of an infrared ray. When activation of the fingerprint sensor 180 is requested, the sensing light emitting unit 2410 may radiate light of a specific wavelength. Further, when a finger or the like touches the display 160 corresponding to the area in which the fingerprint sensor 180 is disposed, the sensing light emitting unit 2410 may radiate light of a specific wavelength in correspondence to control of the processor 120. Further, when the fingerprint verification fails, the sensing light emitting unit 2410 may radiate light of a specific wavelength again or radiate light of an intensity or wavelength that is different from that of the previously radiated light in correspondence to the control of the processor 120.

According to various embodiments, the sensing light emitting unit 2410 may radiate light at a specific period or in real time in correspondence to control of the processor 120. The processor 120 may identify an approach of an object by using the light radiated by the sensing light emitting unit 2410 and the fingerprint sensor 180. According to various embodiments, the sensing light emitting unit 2410 may include a proximity sensor for approach of an object. In this case, the sensing light emitting unit 2410 may include a function of receiving light radiated by the sensing light emitting unit 2410 itself, and may determine an approach of an object based on the function.

Figure 25:
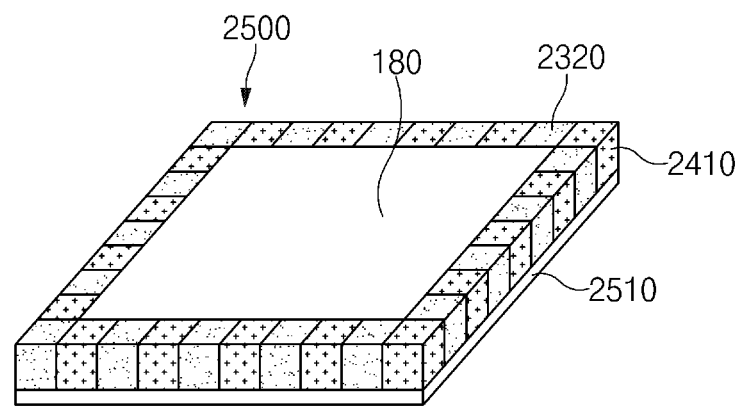
FIG. 25 is a view illustrating another form of a fingerprint sensor module according to an embodiment of the present disclosure.

FIG. 25 is a view illustrating another form of a fingerprint sensor module according to an embodiment of the present disclosure. Here, although it is illustrated that the fingerprint sensor module 2500 has a tetragonal form, the present disclosure is not limited thereto. The fingerprint sensor module 2500 may have various forms, such as a circular form, an elliptical form, and a polygonal form.

Referring to FIG. 25, the fingerprint sensor module 2500, for example, may include a fingerprint sensor 180 including only a light receiving unit, display light emitting units 2320 disposed at a periphery of the fingerprint sensor 180, sensing light emitting units 2410, and a substrate 2510. The display light emitting units 2320 may be disposed alternately with the sensing light emitting units 2410 to surround the fingerprint sensor 180. The fingerprint sensor 180, the display light emitting unit 2320, and the sensing light emitting unit 2410 may be electrically connected to the processor 120.

As illustrated in FIG. 23A, the display light emitting units 2320 may radiate light of a specific color or at least one of various colors at a specific luminance (or a specific luminance adjusted under the control of the processor 120). A plurality of units that may radiate light may be disposed in the display light emitting units 2320 at a specific interval. For example, the display light emitting units 2320 may be disposed between the plurality of units constituting the sensing light emitting units 2410.

The sensing light emitting unit 2410 may radiate light (e.g., an infrared ray or a visual ray (e.g., a red color) of a specific wavelength) related to fingerprint verification. The sensing light emitting unit 2410 may include a plurality of units that may radiate light of a specific wavelength related to sensing of a fingerprint. The plurality of units of the sensing light emitting unit 2410 may be disposed between the plurality of units of the display light emitting unit 2320 spaced apart from each other by a specific interval.

The substrate 2510 may include a substrate, on which the fingerprint sensor 180, the display light emitting unit 2320, and the sensing light emitting unit 2410 are mounted. At least a portion of the substrate 2510, for example, may include a flexible printed circuit board (FPCB) or a printed circuit board (PCB). The substrate 2510 may include signal lines for supplying a signal or electric power to the fingerprint sensor 180, the display light emitting unit 2320, and the sensing light emitting unit 2410.

Figure 26:
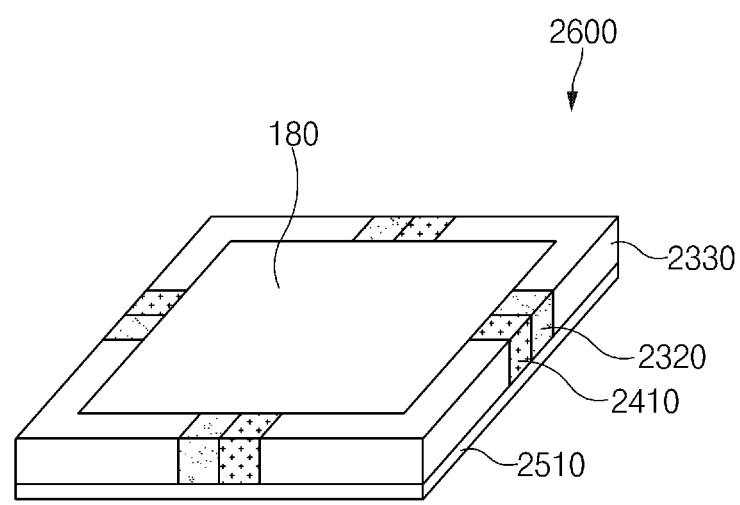
FIG. 26 is a view illustrating another form of a fingerprint sensor module according to an embodiment of the present disclosure.

FIG. 26 is a view illustrating another form of a fingerprint sensor module according to an embodiment of the present disclosure.

Referring to FIG. 26, the fingerprint sensor module 2600, for example, may include a fingerprint sensor 180 including only a light receiving unit, a display light emitting unit 2320 disposed at a peripheral portion of the fingerprint sensor 180, a sensing light emitting unit 2410, at least one waveguide 2330 (or lightguide), and a substrate 2510. Similarly to the fingerprint sensor 180 described with reference to FIG. 25 and the like, the fingerprint sensor 180 may include only a light receiving unit. Further, the substrate 2510 may include a substrate that is the same as or similar to the substrate 2510 described with reference to FIG. 25.

The display light emitting unit 2320, for example, may be disposed at a periphery of the fingerprint sensor 180, and a plurality of units may be disposed to be symmetrical to each other with respect to a center point of the fingerprint sensor 180. According to an embodiment, when the fingerprint sensor 180 has a polyhedral shape having four side surfaces as illustrated, the display light emitting unit 2320 may include units, each (or a plurality) of which is disposed on the corresponding one of the four side surfaces. The display light emitting unit 2320 may radiate light to upwards or laterally. At least a portion of a side surface of the display light emitting unit 2320 may face the waveguide 2330. The light radiated by the display light emitting unit 2320 may be delivered to at least one waveguide 2330.

The sensing light emitting unit 2410 may be disposed at a periphery of the fingerprint sensor 180, and a plurality of units may be disposed to be symmetrical to each other with respect to a center point of the fingerprint sensor 180 similarly to the display light emitting unit 2320. According to an embodiment, the plurality of units included in the sensing light emitting unit 2410 may be disposed to adjacent to the plurality of units included in the display light emitting unit 2320. Although the drawing illustrates that the number of units of the sensing light emitting unit 2410 is the same as the number of the units included in the display light emitting unit 2320, the present disclosure is not limited thereto. For example, the number of units of the display light emitting unit 2320 may be different from the number of units of the sensing light emitting unit 2410.

A portion (e.g., a portion facing the display light emitting unit 2320) of the waveguide 2330, into which light is input, may face the display light emitting unit 2320, and may surround a periphery of the fingerprint sensor 180. The waveguide 2330 has a specific length, and may emit light correspondence to the light radiated by the display light emitting unit 2320. According to an embodiment, a plurality of waveguides 2330 may have a specific length and may be disposed between the plurality of units of the display light emitting unit 2320. The number of the waveguides 2330 may be changed depending on the number of the units of the display light emitting unit 2320. For example, when the display light emitting unit 2320 has one unit, the waveguide 2330 may surround a whole periphery of the fingerprint sensor 180 while contacting the units of the display light emitting unit 2320.

Figure 27:
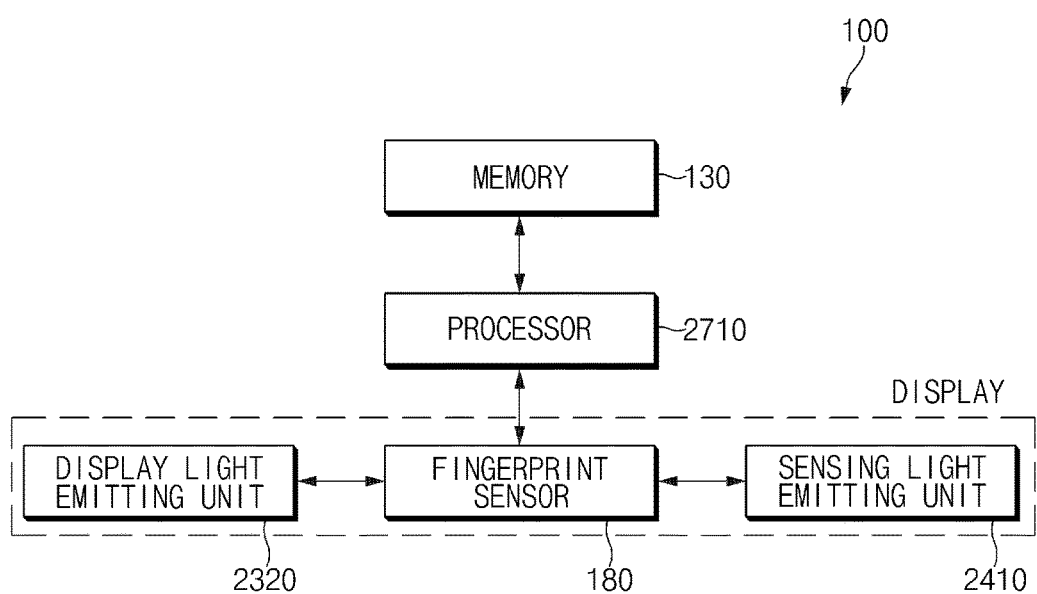
FIG. 27 is a view illustrating an example of a configuration of an electronic device related to sensing of a fingerprint of the present disclosure.

FIG. 27 is a view illustrating an example of a configuration of an electronic device related to sensing of a fingerprint of the present disclosure.

Referring to FIG. 27, the electronic device 100 related to sensing of a fingerprint according to the present disclosure, for example, may include a memory 130, a processor 2710 (or a processor 120), a fingerprint sensor 180, and a display light emitting unit 2320 and a sensing light emitting unit 2410 directly connected to the fingerprint sensor 180.

The memory 130 may include a memory described above with reference to FIG. 13. The memory 130 may include a set of instructions related to driving of the fingerprint sensor 180, a set of instructions related to control of the display light emitting unit 2320, and a set of instructions related to control of the sensing light emitting unit 2410.

The processor 2710 may include a processor described above with reference to FIG. 13. Further, the processor 2710 may include a driver IC for driving the fingerprint sensor 180. Further, the processor 2710 may include a plurality of sub-processors. The plurality of sub-processors may include sub-processors for driving the fingerprint sensors 180, the sub-processor related to control of the display light emitting unit 2320, and a sub-processor related to control of the sensing light emitting unit 2410.

The fingerprint sensor 180 may perform fingerprint verification under the control of the processor 2710. According to various embodiments, the fingerprint sensor 180 may include a driver IC related to sensing of a fingerprint. In this case, the fingerprint sensor 180 may perform control of the display light emitting unit 2320 and the sensing light emitting unit 2410 in correspondence of the control of the processor 2710 or in correspondence to specific scheduling information. In this regard, the driver IC included in the fingerprint sensor 180 may store and operate sets of instructions related to control of the display light emitting unit 2320 and the sensing light emitting unit 2410 in an embedding form.

The display light emitting unit 2320 may emit light at a specific time point or at a specific period in correspondence to control of the fingerprint sensor 180 including a driver IC. According to an embodiment, the display light emitting unit 2320 may emit light of a first luminance or a first color when the display 160 is in a turn-off state in correspondence to the fingerprint sensor 180 including a driver IC. Further, the display light emitting unit 2320 may emit light of a second luminance (e.g., a luminance that is different from the first luminance) or a second color (e.g., a color of a wavelength that is different from that of the first color) in a turn-on state of the display 160 in correspondence to control of the fingerprint sensor 180 including a driver IC.

The sensing light emitting unit 2410 may radiate light for sensing a fingerprint in correspondence to control of the fingerprint sensor 180 including a driver IC. According to an embodiment, if the processor 2710 requests sensing of a fingerprint related to a user input (e.g., a touch input based on the display 160), the fingerprint sensor 180 may control the sensing light emitting unit 2410 to radiate specific light. Accordingly, the sensing light emitting unit 2410 may radiate the specific light. The sensing light emitting unit 2410 may radiate the specific light for a specific time period (e.g., several seconds), and may stop irradiation of light according to a set schedule or under the control of the fingerprint sensor 180.

Figure 28:
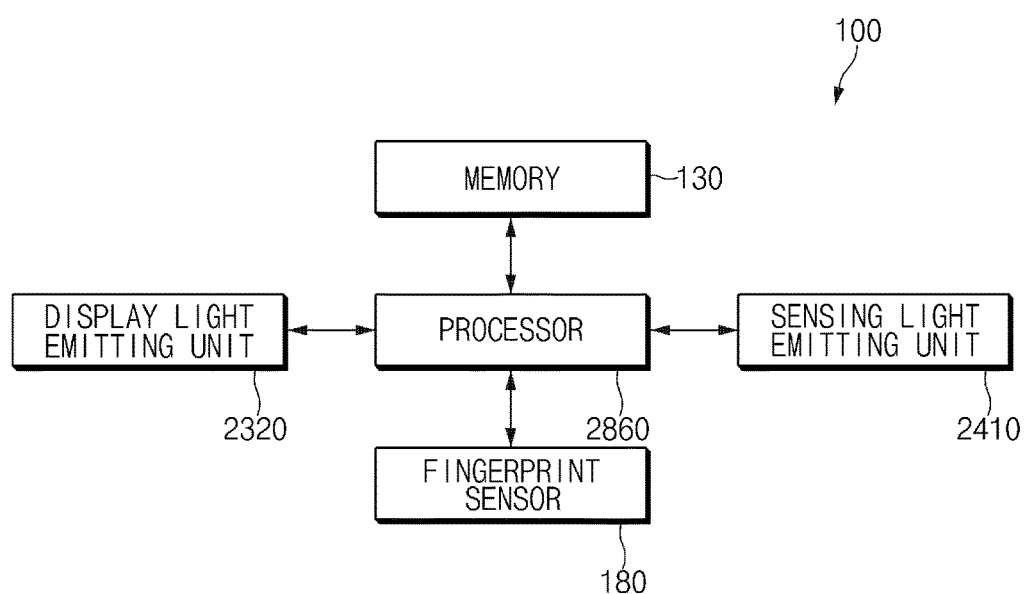
FIG. 28 is a view illustrating another example of a configuration of an electronic device related to sensing of a fingerprint of the present disclosure.

FIG. 28 is a view illustrating another example of a configuration of an electronic device related to sensing of a fingerprint of the present disclosure.

Referring to FIG. 28, the electronic device 100 related to sensing of a fingerprint according to the present disclosure, for example, may include a memory 130, a processor 2860 (or the processor 120), a fingerprint sensor 180 directly connected to a processor 2860, and a display light emitting unit 2320, and a sensing light emitting unit 2410.

The above-mentioned processor 2860 of the electronic device 100 may control emission of display light and sensing light related to sensing of a fingerprint, and fingerprint verification. For example, the processor 2860 may control the display light emitting unit 2320 to emit light of a first luminance or a first color while the display 160 is turned off. The first luminance or the first color may correspond to a value by which a visibility from a background of the display 160 of the electronic device 100 while the display 160 is turned off For example, when the display 160 turned off corresponds to a black color, the first luminance or the first color may include a wavelength of a white or orange color. Further, in order to save electric power when the display 160 emits light continuously or periodically while being in a turned-off sleep state, the first luminance may be a luminance of not more than a specific value such that the display 160 consumes relatively low power. The first luminance may have a white color such that a better visibility may be guaranteed at a luminance of not more than a specific value.

According to various embodiments, the processor 2860 may differently adjust a value of a luminance or a type of a color of the display light emitting unit 2320 according to a luminance of the outside. For example, when the luminance of the outside is relatively low (e.g., at the night), the processor 2860 may set the luminance of the display light emitting unit 2320 to a relatively low value. Further, when the luminance of the outside is relatively high (e.g., during the day), the processor 2860 may set the luminance of the display light emitting unit 2320 to a relatively high value. Further, the processor 2860 may control the display light emitting unit 2320 to output a color (e.g., a white or orange color) of a relatively high visibility when the luminance of the outside is relatively high, and may control the display light emitting unit 2320 to output a color (e.g., a blue color) of a relatively low visibility when the luminance of the outside is relatively low. Further, when the luminance of the outside is relatively low, the processor 2860 may control the display light emitting unit 2320 to emit light of a color of a high visibility instead of setting the luminance of the display light emitting unit 2320 to a relatively low value.

According to various embodiments, the processor 2860 may differently adjust a value of a luminance or a type of a color of the display light emitting unit 2320 according to a state of a screen displayed on the display 160. For example, when a relatively bright screen (e.g., a white screen) is displayed, the processor 2860 may control the display light emitting unit 2320 to output at least one of a color of a relatively high luminance or a color of a relatively high visibility. For example, when a relatively dark screen (e.g., a grey screen) is displayed, the processor 2860 may control the display light emitting unit 2320 to output at least one of a color of a relatively low luminance or a color of a relatively low visibility. Further, the processor 2860 may control the display light emitting unit 2320 to output a color of a relatively low visibility while having a relatively high luminance when a screen of a brightness or higher is output.

According to various embodiments, if a request for performance of fingerprint verification is made (e.g., an application related to fingerprint verification is executed), the processor 2860 may control the display light emitting unit 2320 to emit light of a relatively high luminance or a high visibility, temporarily, while the corresponding application is executed, until the fingerprint authentication is completed, or shortly before a finger for sensing a fingerprint is contacted. If the fingerprint authentication is completed, the processor 2860 may control the display light emitting unit 2320 to terminate emission of light. During the fingerprint authentication, the processor 2860 may control the sensing light emitting unit 2410 to control irradiation of light related to fingerprint authentication. Also, the processor 2860 may activate the fingerprint sensor 180 including only a light receiving unit.

The processor 2860 may be a processor adapted in relation to control of the fingerprint sensor 180, the display light emitting unit 2320, and the sensing light emitting unit 2410. Further, the processor 2860 may be at least a part of the processor 120 described above with reference to FIG. 13. Further, the processor 2860 may include a processor (e.g., a low-power processor or a sensor hub) adapted to allow low-power driving to control the fingerprint sensor 180, the display light emitting unit 2320, and the sensing light emitting unit 2410. Further, the processor 2860 may include a processor in which sets of instructions related to control of the display light emitting unit 2320 and the sensing light emitting unit 2410 are added to a driver IC adapted to drive the fingerprint sensor 180.

Figure 29A:
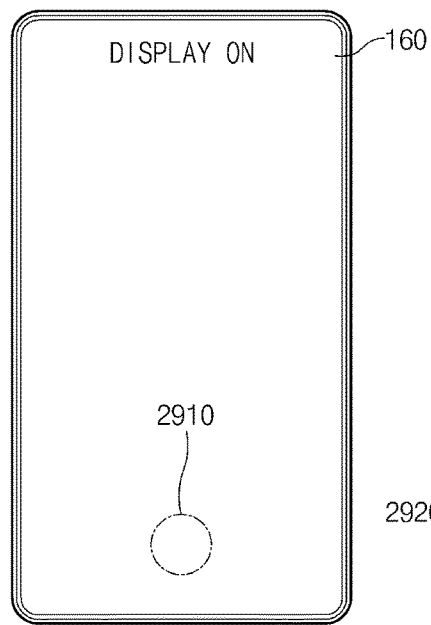
FIGS. 29A and 29B are views illustrating an example of light emission of guiding a fingerprint sensor according to an embodiment of the present disclosure.
Figure 29B:
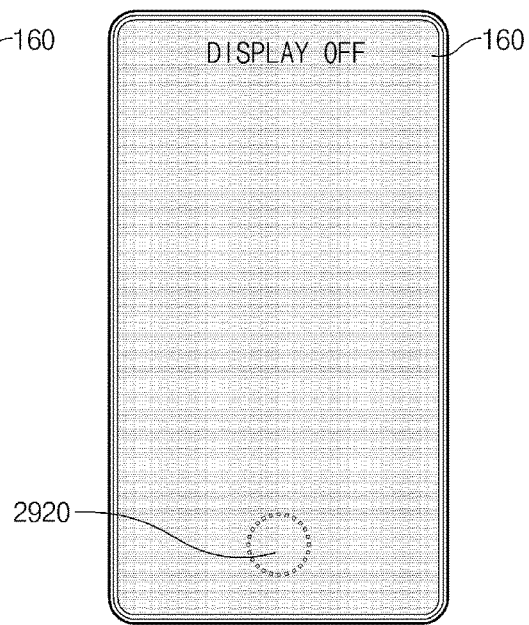

FIGS. 29A and 29B are views illustrating an example of light emission of guiding a fingerprint sensor according to an embodiment of the present disclosure.

Referring to FIG. 29A, as in state 2901, while the display 160 is turned on, the display light emitting unit 2320 disposed in an area of the fingerprint sensor 180 of the display 160 may output a first light emission pattern 2910 in which light of a first luminance or a first color is emitted. As described above, the first light emission pattern 2910 may be a pattern having a color of a relatively high luminance or a relatively high visibility such that the display 160 may be recognized more easily while being turned on.

Further, as in state 2903, while the display 160 is turned off, the display light emitting unit 2320 disposed in an area of the fingerprint sensor 180 of the display 160 may output a second light emission pattern 2920 in which light of a second luminance or a second color is emitted. For example, the second light emission pattern 2920 may be a pattern having a color of a relatively low luminance (e.g., a luminance that is lower than the first luminance) or a relatively low visibility (e.g., a visibility that is lower than that of the first color) so that the display 160 may be easily recognized in a turn-off state.

The drawing exemplarily illustrates a form in which the display light emitting unit 2320 is disposed circularly. The form of the display light emitting unit 2320 may be modified in various forms according to an intention of the designer.

Figure 30A:
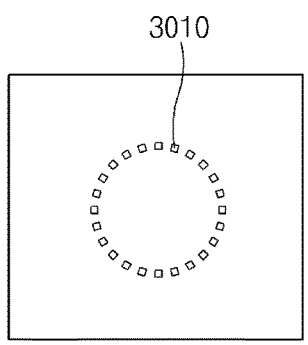
FIGS. 30A-30C are views illustrating a second example of light emission of guiding a fingerprint sensor according to an embodiment of the present disclosure.
Figure 30B:
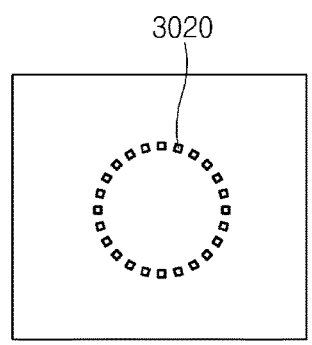
Figure 30C:
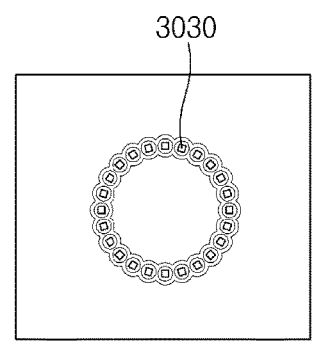

FIGS. 30A-30C are views illustrating a second example of light emission of guiding a fingerprint sensor according to an embodiment of the present disclosure.

The display light emitting unit 2320 may output a first light emission pattern 3010 as in state 3001. The first light emission pattern 3010 may be realized as light of a first luminance or a first color is radiated while a plurality of light emitting units are disposed circularly at a specific interval. The plurality of light emitting units included in the display light emitting unit 2320 may radiate light of the same color.

Further, the display light emitting unit 2320 may output a second light emission pattern 3020 as in state 3003. The second light emitting pattern 3020 may be realized as the plurality of light emitting units radiates light of a second luminance (e.g., a luminance that is higher than the first luminance) or a second color. The plurality of light emitting units included in the display light emitting unit 2320 may radiate light of the same color.

Further, the display light emitting unit 2320 may output a third light emission pattern 3030 as in state 3005. The third light emitting pattern 3030 may be realized as the plurality of light emitting units radiates light of a third luminance (e.g., a luminance that is higher than the second luminance) or a third color. The plurality of light emitting units included in the display light emitting unit 2320 may radiate light of different colors. Further, the plurality of light emitting units included in the display light emitting unit 2320 may be classified into several groups, and the light emitting units of the same group may radiate light of the same color but may radiate light of a color that is different from those of the light emitting units of the other groups.

The display light emitting unit 2320 may radiate light of a specific light emission pattern according to an operating environment of the electronic device 100 in correspondence to control of the processor 120 (or the processor 2710 or 2860). For example, the display light emitting unit 2320 may radiate light of the first light emission pattern 3010 while the display 160 is turned off. The display light emitting unit 2320 may radiate light of the second light emission pattern 3020 while the display 160 is turned on. If an application related to sensing of a fingerprint is executed, the display light emitting unit 2320 may radiate light of the third light emission pattern 3030. Further, according to an embodiment, the display light emitting unit 2320 may sequentially output first to third light emission patterns 3010, 3020, and 3030 at a specific time interval.

According to various embodiments, an electronic device is provided. The electronic device may include a display including at least one pixel and at least a partial area of which is transparent, a fingerprint sensor disposed in an area under the display, on which a screen is displayed, to collect light, a direction of which is changed by an object approaching the display and acquire image information related to fingerprint authentication, a display light emitting unit disposed adjacent to the fingerprint sensor to radiate light of a specific luminance or a specific color to a front side of the display, a sensing light emitting unit disposed adjacent to the fingerprint sensor to radiate light related to an operation of the fingerprint sensor and a processor adapted to acquire image information of the fingerprint sensor, control emission of light by the display light emitting unit, and control emission of light by the sensing light emitting unit.

According to an embodiment, the display light emitting unit includes a plurality of units, and the plurality of units are disposed at a periphery of the fingerprint sensor at an interval.

According to an embodiment, the sensing light emitting unit includes a plurality of units, and the plurality of units of the sensing light emitting unit are disposed between the plurality of units of the display light emitting unit.

According to an embodiment, the electronic device may further include at least one waveguide disposed at a periphery of the fingerprint sensor and adapted to emit light by the light emitted by the display light emitting unit.

According to an embodiment, the processor is adapted to differently adjust a luminance or a color of the light radiated by the display light emitting unit according to a turn-on or turn-off state of the display.

According to an embodiment, the processor is adapted to differently adjust a luminance or a color of the light radiated by the display light emitting unit according to whether an object approaches a surface of the display.

According to an embodiment, the processor is adapted to differently adjust a luminance or a color of the light radiated by the display light emitting unit according to an intensity of illumination of the outside.

According to an embodiment, the processor is adapted to differently adjust a luminance or a color of the light radiated by the display light emitting unit according to a type of an application that is being executed.

According to an embodiment, the processor is adapted to differently adjust a luminance or a color of the light radiated by the display light emitting unit according to a result of authentication of a fingerprint.

Figure 31:
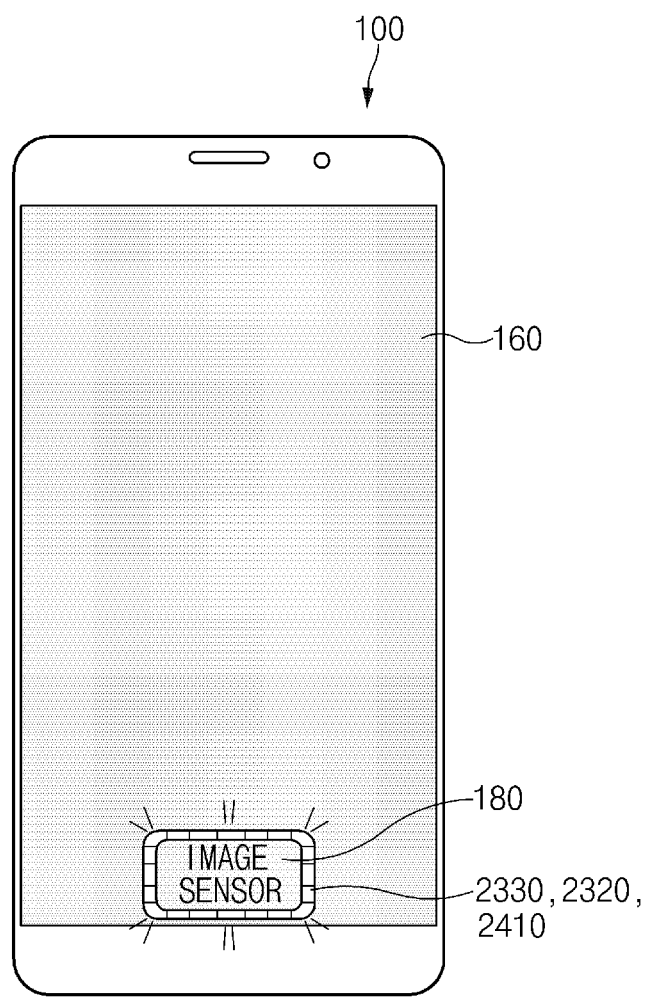
FIG. 31 is a view illustrating a third example of light emission of guiding a fingerprint sensor according to an embodiment of the present disclosure.

FIG. 31 is a view illustrating a third example of light emission of guiding a fingerprint sensor according to an embodiment of the present disclosure.

Referring to FIG. 31, the fingerprint sensor 180 and the display light emitting unit 2320 may be disposed on one lower side of the display 160 of the electronic device 100. The display light emitting unit 2320, for example, may include at least one waveguide 2330. While the display light emitting unit 2320 emits light of a specific color, the waveguide 2330 may emit light in correspondence with the light emitted by the display light emitting unit 2320. Accordingly, as illustrated, light of a band form may be displayed on one side of a front surface of the display 160 (e.g., at a location indicating a periphery of the fingerprint sensor 180).

Figure 32:
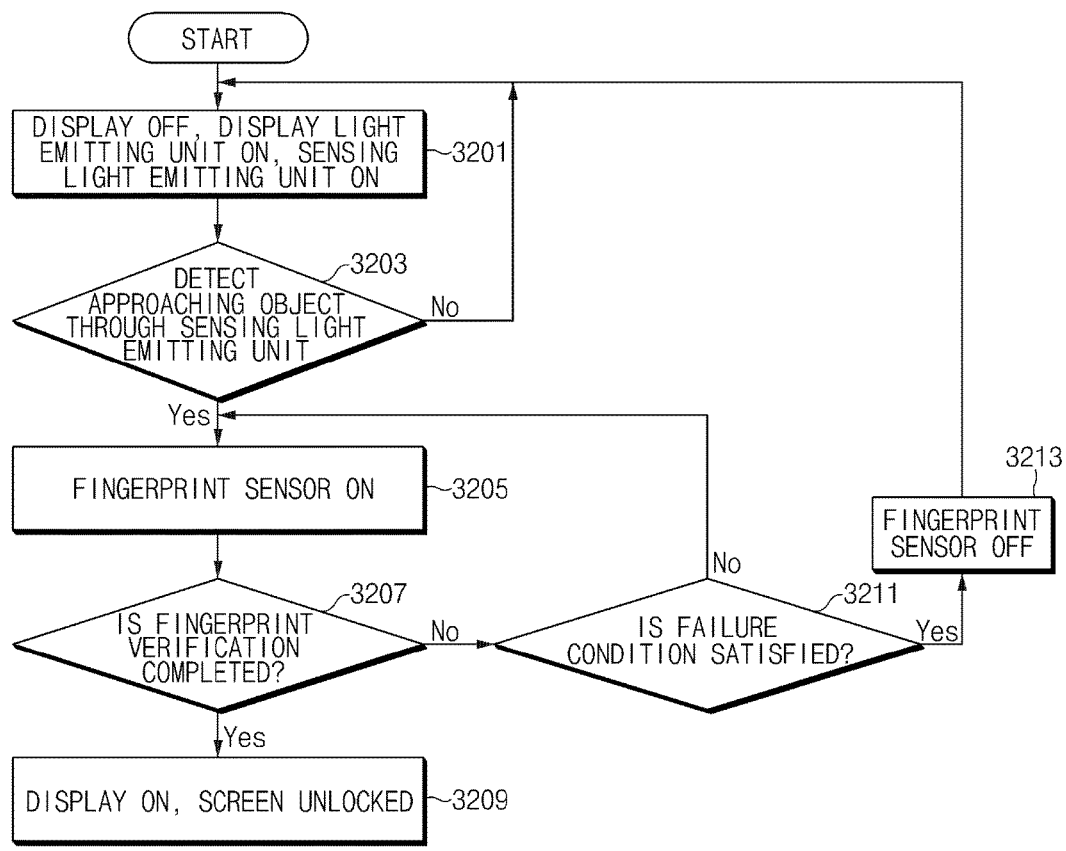
FIG. 32 is a view illustrating an example of a method for operating an electronic device including a fingerprint sensor according to an embodiment of the present disclosure.

FIG. 32 is a view illustrating an example of a method for operating an electronic device including a fingerprint sensor according to an embodiment of the present disclosure.

Referring to FIG. 32, according to the method for operating an electronic device of an embodiment of the present disclosure, in operation 3201, the processor 120 (or the processor 2710 or 2860) of the electronic device 100 may control turning-off of the display, turning-on of the display light emitting unit 2320, and turning-on of the sensing light emitting unit 2410. According to various embodiments, while the sensing light emitting unit 2410 is turned on in real time or at a specific period, the processor 120 may control the display light emitting unit 2320 to emit light if an object within a specific distance is detected through proximity sensing. According to various embodiments, the processor 120 may control the display light emitting unit 2320 to emit light of a first luminance (e.g., a relatively low luminance, for example, 300 nit), and may control the display light emitting unit 2320 to emit light of a second luminance (e.g., a relatively high luminance, for example, 500 nit) if an object is within a specific distance.

In operation 3203, the processor 120 may identify whether an approach of an object is detected through the sensing light emitting unit 2410. For example, the light radiated by the sensing light emitting unit 2410 may be received by the fingerprint sensor 180 such that an approach of an object may be identified. According to various embodiments, the processor 120 may determine an approach of an object based on a touch function of the display 160. When an approaching object is not detected, the processor 120 may return to an operation before operation 3201 to perform the following operations again.

When an approaching object is detected, in operation 3205, the processor 120 may activate the fingerprint sensor 180.

In operation 3207, the processor 120 may identify whether the fingerprint verification is completed. When the fingerprint verification is completed, in operation 3209, the processor 120 may turn on the display 160 to unlock the screen. Here, the unlocking of the screen is a function performed as the fingerprint verification is completed, and may be changed to another function. For example, the processor 120 may execute a specific application or may access a specific server as the fingerprint authentication is completed.

If the fingerprint verification is not completed, in operation 3211, the processor 120 may identify whether a failure condition is satisfied. If the failure condition is not satisfied, the processor 120 returns to an operation before operation 3205 to perform the following operations again. The failure condition may include whether a specific time elapses after the function related to the fingerprint verification is performed. Further, the failure condition may include a condition in which a touch state of a finger is released while the fingerprint verification is performed.

If the failure condition is satisfied, in operation 3213, the fingerprint sensor 180 may be controlled to be turned off The processor 120 may return to a state before operation 3201 to perform the following operations again.

As described above, various embodiments may provide a structure by which a finger may be easily disposed for fingerprint authentication while the electronic device is gripped.

Further, various embodiments help perform fingerprint authentication even only with an intuitive and simple operation.

Further, various embodiments help improve a fingerprint verification rate of the fingerprint sensor disposed on a rear surface of the display.

According to various embodiments, a method for operating an electronic device is provided. The method may include receiving a request for execution of a fingerprint verification function related to an operation of a fingerprint sensor disposed under a display area of a display, outputting a guide UI adapted to guide a contact of a finger to the display area corresponding to a location in which the fingerprint sensor is disposed and if a specific event related to a fingerprint authentication area in which the guide UI is output is generated, outputting a display state of the fingerprint authentication area to a specific luminance or a specific color by using the processor.

According to an embodiment, the outputting of the display state of the fingerprint authentication area includes outputting a display state of the fingerprint authentication area in at least partial area of the display in a color of a specific wavelength selected from a red series color of 650 to 780 nm, a green series color of 490 to 570 nm, or a near IR (NIR) series color of 780 to 1100 nm.

According to an embodiment, the method may further include, when authentication of a fingerprint fails or acquisition of image information having not less than a specific resolution fails, increasing a luminance of the display area, in which a contacting object is disposed, by a specific value or outputting the display area in a color of a specific wavelength.

According to various embodiments, a method for operating an electronic device is provided. The method may include receiving, by a processor, a request for authentication of a fingerprint by a fingerprint sensor disposed under a display, outputting a guide UI adapted to guide a contact of a finger to a fingerprint authentication area of the display corresponding to a location in which the fingerprint sensor is disposed, collecting, by the fingerprint sensor, a specific event in the fingerprint authentication area, delivering, by the fingerprint sensor, the specific event to a display driver integrated-chip adapted to output the guide UI and changing, by the display driver integrated-chip, a display state of the fingerprint authentication area in response to the specific event to a specific luminance or specific color.

According to an embodiment, the changing of the display state of the fingerprint authentication area includes changing the display state of the fingerprint authentication area to a color of a specific wavelength selected from a red series color of 650 to 780 nm, a green series color of 490 to 570 nm, or a near IR (NIR) series color of 780 to 1100 nm.

According to an embodiment, the method may further include, when authentication of a fingerprint fails or acquisition of image information having not less than a specific resolution fails, increasing a luminance of the display area, in which an object contacting the display driver integrated chip is disposed, by a specific value or outputting the display area in a color of a specific wavelength.

According to various embodiments, another method for operating an electronic device is provided. The method may include identifying a turn-on or turn-off state of a display including at least one pixel and at least a partial area of which is transparent, when the display is in a turn-on state, emitting light of a first luminance or a first color by a display light emitting unit disposed adjacent to a fingerprint sensor disposed under the display, and when the display is in a turn-off state, emitting light of a second luminance or a second color by the display light emitting unit disposed adjacent to the fingerprint sensor disposed under the display.

According to an embodiment, the method may further include identifying an approach of an object by using light radiated at a specific period or in real time or recognition of a touch according to a contact of an object, by a sensing light emitting unit disposed adjacent to the fingerprint sensor and when the object approaches to a specific distance or less from the fingerprint sensor, emitting light of a third luminance or a third color by the display light emitting unit.

According to an embodiment, the method may further include irradiating, by the sensing light emitting unit, light related to sensing of a fingerprint according to an approach of an object and performing, by the fingerprint sensor, recognition of a fingerprint based on the light radiated by the sensing light emitting unit.

According to an embodiment, the method may further include detecting an intensity of illumination of the outside while the display is in a turn-on state or a turn-off state and differently adjusting a luminance or a type of a color of the light radiated by the display light emitting unit according to an intensity of illumination of the outside.

According to an embodiment, the method may further include at least one of identifying a type of an application that is being executed while the display is in a turn-on state, and differently adjusting a luminance or a type of a color of light radiated by the display light emitting unit according to the type of the application or differently adjusting the luminance or the type of the color of the light radiated by the display light emitting unit in correspondence to a result of authentication of a fingerprint of the fingerprint sensor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be adapted to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
  a display, which is emitting light by itself, including at least one pixel having at least a partial area that is transparent;
  a fingerprint sensor disposed in an area under the display, the fingerprint sensor is configured to obtain image information related to fingerprint authentication;
  a plurality of display light emitting units disposed adjacent to the fingerprint sensor in an area under the display to radiate light of a specific luminance or a specific color to a front side of the display;
  a sensing light emitting unit disposed adjacent to the fingerprint sensor, the sensing light emitting unit is configured to radiate light related to an operation of the fingerprint sensor; and
  a processor configured to control obtaining the image information of the fingerprint sensor, control emission of light by the display light emitting unit, and control emission of light by the sensing light emitting unit,
    wherein the plurality of display light emitting units are disposed to surround a side of the fingerprint sensor.

2. The electronic device of claim 1, wherein the plurality of display light emitting units includes a plurality of units that are disposed at a periphery of the fingerprint sensor at an interval.

3. The electronic device of claim 2, wherein the sensing light emitting unit includes a plurality of units, and the plurality of units of the sensing light emitting unit are disposed between the plurality of display light emitting units.

4. The electronic device of claim 1, further comprising:
  at least one waveguide disposed at a periphery of the fingerprint sensor and configured to emit light by the light emitted by the plurality of display light emitting units.

5. The electronic device of claim 1, wherein the processor is configured to differently adjust a luminance or a color of the light radiated by the plurality of display light emitting units according to a turn-on or turn-off state of the display.

6. The electronic device of claim 1, wherein the processor is configured to differently adjust a luminance or a color of the light radiated by the plurality of display light emitting units according to whether an object approaches a surface of the display.

7. The electronic device of claim 1, wherein the processor is configured to differently adjust a luminance or a color of the light radiated by the plurality of display light emitting units according to an intensity of illumination of an ambient environment.

8. The electronic device of claim 1, wherein the processor is configured to differently adjust a luminance or a color of the light radiated by the plurality of display light emitting units according to a type of an application that is being executed.

9. The electronic device of claim 1, wherein the processor is configured to differently adjust a luminance or a color of the light radiated by the plurality of display light emitting units according to a result of authentication of a fingerprint.

* * * * *